(12) United States Patent
Dryfe et al.

(10) Patent No.: US 10,913,035 B2
(45) Date of Patent: Feb. 9, 2021

(54) LAMINATE MEMBRANES COMPRISING A TWO-DIMENSIONAL LAYER COMPRISING POLYAROMATIC FUNCTIONALITIES

(71) Applicant: The University of Manchester, Manchester (GB)

(72) Inventors: Robert Dryfe, Manchester (GB); Mark Bissett, Manchester (GB)

(73) Assignee: The University of Manchester, Manchester (GB)

( * ) Notice: Subject to any disclaimer, the term of this patent is extended or adjusted under 35 U.S.C. 154(b) by 0 days.

(21) Appl. No.: 16/085,098

(22) PCT Filed: Apr. 5, 2017

(86) PCT No.: PCT/GB2017/050957
§ 371 (c)(1),
(2) Date: Sep. 14, 2018

(87) PCT Pub. No.: WO2017/174987
PCT Pub. Date: Oct. 12, 2017

(65) Prior Publication Data
US 2019/0076792 A1 Mar. 14, 2019

(30) Foreign Application Priority Data

Apr. 6, 2016 (GB) .................................. 1605881.0

(51) Int. Cl.
*B01D 71/02* (2006.01)
*B01D 67/00* (2006.01)
(Continued)

(52) U.S. Cl.
CPC ......... *B01D 71/02* (2013.01); *B01D 67/0046* (2013.01); *B01D 67/0093* (2013.01);
(Continued)

(58) Field of Classification Search
CPC .... B01D 67/0046; B01D 71/02; B01D 69/12; B01D 67/0093; B01D 61/02; B01D 2323/40; B01D 2323/36
See application file for complete search history.

(56) References Cited

U.S. PATENT DOCUMENTS

2015/0321147 A1* 11/2015 Fleming ............... B01D 61/025
210/489
2016/0051942 A1 2/2016 Park et al.
(Continued)

FOREIGN PATENT DOCUMENTS

CN 104084061 A 10/2014
CN 104138716 A 11/2014
(Continued)

OTHER PUBLICATIONS

Search Report issued in the British Patent Application No. GB1605881.0, dated Nov. 17, 2016, 7 pages.
(Continued)

*Primary Examiner* — Vishal V Vasisth
(74) *Attorney, Agent, or Firm* — Wilmer Cutler Pickering Hale and Dorr LLP

(57) ABSTRACT

This invention relates to membranes of two dimensional material and their uses in filtration. The membranes may include polyaromatic molecules which provide a improvement in the rejection observed for small solutes. The two dimensional material may be a transition metal dichalcogenide (TMDC) or hexagonal boron nitride (hBN).

34 Claims, 33 Drawing Sheets

(51) Int. Cl.
 B01D 69/12 (2006.01)
 B01D 61/02 (2006.01)
(52) U.S. Cl.
 CPC .............. B01D 69/12 (2013.01); B01D 61/02 (2013.01); B01D 2323/36 (2013.01); B01D 2323/40 (2013.01)

(56) References Cited

U.S. PATENT DOCUMENTS

2016/0074815 A1 3/2016 Sinton et al.
2016/0340533 A1* 11/2016 Casiraghi ............ C01B 21/0648

FOREIGN PATENT DOCUMENTS

| WO | WO-2015/066404 A1 | 5/2015 |
| WO | WO-2015/075451 A1 | 5/2015 |
| WO | WO-2015/075453 A1 | 5/2015 |
| WO | WO-2015/114357 A2 | 8/2015 |
| WO | WO-2016/042309 A1 | 3/2016 |

OTHER PUBLICATIONS

Huang et al., "Graphene-Based Membranes for Molecular Separation," The Journal of Physical Chemistry Letters, Jun. 24, 2015, vol. 6, No. 14, pp. 2806-2815.
Huang et al., "Metal dichalcogenide nanosheets: preparation, properties and applications," Chemical Society Reviews, Jan. 23, 2013, vol. 42, pp. 1934-1946.
International Search Report and Written Opinion dated Jul. 12, 2017, in the International Application No. PCT/GB2017/050957, 14 pages.
Joshi et al., "Precise and Ultrafast Molecular Sieving Through Graphene Oxide Membranes," Science, Feb. 14, 2014, vol. 343, pp. 752-754.
Koski et al., "The New Skinny in Two-Dimensional Nanomaterials," ACS Nano, published online, vol. 7, pp. 3739-3743, May 16, 2013.
Nicolosi et al., "Liquid Exfoliation of Layered Materials," Jun. 21, 2013, Science, vol. 340, Review Summary p. 1420 and pp. 1226419-1 to 1226419-18.
Nightingale, Jr., "Phenomenological Theory of Ion Solvation. Effective Radii of Hydrated Ions," J. Phys. Chem. Sep. 1959, vol. 63, pp. 1381-1387.
Schultz et al., "Determination of the effective hydrodynamic radii of small molecules by viscometry," The Journal of General Physiology, Jul. 1961, vol. 44, pp. 1189-1199.
Sun et al., "Laminar MoS2 membranes for molecular separation," Chemical Communications, Sep. 26, 2013, vol. 49, pp. 10718-10720.
Sun et al., "Ultrafast Molecule Separation through Layered WS2 Nanosheet Membranes," ACS Nano, published online: May 22, 2014, vol. 8, No. 6, pp. 6304-6311.
Wang et al., "Electronics and optoelectronics of two-dimensional transition metal dichalcogenides," Nature Nanotechnology, Nov. 6, 2012, vol. 7, pp. 699-712.

* cited by examiner

LAMINATE MEMBRANES COMPRISING A TWO-DIMENSIONAL LAYER COMPRISING POLYAROMATIC FUNCTIONALITIES

This Application is a National Stage Entry of PCT International Application No. PCT/GB2017/050957, filed Apr. 5, 2017, which claims priority to GB Patent Application No. GB1605881.0, filed Apr. 6, 2016, the contents of which are incorporated herein by reference in their entirety.

This invention relates to membranes of two dimensional material and their uses in filtration. The two dimensional material may be a transition metal dichalcogenide (TMDC) or hexagonal boron nitride (hBN).

BACKGROUND

The removal of solutes from solutions finds application in many fields.

This may take the form of the purification of water for drinking or for watering crops or it may take the form of the purification of waste solutions from industry to prevent environmental damage. Examples of applications for water purification include: the removal of salt from sea water for drinking water or for use in industry; the purification of brackish water; the removal of radioactive elements from water which has been involved in nuclear enrichment, nuclear power generation or nuclear clean-up (e.g. that involved in the decommissioning of former nuclear power stations or following nuclear incidents); the removal of environmentally hazardous and toxic chemical (e.g. organic contaminants particularly halogenated organic compounds, heavy metals, chlorates and perchlorates) from industrial waste solutions before they enter the water system; and the removal of biological pathogens (e.g. viruses, bacteria, parasites, etc) from contaminated or suspect drinking water.

In many industrial contexts (e.g. the nuclear industry) it is often desirable to separate dangerous or otherwise undesired solutes from valuable (e.g. rare metals) solutes in industrial waste solutions in order that the valuable solutes can be recovered and reused or sold. This may take place in the context of a water filtration or in pervaporation.

Selective membranes find use in energy generation, e.g. in fuel cells or osmotic power generators.

Graphene and graphene oxide based membranes have been demonstrated to be effective at filtering solutes from solutions (Huang et al., Graphene-Based Membranes for Molecular Separation, *J. Phys. Chem. Lett* 2015, 6, 2806-2815). Notable examples include the use of graphene oxide laminate membranes (Joshi et al., Precise and Ultrafast Molecular Sieving Through Graphene Oxide Membranes, *Science*, 2014, 343, 752-754; WO2015/075451; WO 2015/075453).

Although little work has been carried out to date on membranes formed from other two-dimensional (2-D) materials, some $MoS_2$ and $WS_2$ laminate membranes have been made and their filtration ability tested (Sun et al., Laminar $MoS_2$ Membranes for Molecular separation, *Chem. Commun.*, 2013, 49, 10718-10720; Sun et al., Ultrafast Molecule Separation through Layered $WS_2$ Nanosheet Membranes, *ACS Nano*, 2014, 8, 6, 6304-6311). These membranes are formed from flakes that were obtained by chemical exfoliation techniques and rejection percentages were low, particularly when solutes having a size smaller than 1 nm were used.

It is an aim of certain embodiments of this invention to provide membranes that are more efficient, cheaper or more scalable to produce than prior art membranes.

It is an aim of certain embodiments of this invention to provide membranes that offer increased solvent (e.g. water) flux relative to prior art membranes.

It is an aim of certain embodiments of this invention to provide membranes that achieve higher rejection of certain solutes (e.g. NaCl) than prior art membranes.

It is an aim of certain embodiments of this invention to provide membranes that preferentially exclude solutes according to charge. It is an aim of certain embodiments of this invention to provide membranes that are more selective at excluding solutes of one charge over solutes of another charge than prior art membranes.

It is an aim of certain embodiments of this invention to provide membranes that preferentially exclude solutes according to size. It is an aim of certain embodiments of this invention to provide membranes that are more selective at excluding solutes of one size over solutes of another size than prior art membranes.

Certain embodiments of this invention achieve some or all of the abovementioned aims.

BRIEF SUMMARY OF THE DISCLOSURE

In a first aspect of the invention is provided a laminate membrane comprising:
a plurality of nanoplatelets of a two-dimensional material selected from a transition metal dichalcogenide (TMDC) and hexagonal boron nitride (hBN); and
a plurality of polyaromatic molecules associated with the two-dimensional material.

In a second aspect of the invention is provided a method of reducing the amount of one or more solutes in a liquid to produce a product liquid depleted in said solute or solutes; the method comprising:
(a) contacting a first face of a laminate membrane of the first aspect of the invention with the liquid comprising the one or more solutes;
(b) recovering the product liquid depleted in said solute or solutes from or downstream from a second face of the membrane; and
(c) optionally, recovering the solute or solutes from the first face of the membrane.

In a third aspect of the present invention there is provided a laminate membrane comprising a plurality of nanoplatelets of a two-dimensional material selected from a transition metal dichalcogenide (TMDC) and hexagonal boron nitride (hBN);
wherein the plurality of nanoplatelets is obtained from the corresponding bulk layered inorganic material using a solvent exfoliation method.

In a fourth aspect of the present invention there is provided a laminate membrane comprising a mixture of a plurality of nanoplatelets of a first two-dimensional material selected from a TMDC and hBN and a plurality of nanoplatelets of a second two-dimensional material selected from a TMDC, graphene and hBN.

In a fifth aspect of the present invention there is provided a laminate membrane comprising a plurality of hBN nanoplatelets.

In a sixth aspect of the present invention there is provided a method of reducing the amount of one or more solutes in a liquid to produce a product liquid depleted in said solutes; the method comprising:
(a) contacting a first face of a laminate membrane with the liquid comprising the one or more solutes; and
(b) recovering the product liquid from or downstream from a second face of the membrane;

wherein the laminate membrane is a laminate membrane of the third, fourth or fifth aspect.

In a sixth aspect of the invention is provided the use of a membrane of the first, third, fourth or fifth aspects of the invention to reduce the amount of one or more solutes in a liquid.

In a seventh aspect of the invention is provided a method of reducing the amount of one or more non-ionic solutes in a liquid to produce a product liquid depleted in said solute or solutes; the method comprising:
 (a) contacting a first face of a laminate membrane with the liquid comprising the one or more solutes; and
 (b) recovering the solute or solutes liquid from or downstream from a second face of the membrane;
 (c) optionally, recovering any remaining product from the first face of the membrane;
wherein the laminate membrane comprises a plurality of nanoplatelets of a two-dimensional material selected from: at least one transition metal dichalcogenide (TMDC) and hBN; and
wherein the one or more solutes are each a non-ionic species having a hydration radius that is no larger than 10 nm.

The membrane used in the methods of the seventh aspect of the invention may be a membrane of the first, third, fourth or fifth aspects of the invention.

In an embodiment, the method of the second, sixth or seventh aspect of the invention is continuous. Thus, steps (a) and (b) (and (c), if carried out) may be carried out simultaneously or substantially simultaneously.

In an eighth aspect of the invention is provided a method of producing a laminate membrane, the laminate membrane comprising a plurality of nanoplatelets of a two-dimensional material selected from: at least one transition metal dichalcogenide (TMDC) and hBN; the method comprising:
 a) obtaining the plurality of nanoplatelets of the two-dimensional material from the corresponding bulk layered inorganic material using a solvent exfoliation method; and
 b) depositing the plurality of nanoplatelets of the two-dimensional material to form the laminate membrane.

The membranes of the third, fourth and fifth aspects of the invention may be obtained or obtainable by the method of the eighth aspect.

In a ninth aspect of the invention is provided a method of producing a laminate membrane of the first aspect; the method comprising:
 a) depositing the plurality of nanoplatelets of a two-dimensional material onto a porous material to form the laminate membrane supported on the porous material;
 b) contacting a first side of the laminate membrane with a first solution comprising a first concentration of the polyaromatic molecules and contacting the second side of the laminate membrane with a second solution comprising a second concentration of the polyaromatic molecules, said second concentration being lower than said first concentration, to provide a membrane of the first aspect.

The membrane formed in step a) of the ninth aspect of the invention may be formed according to the eighth aspect of the invention.

The following statements apply, where not mutually exclusive, to any of the first to ninth aspects mentioned above. These statements are independent and interchangeable. In other words, any of the features described in any one of the following statements may (where not mutually exclusive) be combined with the features described in one or more other statements below.

Membranes

The laminate membranes of the invention have the overall shape of a sheet-like material through which liquid may pass when the laminate is wet. The membranes according to the invention consist of overlapped layers of randomly oriented single or few layer nanoplatelets of two-dimensional material. The laminate membrane can be used as a filtration membrane. Without wishing to be bound by theory, the liquid is understood not to pass through the nanoplatelets. It is believed that the individual nanoplatelets are stacked in such a way as to form capillary-like pathways between the faces and sides of the nanoplatelets and it is through these pathways that the liquid passes. The size of the pathways would be expected to influence the rejection rates of the solutes as the solvent passes through the membrane with smaller pathway sizes providing improved rejection.

The laminate membrane may comprise a plurality of TMDC (e.g. $MoS_2$, $WS_2$, $MoTe_2$, $MoSe_2$ etc.) nanoplatelets. The laminate membrane may comprise a plurality of $WS_2$ and/or a plurality of $MoS_2$ nanoplatelets. Thus, the laminate membrane may comprise a plurality of $WS_2$ nanoplatelets. Alternatively, the laminate membrane may comprise a plurality of $MoS_2$ nanoplatelets.

The laminate membrane may comprise a plurality of hBN nanoplatelets. Single layer h-BN is structurally similar to graphene, but unlike its carbon analogue, it is an insulator with a large band gap (~6 eV). This, added to unique features such as excellent chemical, mechanical properties, and thermal stability, allows using hBN nanosheets (BNNS) in a variety of applications, such as component in nanodevices, solid lubricant, UV-light emitter and as insulating thermo-conductive filler in composites.

The laminate membrane may comprise a plurality of graphene nanoplatelets.

The laminate membrane may comprise a mixture of a plurality of nanoplatelets of a first two-dimensional material selected from a TMDC and hBN and a plurality of nanoplatelets of a second two-dimensional material selected from a TMDC, graphene and hBN. For the absence of doubt, the first and second two dimensional materials are not the same. The laminate membrane may comprise a mixture of a plurality of nanoplatelets of a first TMDC and a plurality of nanoplatelets of a second TMDC. The laminate membrane may comprise a mixture of a plurality of nanoplatelets of a TMDC and a plurality of nanoplatelets of hBN. The laminate membrane may comprise a mixture of a plurality of nanoplatelets of a TMDC and a plurality of nanoplatelets of graphene. The laminate membrane may comprise a plurality of $MoS_2$ nanoplatelets and a plurality of $WS_2$ nanoplatelets The laminate membrane may comprise a mixture of a plurality of nanoplatelets of a first two-dimensional material selected from a TMDC and hBN, a plurality of nanoplatelets of a second two-dimensional material selected from a TMDC and hBN and a plurality of nanoplatelets of a third two-dimensional material selected from a TMDC, graphene and hBN. Thus, the laminate membrane may comprise a mixture of a plurality of nanoplatelets of a TMDC, a plurality of nanoplatelets of graphene and a plurality of nanoplatelets of hBN. The laminate membrane may comprise a plurality of $MoS_2$ nanoplatelets, a plurality of $WS_2$ nanoplatelets and a plurality of nanoplatelets of graphene. The laminate membrane may comprise a plurality of $MoS_2$ nanoplatelets, a plurality of $WS_2$ nanoplatelets and a plurality of nanoplatelets of hBN. It is believed that using mixtures of nanoplatelets of different materials in different proportions will allow the tuning of the capillary-like pathway sizes within the laminate membranes and thus the tuning of the membranes' filtration properties.

The nanoplatelets of two-dimensional material which are stacked to form the laminate of the invention may be a single molecular layer thick. Where the two-dimensional material is hBN, a single molecular layer is one atom thick and can therefore be described as a single atomic layer. Where the two-dimensional material is a TMDC, a single molecular layer is three atoms thick. However, it is possible to use nanoplatelets of containing from 2 to 10 molecular layers of the two-dimensional material in each nanoplatelet. These multilayer flakes are frequently referred to as "few-layer" nanoplatelets. Thus the membrane may be made entirely from monolayer nanoplatelets, from a mixture of monolayer and few-layer nanoplatelets, or from entirely few-layer nanoplatelets.

It may be that greater than 50% by weight (e.g. greater than 75% by weight, greater than 90% or greater than 98%) of the nanoplatelets have a diameter of less than 10 µm. It may be that greater than 50% by weight (e.g. greater than 75% by weight, greater than 90% or greater than 98%) of the nanoplatelets have a diameter of greater than 50 nm. It may be that greater than 50% by weight (e.g. greater than 75% by weight, greater than 90% or greater than 98%) of the nanoplatelets have a diameter of less than 5 µm. It may be that greater than 50% by weight (e.g. greater than 75% by weight, greater than 90% or greater than 98%) of the nanoplatelets have a diameter of greater than 100 nm. It may be that greater than 50% by weight (e.g. greater than 75% by weight, greater than 90% or greater than 98%) of the nanoplatelets have a diameter of less than 2 µm. It may be that greater than 50% by weight (e.g. greater than 75% by weight, greater than 90% or greater than 98%) of the nanoplatelets have a diameter of greater than 150 nm. It may be that greater than 50% by weight (e.g. greater than 75% by weight, greater than 90% or greater than 98%) of the nanoplatelets have a diameter of less than 1 µm. It may be that greater than 50% by weight (e.g. greater than 75% by weight, greater than 90% or greater than 98%) of the nanoplatelets have a diameter of less than 500 nm.

It may be that greater than 50% by weight (e.g. greater than 75% by weight, greater than 90% or greater than 98%) of the two-dimensional material have a thickness of from 1 to 10 molecular layers.

It may be that greater than 50% by weight (e.g. greater than 75% by weight greater than 90% or greater than 98%) of the two-dimensional material has a thickness of from 1 to 5 molecular layers. Thus, it may be that greater than 50% by weight (e.g. greater than 75% by weight, greater than 90% or greater than 98%) of the two-dimensional material has a thickness of from 1 to 3 molecular layers. These statements apply particularly to particles of h-BN.

A single molecular layer of graphene is one atom thick and can therefore be described as a single atomic layer. Where the laminate also comprises graphene, the nanoplatelets of graphene may be a single atomic layer thick. However, it is possible to use nanoplatelets of graphene which are from 2 to 10 molecular layers thick. These multilayer flakes are frequently referred to as "few-layer" nanoplatelets. Thus the graphene present in the membrane may be present entirely as monolayer nanoplatelets, as a mixture of monolayer and few-layer nanoplatelets, or entirely as few-layer nanoplatelets.

Where the laminate also comprises graphene, it may be that greater than 50% by weight (e.g. greater than 75% by weight, greater than 90% or greater than 98%) of the graphene nanoplatelets have a diameter of less than 10 µm.

It may be that greater than 50% by weight (e.g. greater than 75% by weight, greater than 90% or greater than 98%) of the graphene nanoplatelets have a diameter of greater than 50 nm. It may be that greater than 50% by weight (e.g. greater than 75% by weight, greater than 90% or greater than 98%) of the graphene nanoplatelets have a diameter of less than 5 µm. It may be that greater than 50% by weight (e.g. greater than 75% by weight, greater than 90% or greater than 98%) of the graphene nanoplatelets have a diameter of greater than 100 nm. It may be that greater than 50% by weight (e.g. greater than 75% by weight, greater than 90% or greater than 98%) of the graphene nanoplatelets have a diameter of less than 2 µm. It may be that greater than 50% by weight (e.g. greater than 75% by weight, greater than 90% or greater than 98%) of the graphene nanoplatelets have a diameter of greater than 200 nm.

Where the laminate also comprises graphene, it may be that greater than 50% by weight (e.g. greater than 75% by weight, greater than 90% or greater than 98%) of the graphene have a thickness of from 1 to 10 molecular layers. It may be that greater than 50% by weight (e.g. greater than 75% by weight, greater than 90% or greater than 98%) of the graphene has a thickness of from 1 to 5 molecular layers. Thus, it may be that greater than 50% by weight (e.g. greater than 75% by weight, greater than 90% or greater than 98%) of the graphene has a thickness of from 1 to 3 molecular layers.

The laminate membrane may have a thickness greater than about 50 nm, e.g. a thickness between about 100 nm and about 10 µm. The laminate membrane may have a thickness between about 200 nm and about 8 µm. The laminate membrane may have a thickness up to about 5 µm, e.g. up to about 2 µm. The laminate membrane may have a thickness greater than about 1 µm.

The laminate membrane may be comprised in a composite with a porous material. Thus, the laminate membrane may be supported by the porous material. This can provide improved structural integrity. In other words, the nanoplatelets may themselves form a layer, i.e. a laminate membrane, which itself is associated with a porous support material such as a porous membrane to form a further laminate structure, the layers of the further laminate structure being either the porous material or the laminate membrane comprising nanoplatelets of a two-dimensional material. It may be that the laminate membrane may be sandwiched between layers of a porous material. The porous material may be a porous membrane. The porous material may be woven fibres. The porous material (e.g. membrane) may be flexible.

The porous material may be an inorganic material. Thus, the porous material (e.g. membrane) may comprise a ceramic. The material may be selected from alumina, zeolite, or silica. The material may be alumina. Zeolite A can also be used. Ceramic membranes have also been produced in which the active layer is amorphous titania or silica produced by a sol-gel process. Such ceramic membranes may also be used to support the membranes of the invention.

The porous material may be a porous polymer membrane. Thus, the porous material may be a flexible porous polymer membrane.

The porous polymer membrane may be polytetrafluoroethylene (PTFE), polyvinylidene fluoride (PVDF) or Cyclopore™ polycarbonate.

The porous material (e.g. membrane) may comprise a carbon monolith.

The porous material may have a thickness of no more than a few tens of µm, and ideally is less than about 100 µm. It may have a thickness of 50 µm or less, of 10 µm or less, and or of 5 µm or less. In some cases it may have a thickness of less than 1 µm thick. Typically, however, it has a thickness greater than 1 µm.

It may be that the thickness of the entire membrane (i.e. the laminate membrane and the porous material) is from about 1 µm to about 200 µm, e.g. from about 5 µm to about 50 µm.

The porous material should be porous enough not to interfere with solvent (e.g. water) transport but have small enough pores that the nanoplatelets of the two-dimensional material cannot enter the pores. Thus, the porous material must be solvent permeable, e.g. water permeable. Typically, the pore size will be less than 1 µm, e.g. less than 500 nm or less than 200 nm. Typically the pore size will be greater than 1 nm, e.g. greater than 10 nm. The material may have a uniform pore-structure. Examples of porous materials with a uniform pore structure are electrochemically manufactured alumina membranes (e.g. those with the trade names: Anopore™, Anodisc™).

Alternatively, the laminate membrane may be freestanding, i.e. the laminate membrane may not be associated with a porous support material.

The laminate membrane may comprise only nanoplatelets of the two dimensional material or materials.

The laminate membranes used in the invention may comprise a cross-linking agent.

The laminate membrane may comprise a polymer. The polymer may be interspersed throughout the membrane. It may occupy the spaces between the individual nanoplatelets, thus providing interlayer crosslinking. The polymer may be polyvinylalcohol or polyvinylacetate. Other polymers which could be used in this manner include poly(4-styrenesulfonate), Nafion™, carboxymethyl cellulose, Chitosan, polyvinyl pyrrolidone, polyaniline etc. It may be that the polymer is water soluble. Alternatively, it may be that the polymer is not water soluble.

Where the laminate membrane comprises a polymer, that polymer may be present in an amount from about 0.1 to about 50 wt %, e.g. from about 0.2 to about 25 wt %. Thus, the laminate membrane may comprise from about 1 wt % to about 15 wt % polymer.

It may be that the laminate does not comprise a polymer.

The laminate membrane may comprise other two dimensional materials, e.g. graphene oxide, reduced graphene oxide, clays, silicene, etc.

The laminate membrane may comprise other inorganic materials. Said inorganic materials may include materials such as alumina, silica, titanium oxide, etc.

The laminate membrane may comprise a plurality of polyaromatic molecules associated with the two-dimensional material. Thus, it may be a membrane of the first aspect of the invention.

The polyaromatic molecules may be charged. Thus, the polyaromatic molecules may have a negative charge. Alternatively, the polyaromatic molecules may have a positive charge. Alternatively, the polyaromatic molecules may be uncharged.

The polyaromatic molecules may be dye molecules. Thus, the polyaromatic molecules may be any polyaromatic molecules (e.g. any charged polyaromatic molecule) listed in The Colour Index™. The polyaromatic molecules may be any polyaromatic molecules (e.g. any charged polyaromatic molecule) listed in The Colour Index™ on the 1 Apr. 2017. The dye molecule may be selected from sunset yellow and crystal violet.

The polyaromatic molecules are associated with the two-dimensional material. They may be adsorbed onto the two-dimensional material or absorbed within it. The polyaromatic molecules may be bonded to the two-dimensional material. The polyaromatic molecules may be covalently bonded to the two-dimensional material. Alternatively, the polyaromatic molecules may be attached to the two-dimensional material by ionic bonding, dative bonding, hydrogen bonding or Van der Waals forces.

The polyaromatic molecules may each comprise three or more aromatic or heteroaromatic rings. The polyaromatic molecules may each comprise up to six aromatic or heteroaromatic rings, e.g. up to five aromatic rings or heteroaromatic. The polyaromatic molecules may each comprise three or four aromatic or heteroaromatic rings.

The polyaromatic molecules may have a molecular mass greater than 300 gmol$^{-1}$. The polyaromatic molecules may have a molecular mass greater than 400 gmol$^{-1}$. The polyaromatic molecules may have a molecular mass greater than 600 gmol$^{-1}$. The polyaromatic molecules may have a molecular mass greater than 500 gmol$^{-1}$.

The polyaromatic molecules may have a molecular diameter greater than 1 nm. The polyaromatic molecules may have a molecular diameter less than 10 nm.

The term 'polyaromatic molecules' is intended to mean molecules that have more than one aromatic or heteroaromatic ring and where said aromatic or polyaromatic rings are arranged such that the p-orbitals of all component atoms of the rings can overlap to form a single conjugated π-system. Thus, the aromatic or heteroaromatic rings may be fused to each other (as the two phenyl rings in a napthyl are linked). The aromatic rings may be directly bonded to each other (as the two phenyl rings in biphenyl are linked). The aromatic rings may be linked via an alkene or an alkyne (as the two phenyl rings in stilbene are linked). The aromatic rings may be linked via an sp2 hybridised carbon (as the three phenyl rings in crystal violet are linked).

The polyaromatic molecules may have a loading in the laminate membrane of greater than 5 µg per mg of two-dimensional material (e.g. the TMDC). The polyaromatic molecules may have a loading in the laminate membrane of greater than 10 µg per mg of two-dimensional material (e.g. the TMDC). The polyaromatic molecules may have a loading in the laminate membrane of greater than 20 µg per mg of two-dimensional material (e.g. the TMDC). The polyaromatic molecules may have a loading in the laminate membrane of greater than 100 µg per mg of two-dimensional material (e.g. the TMDC). The polyaromatic molecules may have a loading in the laminate membrane of less than 500 µg per mg of two-dimensional material (e.g. the TMDC). The polyaromatic molecules may have a loading in the laminate membrane of less than 250 µg per mg of two-dimensional material (e.g. the TMDC).

Where the membrane comprises polyaromatic molecules, it is preferably formed of or comprises TMDC flakes. Whereas most TMDC laminate membranes are poor at excluding small ions (such as NaCl), the inventors have found that functionalising TMDC membranes with polyaromatic molecules provides membranes that exhibit good rejection of small ions.

The laminate membrane may comprise only nanoplatelets of the two dimensional material or materials and the polyaromatic molecules.

The laminate membrane may be comprised in a liquid filtration device. The liquid filtration device may be a filter or it may be a removable and replaceable filter unit for a filtration apparatus. The filtration device may be a filtration apparatus.

The plurality of nanoplatelets (e.g. hBN nanoplatelets, TMDC nanoplatelets, and/or graphene nanoplatelets) can be obtained using any technique known to the person skilled in the art.

In certain preferred embodiments, however, the plurality of nanoplatelets (e.g. hBN nanoplatelets, TMDC nanoplatelets and/or graphene nanoplatelets) of which the laminate membrane is comprised are preferably obtained or obtainable from the multilayered particles of the corresponding inorganic compound using a solvent exfoliation method. The plurality of nanoplatelets (e.g. hBN nanoplatelets, TMDC nanoplatelets and/or graphene nanoplatelets) of which the laminate membrane is comprised are preferably not obtained or not obtainable from the multilayered particles of the corresponding inorganic compound using a chemical exfoliation method.

Thus, the laminate membranes may be obtained or obtainable by the methods described in the following section.

Methods of Making Laminate Membranes of the Two-Dimensional Materials

In certain aspects of the invention, the plurality of nanoplatelets can be obtained using any exfoliation technique known to those in the art. However, the plurality of nanoplatelets of which the laminate membrane is comprised are preferably obtained or obtainable from the multilayered particles of the corresponding inorganic compound using a solvent exfoliation method It may be that the nanoplatelets are obtained from the multi-layered particles of the corresponding inorganic compound by the following method:
 a) suspending the multi-layered particles of the inorganic compound in a solvent to provide a suspension of the multi-layered particles of the inorganic compound;
 b) subjecting the multilayered particles of the inorganic compound in the solvent to energy to obtain a suspension of the nanoplatelets of the two-dimensional material;
 c) where the suspension obtained in step b) also comprises multilayered particles of the inorganic compound, the method optionally further comprises the step of reducing the amount of multilayered particles of the inorganic compound in the suspension.

The energy applied to convert the multi-layered particles into nanoplatelets in step (b) may be sonic energy. The sonic energy may be ultrasonic energy. It may be delivered in using a bath sonicator or a tip sonicator. Alternatively the energy may be a mechanical energy, e.g. shear force energy or grinding. The particles may be subjected to energy (e.g. sonic energy) for a length of time from 15 min to 1 week, depending on the desired proportions of the nanoplatelets (flake diameter and thickness) and thus on the desired properties of the membrane. The particles may be subjected to energy (e.g. sonic energy) for a length of time from 1 to 4 days.

The step of reducing the amount of multilayered particles in the suspension may comprise using a centrifuge. For the absence of doubt, it is within the scope of this invention that a portion of the solvent which was present for the exfoliation is removed with the multi-layered particles.

The solvent for the exfoliation step will be selected depending on the two-dimensional material and depending on the desired properties of the laminate membrane. The solvent may be selected from: water, alcohols (e.g. methanol, ethanol, isopropanol (IPA), ethylene glycol); hydrocarbons (e.g. hexane, pentane, heptane, cyclohexane), ethers (e.g. dimethylethylene glycol, diethyl ether, t-butylmethyl ether, tetrahydrofuran, dioxane); ketones (e.g. acetone, t-butylmethylketone), amides (e.g. N-methylpyrrolidine (NMP), dimethylformamide, dimethylacetamide), sulfoxides (e.g. dimethylsulfoxide), aromatic solvents (e.g. benzene, toluene), chlorinates solvents (e.g. chloroform, dichloromethane, 1,2-dichloroethane) or mixtures thereof. The solvent may be an ionic liquid. In certain particular embodiments, the solvent is NMP. In certain particular embodiments, the solvent a mixture of IPA and water. In certain particular embodiments, the solvent is IPA.

The suspension of the multi-layered particles of the inorganic compound in the solvent may comprise no other components. Thus, the suspension may consist essentially of the multi-layered particles of the inorganic compound and the solvent. The suspension may comprise residual impurities, either impurities present in the solvent or impurities present in the inorganic compound, but these impurities will typically form less than 2%, e.g. less than 1% or less than 0.1% of the total weight of the mixture.

Alternatively, the suspension may comprise surfactants. Surfactants can be used to stabilise, i.e. prevent from re-aggregating, the nanoplatelets in suspension once they are formed. Surfactants are particularly useful where the solvent is water.

The membrane may be obtained from the plurality of nanoplatelets by depositing the nanoplatelets to form the laminate membrane. The step of depositing the nanoplatelets may comprise filtering a suspension of the plurality of nanoplatelets. The suspension which is filtered may be that obtained in step b) or step c) of the method described above.

It may be that the suspension obtained in step b) or step c) of the method described above is diluted prior to filtration. The dilution may involve adding additional amounts of the same solvent as is present in the suspension or it may involve adding a different solvent to that present in the suspension obtained in step b) or step c). Thus, for example it may be that a suspension in NMP is diluted using IPA prior to filtration.

Alternatively, a solvent exchange may occur, e.g. by removing the solvent of the suspension obtained in step b) or step c) of the method described above to obtain a plurality of nanoplatelets and resuspending the nanoplatelets in a second solvent to form a second suspension that is filtered to provide the laminate membranes.

Where the plurality of nanoplatelets of which the laminate membrane is comprised is a mixture of nanoplatelets of two different materials, e.g. hBN and a TMDC or two different TMDCs, such as a mixture of $MoS_2$ and $WS_2$, it will typically be the case that the exfoliation step is conducted on separate suspension of multi-layered particles of the respective inorganic compounds and that the respective suspensions are mixed prior to the deposition (e.g. filtration step). It is within the scope of this invention however that the exfoliation step is carried out on a mixture of multi-layered particles of the respective inorganic compounds to form a suspension of a mixture of nanoplatelets of the respective two-dimensional material. Where the suspensions are mixed prior to the deposition (e.g. filtration step) it may be that the mixture is sonicated prior to deposition. This can improve the homogeneity of the mixed suspension and thus the homogeneity of the product membrane.

The filtration step can be carried out by any means familiar to those in the art. It may be that the filtration is a syringe filtration.

Where the laminate membrane is supported on a porous material, the filtration step typically involves filtration of the suspension through the porous material. Thus, the filter used in the filtration step may be any of the porous materials and membranes described in the previous section, including flexible porous materials and membranes. It is within the scope of this invention however that the laminate membrane be formed by filtration through a first porous material and then be transferred onto a second porous material. The second porous material will have the desired properties for the use to which the laminate membrane composite is intended to be put.

Where the laminate membrane comprises a polymer, the polymer is typically added to the suspension of the nanoplatelets of the two-dimensional material before the suspension is filtered. It may however be added at any stage in the process and it may be present in the suspension of multi-layered particles of the inorganic compound which is exfoliated in the exfoliation step.

Laminate membranes having a plurality of polyaromatic molecules bonded to the two-dimensional material may be formed by taking a laminate membrane formed according to the methods described previously in this section and then:

contacting a first side of the laminate membrane with a first solution comprising a first concentration of the polyaromatic molecules and contacting the second side of the laminate membrane with a second solution comprising a second concentration of the polyaromatic molecules, said second concentration being lower than said first concentration, to provide a laminate membrane having a plurality of polyaromatic molecules bonded to the two-dimensional material.

However, it is not necessarily the case that the laminate membrane is made according to the methods previously described in this section. Thus, the invention also provides a method of producing a laminate membrane having a plurality of polyaromatic molecules bonded to a two-dimensional material; the method comprising:

a) depositing the plurality of nanoplatelets of a two-dimensional material onto a porous material to form the laminate membrane supported on the porous material;

b) contacting a first side of the laminate membrane with a first solution comprising a first concentration of the polyaromatic molecules and contacting the second side of the laminate membrane with a second solution comprising a second concentration of the polyaromatic molecules, said second concentration being lower than said first concentration, to provide a laminate membrane having a plurality of polyaromatic molecules bonded to a two-dimensional material.

In the above methods, the two-dimensional material is preferably a TMDC.

The inventors have found that the best filtration results are obtained when a laminate membrane of a two-dimensional material is formed first using material that has been obtained from solvent exfoliation and the polyaromatic molecules are subsequently passed through the membrane under diffusive pressures. Membranes formed using other methods were less effective.

Thus, the invention provides a method of producing a laminate membrane of the first aspect; the method comprising:

a) obtaining the plurality of nanoplatelets of the two-dimensional material from the corresponding bulk layered inorganic material using a solvent exfoliation method;

b) depositing the plurality of nanoplatelets of the two-dimensional material to form a laminate membrane; and c) contacting a first side of the laminate membrane with a first solution comprising a first concentration of the polyaromatic molecules and contacting the second side of the laminate membrane with a second solution comprising a second concentration of the polyaromatic molecules, said second concentration being lower than said first concentration, to provide a membrane of the first aspect.

In the above discussed methods, the second solution may comprise no polyaromatic molecules.

Methods of Purification

The laminate membranes of the invention, including those obtainable or obtained by the methods described in the previous section, are particularly useful in liquid filtration processes. The laminate membranes of the invention, including those obtainable or obtained by the methods described in the previous section, may be useful in other separation techniques, e.g. vapour phase separation techniques or pervaporation.

The method of the invention may be a filtration method. Thus the method may comprise recovering the product liquid as a liquid from or downstream from the second face of the membrane without the liquid having undergone a phase change. Alternatively, the method may be a pervaporation method. Thus, the method may comprise allowing the liquid to evaporate from the second face of the membrane to form a vapour and subsequently condensing the vapour to form the product liquid.

The term "solute" applies to both ions and counter-ions, and to uncharged molecular species present in the solution. Once dissolved in a solvent a salt forms solutes comprising hydrated ions and counter-ions. The uncharged molecular species can be referred to as "non-ionic species". Examples of non-ionic species are small organic molecules such as aliphatic or aromatic hydrocarbons (e.g. toluene, benzene, hexane, etc), alcohols (e.g. methanol, ethanol, propanol, glycerol, etc), carbohydrates (e.g. sugars such as sucrose), and amino acids and peptides. Examples of other organic species include aldehydes, cyanates, isocyanates, halohydrocarbons, ketones, amines, amides, ethers, esters, aromatic compounds, heteroaromatic compounds etc. The non-ionic species may or may not hydrogen bond with water. Certain non-ionic species form ions when dissolved in certain solvents, for example, amines often form protonated ammonium ions and hydroxide counterions when dissolved in water, and such ionic species are also considered to fall within the term 'solute' and also within the term 'non-ionic'. Likewise zwitterionic species (e.g. drug molecules at or near to neutral pH) are considered to fall within the term 'solute' and also within the term 'non-ionic'. As will be readily apparent to the person skilled in the art, the term 'solute' does not encompass solid substances which are not dissolved in the aqueous mixture. Particulate matter would not be expected to pass through the membranes of the invention even if the particulate is comprised of ions with small radii.

Particularly preferred solutes for removing from solution (e.g. from water) include hydrocarbons and oils, biological material, including pathogens, dyes, organic compounds (including halogenated organic compounds, drug molecules and intermediates in the synthesis of drug molecules), complex ions, NaCl, heavy metals, ethanol, chlorates and perchlorates, and radioactive elements (e.g. radioactive uranyl ions and other waste products from the nuclear industry).

The term "hydration radius" refers to the effective radius of the molecule or ion when solvated in aqueous media.

The reduction of the amount one or more selected solutes in the solution which is treated with the laminate membrane of the present invention may entail entire removal of the selected solute or of each selected solute. Alternatively, the reduction may not entail complete removal of a particular solute but simply a lowering of its concentration. The reduction may result in an altered ratio of the concentration of one or more solutes relative to the concentration of one or more other solutes.

The liquid may be an aqueous liquid. The term 'aqueous liquid' or 'aqueous mixture' refers to any mixture of substances which comprises at least 10% water by weight. It may comprise at least 50% water by weight and preferably comprises at least 80% water by weight, e.g. at least 90% water by weight. The mixture may be a solution, a suspension, an emulsion or a mixture thereof. Typically the aqueous mixture will be an aqueous solution in which one or more solutes are dissolved in water. This does not exclude the possibility that there might be particulate matter, droplets or micelles suspended in the solution. Of course, it is expected that the particulate matter will not pass through the membranes of the invention even if it is comprised of ions with small radii.

Where the liquid is an aqueous liquid, the laminate membrane may comprise a plurality of TMDC nanoplatelets.

The liquid may be an organic liquid. The term 'organic liquid refers to any mixture of substances which comprises no more than 10% water by weight. The bulk of the weight of the organic liquid (up to 50%, e.g. up to 75% or up to 90%) will be an organic solvent. It may comprise no more than 5% water by weight, e.g. no more than 2% water by weight or no more than 1% water by weight. The mixture may be a solution, a suspension, an emulsion or a mixture thereof. Typically the organic mixture will be an organic solution in which one or more solutes are dissolved in an organic solvent. This does not exclude the possibility that there might be particulate matter, droplets or micelles suspended in the solution. Exemplary organic solvents include: alcohols (e.g. methanol, ethanol, isopropanol, ethylene glycol); hydrocarbons (e.g. hexane, pentane, heptane, cyclohexane), ethers (e.g. dimethylethylene glycol, diethyl ether, t-butylmethyl ether, tetrahydrofuran, dioxane); ketones (e.g. acetone, t-butylmethylketone), amides (e.g. N-methylpyrrolidine, dimethylformamide, dimethylacetamide), sulfoxides (e.g. dimethylsulfoxide), aromatic solvents (e.g. benzene, toluene), chlorinates solvents (e.g. chloroform, dichloromethane, 1,2-dichloroethane).

In embodiments in which the laminate membrane comprises hBN nanoplatelets, the liquid may be an organic liquid.

The solution contacts a first face or side of the membrane and purified solution is recovered from the other face or side of the membrane. Optionally, the residual solution may also be recovered from the first face or side of the membrane.

It may be that the liquid is permitted to pass though the membrane through diffusion and/or it may be that a pressure is applied and/or the liquid passes through force of gravity.

The method may involve a plurality of laminate membranes of the invention. Thus, the filtration device may comprise a plurality of laminate membranes. These may be arranged in parallel (to increase the flux capacity of the process/device) or in series (where a reduction in the amount of one or more solute is achieved by a single laminate membrane but that reduction is less than desired).

It may be that the one or more solutes the concentration of which are reduced in the methods of the invention include either: an ion and corresponding counterion in which both ions have a hydration radius that is no larger than 1 nm; or a non-ionic species having a hydration radius that is no larger than 1 nm. It may be that the one or more solutes include either: an ion and corresponding counterion in which both ions have a hydration radius that is no larger than 0.75 nm; or a non-ionic species having a hydration radius that is no larger than 0.75 nm. It may be that the one or more solutes include either: an ion and corresponding counterion in which both ions have a hydration radius that is no larger than 0.6 nm; or a non-ionic species having a hydration radius that is no larger than 0.6 nm. It may be that the one or more solutes include either: an ion and corresponding counterion in which both ions have a hydration radius that is no larger than 0.45 nm; or a non-ionic species having a hydration radius that is no larger than 0.45 nm. It may be that the one or more solutes include either: an ion and corresponding counterion in which both ions have a hydration radius that is no larger than 0.40 nm; or a non-ionic species having a hydration radius that is no larger than 0.40 nm.

The concentration of the one or more solutes in the product liquid may be reduced by 25% or more relative to the concentration in the starting liquid. The concentration of the one or more solutes in the product liquid may be reduced by 50% or more relative to the concentration in the starting liquid. The concentration of the one or more solutes in the product liquid may be reduced by 80% or more relative to the concentration in the starting liquid. The concentration of the one or more solutes in the product liquid may be reduced by 90% or more relative to the concentration in the starting liquid. The concentration of the one or more solutes in the product liquid may be reduced by 95% or more relative to the concentration in the starting liquid.

Previously described TMDC membranes, those produced via chemical exfoliation, have exhibited only poor rejection percentages for smaller solutes, e.g. those having a radius of hydration less than 1 nm. The membranes of the invention, on the other hand have been shown to achieve good rejection rates even for relatively small solutes, e.g. those having a radius of hydration less than 1 nm.

The membranes of the invention typically reject solutes based on their size with larger ions being rejected in preference to smaller solutes. However, it has been observed that, where two solutes of a similar size but differing charges are present in the solution, the laminate membranes can selectively reject one solute more than the other. This has been observed in particular where two cations of similar size but differing charge are present.

Thus it may be that the method is a method of preferentially reducing the amount of a first solute in a liquid relative to the amount of a second solute in the liquid to produce a product liquid which is depleted in said first solute but less depleted in said second solute; wherein the first solute has a hydration radius which is in the range from 25% to 125% of the hydration radius of the second solute; and the first set of solutes has a different charge to the second set of solutes.

Typically, the first solute has a higher charge than the second solute. Thus, it may be that the first solute is an ion and the second solute is a non-ionic molecule. It may be that the first solute is a positive ion and the second solute is a non-ionic molecule. It may be that the first solute is a negative ion and the second solute is a non-ionic molecule. It may be that the first solute is a negative ion and the second solute is a negative ion with a lower negative charge. It may be that the first solute is a positive ion and the second solute is a positive ion with a lower positive charge. The first and second solutes may each be cations.

It may be that the first solute has a hydration radius which is in the range from 80% to 120% of the hydration radius of the second solute. It may be that the first solute has a hydration radius which is in the range from 85% to 115% of the hydration radius of the second solute. It may be that the first solute has a hydration radius which is in the range from 90% to 110% of the hydration radius of the second solute. It may be that the first solute has a hydration radius which is in the range from 95% to 105% of the hydration radius of the second solute.

When seeking to separate non-ionic solutes (e.g. drug molecules, other organic solvents) from a solvent (either water or an organic solvent), it is possible to use both membranes with polyaromatic molecules bonded to the two-dimensional material and membranes without polyaromatic molecules bonded to the two-dimensional material.

When seeking to separate small solutes from a solvent (either water or an organic solvent), e.g. those having a hydration radius less than 5 Å, it is preferable possible to use a membrane having polyaromatic molecules bonded to the two-dimensional material. This applies particularly to ionic solutes.

BRIEF DESCRIPTION OF THE DRAWINGS

Embodiments of the invention are further described hereinafter with reference to the accompanying drawings, in which.

Figure 19A:
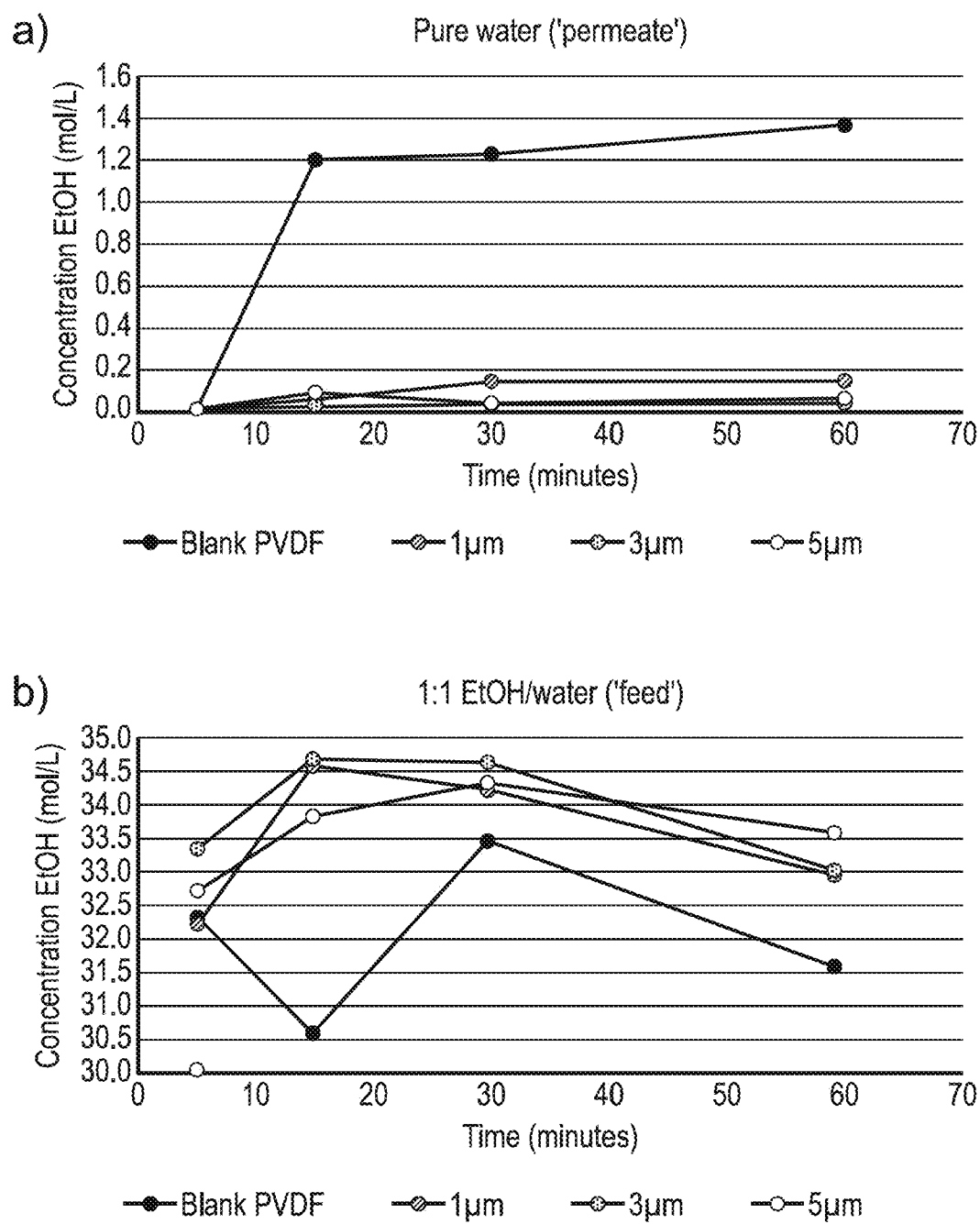
Figure 19B:
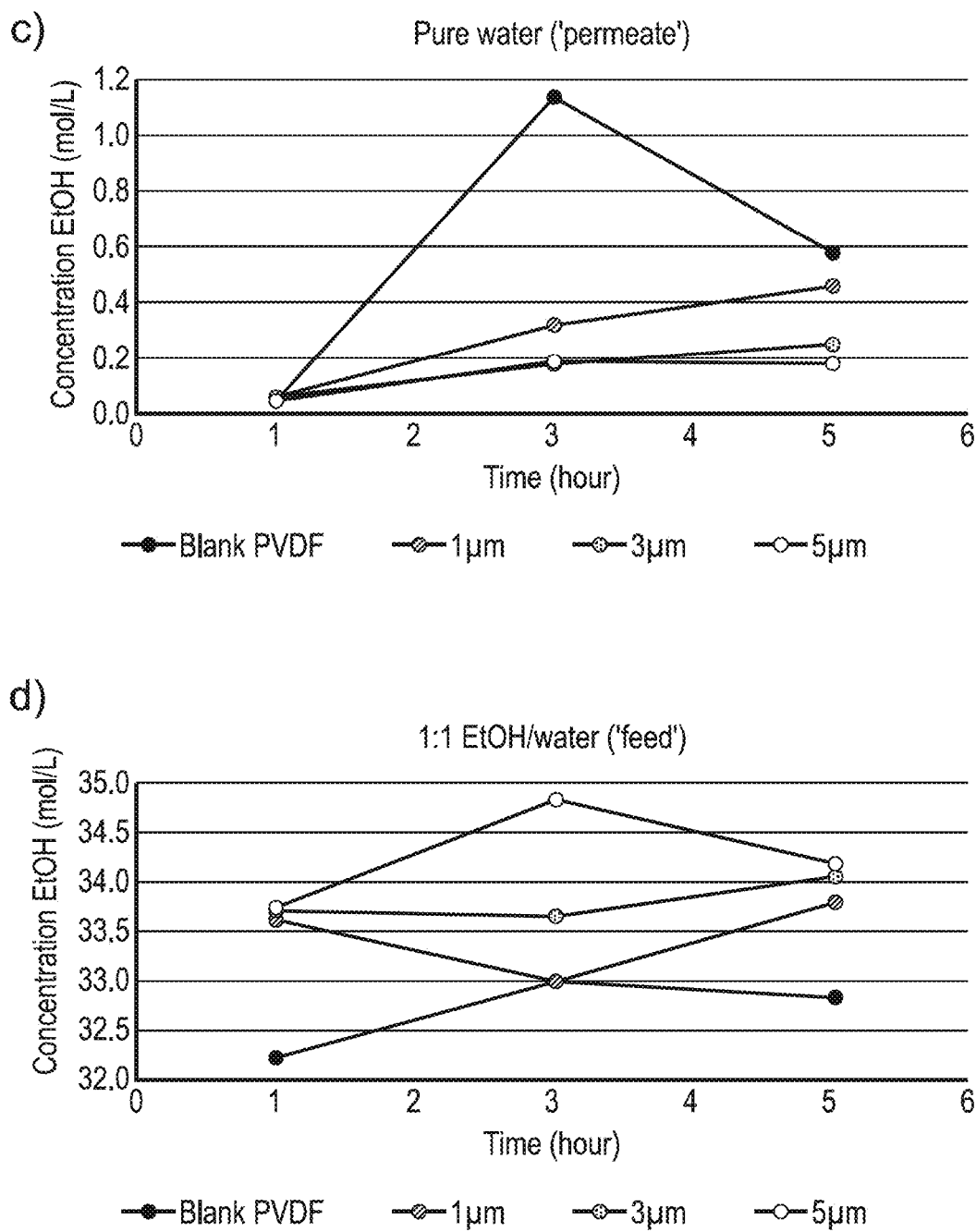

FIGS. 19A and 19B show: a) the concentration of EtOH passed into the 'permeate' side for each membrane over 1 hour; b) concentration of EtOH remaining in the 'feed' side for each membrane over 1 hour; c) concentration of EtOH passed through into the 'permeate' side for each membrane over 1-5 hours; d) concentration of EtOH remaining in the 'feed' side for each membrane between 1-5 hours.

Figure 20:
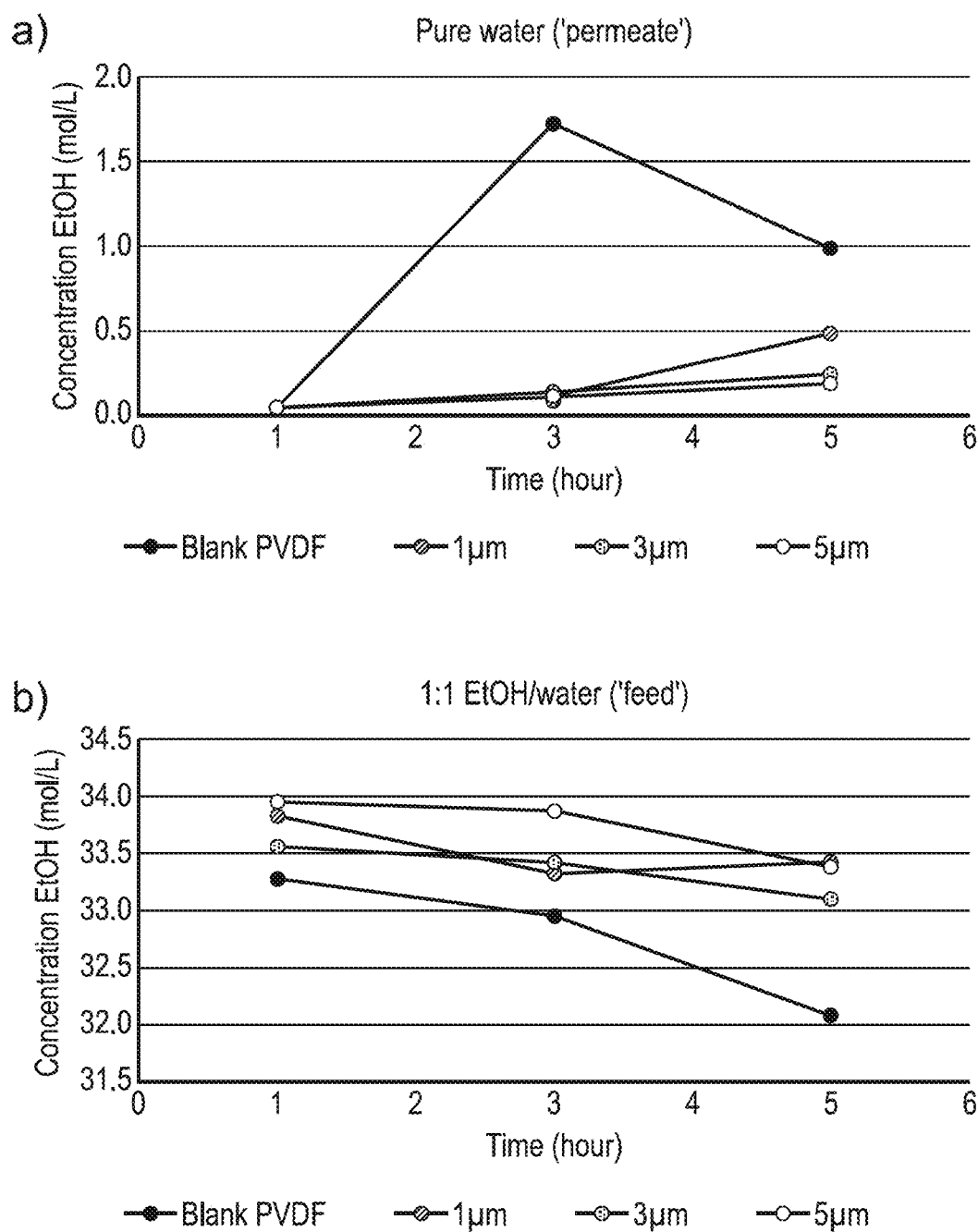

FIG. 20 shows the EtOH/water separation results using MoS$_2$ membranes functionalised with crystal violet dye: a) Shows the concentration of ethanol passed through the functionalised MoS$_2$ membranes ('permeate' side), up to 5 hours; b) Shows the concentration of ethanol remaining in the 'feed' side, for the functionalised MoS$_2$ membranes, up to 5 hours.

Figure 21A:
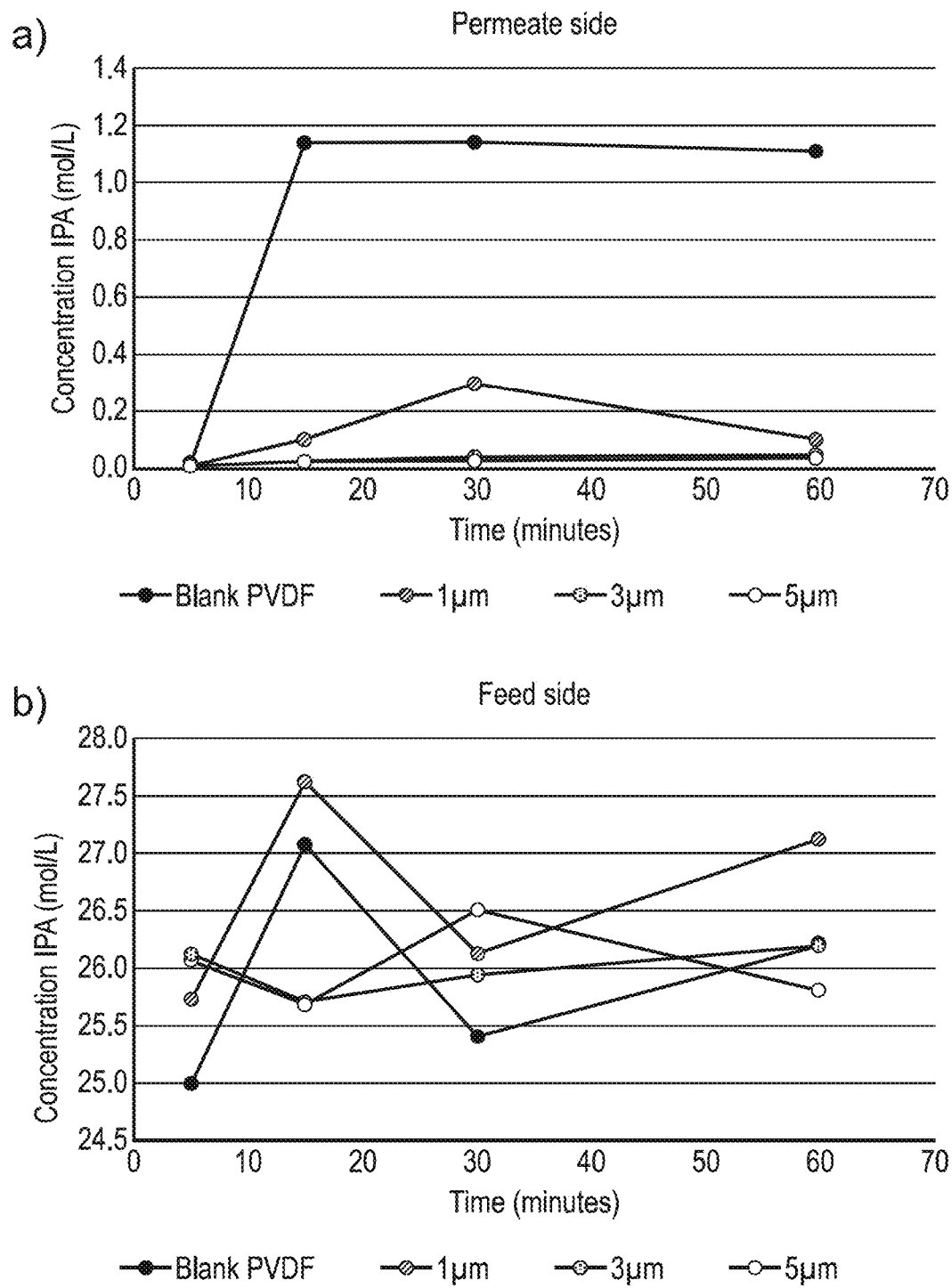

FIGS. 21A and B show the separation of IPA/water mixtures through 1 μm, 3μμ, 5μμ MoS$_2$ membranes and blank PVDF membrane: a) concentration of IPA passed through into the 'permeate' side for each membrane over 1 hour; b) concentration of IPA remaining in the 'feed' side for each membrane over 1 hour; c) concentration of IPA passed through the 'permeate' side for each membrane between 1-5 hours; d) concentration of IPA remaining in the 'feed' side for each membrane over between 1-5 hours.

Figure 22:
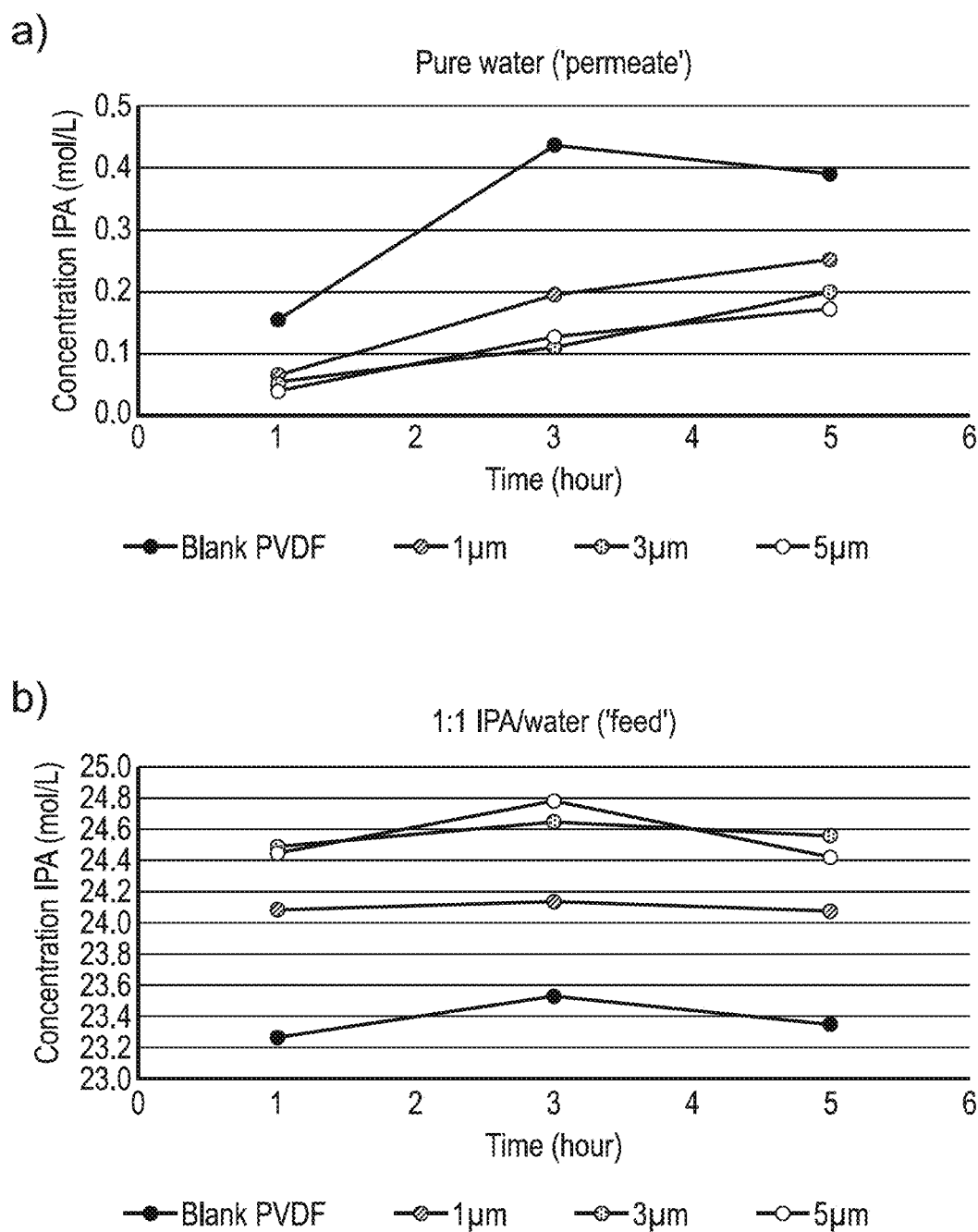

FIG. 22 shows the IPA/water separation results using MoS$_2$ membranes functionalised by crystal violet dye, with MoS$_2$ thicknesses of 1 μm, 3 μm and 5 μm compared against a blank PVDF membrane. a) Shows the IPA concentrations present in the permeate side after 5 hours of stirring, for each membrane; b) Shows the IPA concentrations present in the feed side after 5 hours of stirring, for each membrane.

Figure 23:
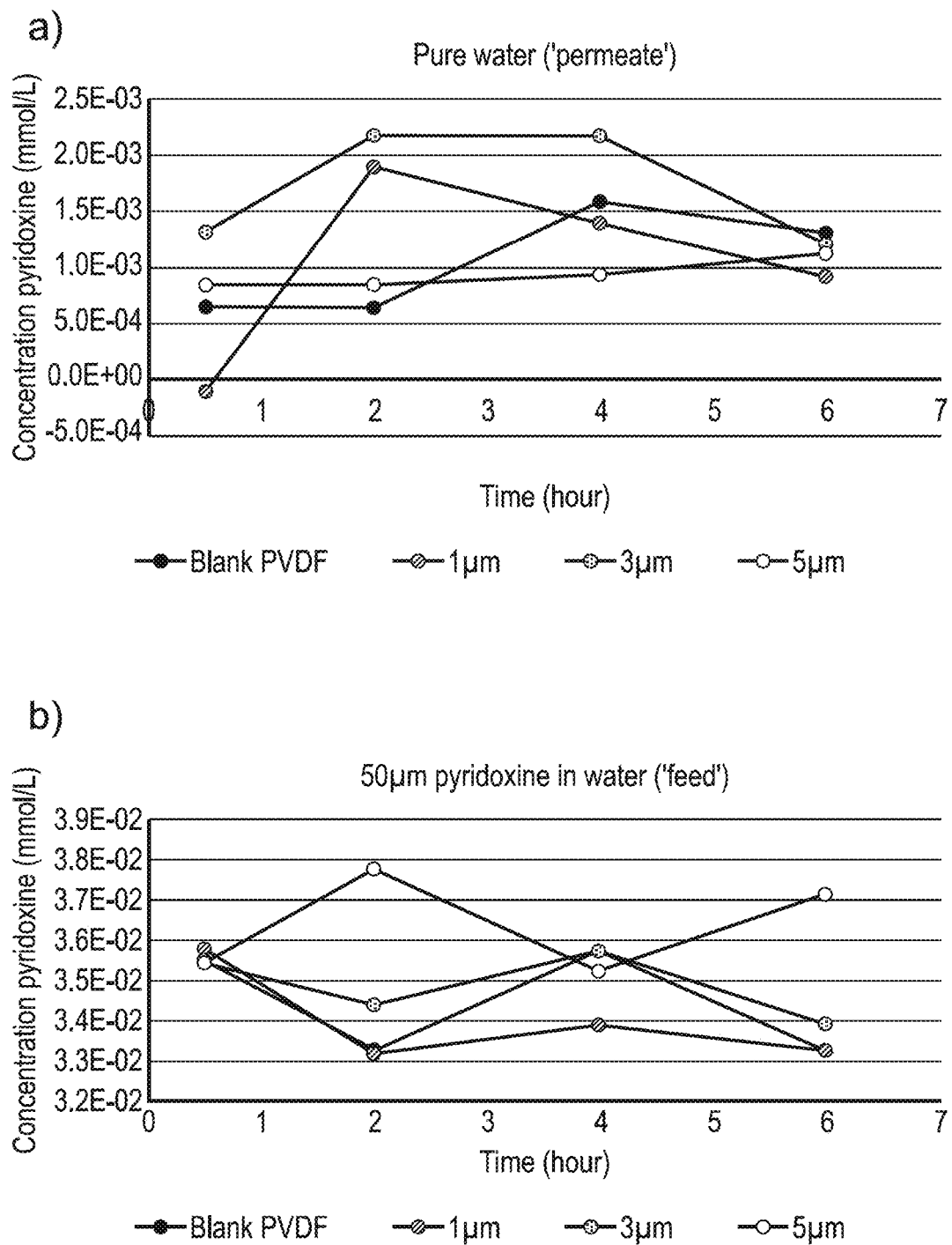

FIG. 23 shows the pyridoxine/water separation results obtained after 6 hours; a) Shows the pyridoxine concentration in the 'permeate' side after 6 hours for all membrane experiments; b) Shows the pyridoxine concentration in the 'feed' side after 6 hours for all membrane experiments

DETAILED DESCRIPTION

Throughout this specification, the term 'two dimensional material' refers to nanoplatelets of TMDCs, hBN and mixtures thereof of which the laminate membrane is comprised. Thus, the term 'two dimensional material' encompasses mixtures of WS$_2$ and MoS$_2$.

Nanoplatelets may be single or few layered particles of the respective inorganic layered material.

The term 'two-dimensional' may mean a compound in a form which is so thin that it exhibits different properties than the same compound when in bulk. Not all of the properties of the compound will differ between a few-layered particle and a bulk compound but one or more properties are likely to be different. Typically, two-dimensional inorganic compounds are in a form which is single- or few layers thick, i.e. up to 10 molecular layers thick. A two-dimensional crystal of a layered material (e.g. an inorganic compound or graphene) is a single or few layered particle of that material. The terms 'two-dimensional' and 'single or few layered' are used interchangeably throughout this specification. Two-dimensional materials are not truly two dimensional, but they exist in the form of particles which have a thickness that is significantly smaller than their other dimensions. The term 'two-dimensional' has become customary in the art.

The term 'few-layered particle' may mean a particle which is so thin that it exhibits different properties than the same compound when in bulk. Not all of the properties of the compound will differ between a few-layered particle and a bulk compound but one or more properties are likely to be different. A more convenient definition would be that the term 'few layered' refers to a crystal that is from 2 to 9 molecular layers thick (e.g. 2 to 5 layers thick). A molecular layer is the minimum thickness chemically possible for that compound. In the case of boron-nitride one molecular layer is a single atom thick. In the case of the transition metal dichalcogenides (e.g. MoS$_2$ and WS$_2$), a molecular layer is three atoms thick (one transition metal atom and two chalcogen atoms). Thus, few-layer particles crystals are generally less than 50 nm thick, depending on the compound and are preferably less than 20 nm thick, e.g. less than 10 or 5 nm thick.

The term 'multi-layered particle' refers to a particle which exhibits similar properties to the same compound when in bulk. A more convenient definition would be that the term 'multi-layered particle' refers to a particle that is 10 or more molecular layers thick.

The 'inorganic compounds' referred to in this specification are inorganic layered compounds. Thus, the term 'inorganic compound' refers to any compound made up of two or more elements which forms layered structures in which the bonding between atoms within the same layer is stronger than the bonding between atoms in different layers. Many examples of inorganic layered compounds have covalent bonds between the atoms within the layers but van der Waals bonding between the layers. For the absence of doubt, the term 'inorganic layered compound' is not intended to encompass graphene or other carbon based two-dimensional materials (e.g. graphene oxide, reduced graphene oxide, partially oxidised graphene).

Many inorganic compounds exist in a number of allotropic forms, some of which are layered and some of which are not. For example boron nitride can exist in a layered graphite-like structure (hexagonal boron nitride or hBN) or as a diamond-like structure in which the boron and nitrogen atoms are tetrahedrally orientated. For the absence of doubt, it is hexagonal boron nitride that is referred to throughout this specification.

TMDCs are structured such that each layer of the compound consists of a three atomic planes: a layer of transition metal atoms (for example Mo, Ta, W . . . ) sandwiched between two layers of chalcogen atoms (for example S, Se or Te). Thus in one embodiment, the TMDC is a compound of one or more of Mo, Ta and W with one or more of S, Se and Te. There is strong covalent bonding between the atoms within each layer of the transition metal chalcogenide and predominantly weak Van der Waals bonding between adjacent layers. Exemplary TMDCs include NbSe$_2$, WS$_2$, MoS$_2$, TaS$_2$, PtTe$_2$, VTe$_2$.

The solutes to be removed from solution in the methods of the present invention may be defined in terms of their hydrated radius. Below are the hydrated radii of some exemplary ions and molecules.

TABLE 1

| Ion/molecule | Hydrated radius (Å) | Ion/molecule | Hydrated radius (Å) |
| --- | --- | --- | --- |
| K$^+$ | 3.31 | Li$^+$ | 3.82 |
| Cl$^-$ | 3.32 | Rb$^+$ | 3.29 |
| Na$^+$ | 3.58 | Cs$^+$ | 3.29 |
| CH$_3$COO$^-$ | 3.75 | NH$_4^+$ | 3.31 |
| SO$_4^{2-}$ | 3.79 | Be$^{2+}$ | 4.59 |
| AsO$_4^{3-}$ | 3.85 | Ca$^{2+}$ | 4.12 |
| CO$_3^{2-}$ | 3.94 | Zn$^{2+}$ | 4.30 |

TABLE 1-continued

| Ion/molecule | Hydrated radius (Å) | Ion/molecule | Hydrated radius (Å) |
|---|---|---|---|
| $Cu^{2+}$ | 4.19 | $Ag^+$ | 3.41 |
| $Mg^{2+}$ | 4.28 | $Cd^{2+}$ | 4.26 |
| propanol | 4.48 | $Al^{3+}$ | 4.80 |
| glycerol | 4.65 | $Pb^{2+}$ | 4.01 |
| $[Fe(CN)_6]^{3-}$ | 4.75 | $NO_3^-$ | 3.40 |
| sucrose | 5.01 | OH– | 3.00 |
| $(PTS)^{4-}$ | 5.04 | $H_3O^+$ | 2.80 |
| $[Ru(bipy)_3]^{2+}$ | 5.90 | Br– | 3.30 |
| $Tl^+$ | 3.30 | I– | 3.31 |
| $[UO_2]^{2-}$ | 4.7 | | |

The hydrated radii of many species are available in the literature. However, for some species the hydrated radii may not be available. The radii of many species are described in terms of their Stokes radius and typically this information will be available where the hydrated radius is not. For example, of the above species, there exist no literature values for the hydrated radius of propanol, sucrose, glycerol and $PTS^{4-}$. The hydrated radii of those species which are provided in the table above have been estimated using their Stokes/crystal radii. To this end, the hydrated radii for a selection of species in which this value was known can be plotted as a function of the Stokes radii for those species and this yields a simple linear dependence. Hydrated radii for propanol, sucrose, glycerol and $PTS^{4-}$ were then estimated using the linear dependence and the known Stokes radii of those species.

There are a number of methods described in the literature for the calculation of hydration radii. Examples are provided in 'Determination of the effective hydrodynamic radii of small molecules by viscometry'; Schultz and Soloman; The Journal of General Physiology; 44; 1189-1199 (1963); and 'Phenomenological Theory of Ion Solvation'; E. R. Nightingale. J. Phys. Chem. 63, 1381 (1959).

There are a variety of methods available for the exfoliation of bulk samples of TMDC and hBN to form nanoplatelets (Wang, Q. H.; Kalantar-Zadeh, K.; Kis, A.; Coleman, J. N.; Strano, M. S., Electronics and Optoelectronics of Two-Dimensional Transition Metal Dichalcogenides. Nat. Nanotechnol. 2012, 7, 699-712; Huang, X.; Zeng, Z.; Zhang, H., Metal Dichalcogenide Nanosheets: Preparation, Properties and Applications. Chem. Soc. Rev. 2013, 42, 1934-1946; Nicolosi, V.; Chhowalla, M.; Kanatzidis, M. G.; Strano, M. S.; Coleman, J. N., Liquid Exfoliation of Layered Materials. Science 2013, 340; Koski, K. J.; Cui, Y., The New Skinny in Two-Dimensional Nanomaterials. ACS Nano 2013, 7, 3739-3743). The methods can be broadly categorised into three classes: mechanical exfoliation, solvent exfoliation and chemical exfoliation.

Mechanical Exfoliation

Atomically thin flakes of TMDCs can be peeled from their bulk crystals by micromechanical cleavage using adhesive tape and then applied to target substrates, using the same techniques that were developed for graphene. Mechanical exfoliation typically produces single-crystal flakes of high purity and cleanliness that are ideal for fundamental characterization and for fabrication of individual devices. However, this method is not considered to be suitable for large scale production does not provide control over flake thickness and size.

Solution Exfoliation

TMDCs can also be exfoliated by ultrasonication or grinding in appropriate liquids for extended periods of time (~2-12 hours), including organic solvents, aqueous surfactant solutions, or solutions of polymers in solvents. Typically, ultrasonication results in the mechanical exfoliation of layered crystals to give flakes that are a few hundred nanometres in size and vary in thickness down to monolayer. The exfoliated flakes are stabilized against re-aggregation through interactions with the solvent molecules. Thus the solvent is typically carefully chosen to produce high quality dispersed flakes of sufficient stability. This method has the highest degree of scalability combined with low costs of manufacture.

Solution exfoliation techniques are the preferred methods for producing nanoplatelets for use in forming the membranes of this invention and membranes for use in the methods of this invention.

Chemical Intercalation

It is also possible to exfoliate many TMDCs into solution by intercalation of ionic species. The typical procedure involves submerging bulk TMDC powder in a solution of a lithium-containing compound (n-butyllithium) for extended periods of time (>1 day) to allow lithium ions to intercalate. This is then followed by exposing the intercalated material to water, usually with added brief sonication. The water reacts vigorously with the lithium between the layers to evolve $H_2$ gas, which rapidly separates the layers. It is also possible to achieve this by electrochemical Li intercalation at room temperature over a relatively short (6 hours) time scale. Such chemical exfoliation methods produce gram quantities of submicron-sized monolayers, but the resulting exfoliated material differs structurally and electronically from the parent material. In particular, for $MoS_2$ the process changes the electronic structure of the exfoliated nanosheets from semiconducting to metallic, and the Mo atom coordination is changed from trigonal prismatic ($2H—MoS_2$) to octahedral ($1T-MoS_2$).

Thus, throughout this specification, the term 'solvent exfoliation' is intended to mean any exfoliation technique in which the layers of the multi-layered particles are cleaved by being subjected to energy in a solvent without prior activation of the multi-layered particles. The term specifically excludes techniques in which chemical species are intercalated between the layers of the multi-layered particles prior to the exfoliation step. The term 'chemical exfoliation' is intended to mean any exfoliation technique in which the layers of the multi-layered particles are cleaved using a method that involves the intercalation of chemical species between the layers prior to the exfoliation step.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

EXAMPLES

Example 1—Formation and Characterisation of Membranes of Inorganic 2-D Crystals

Figure 1:
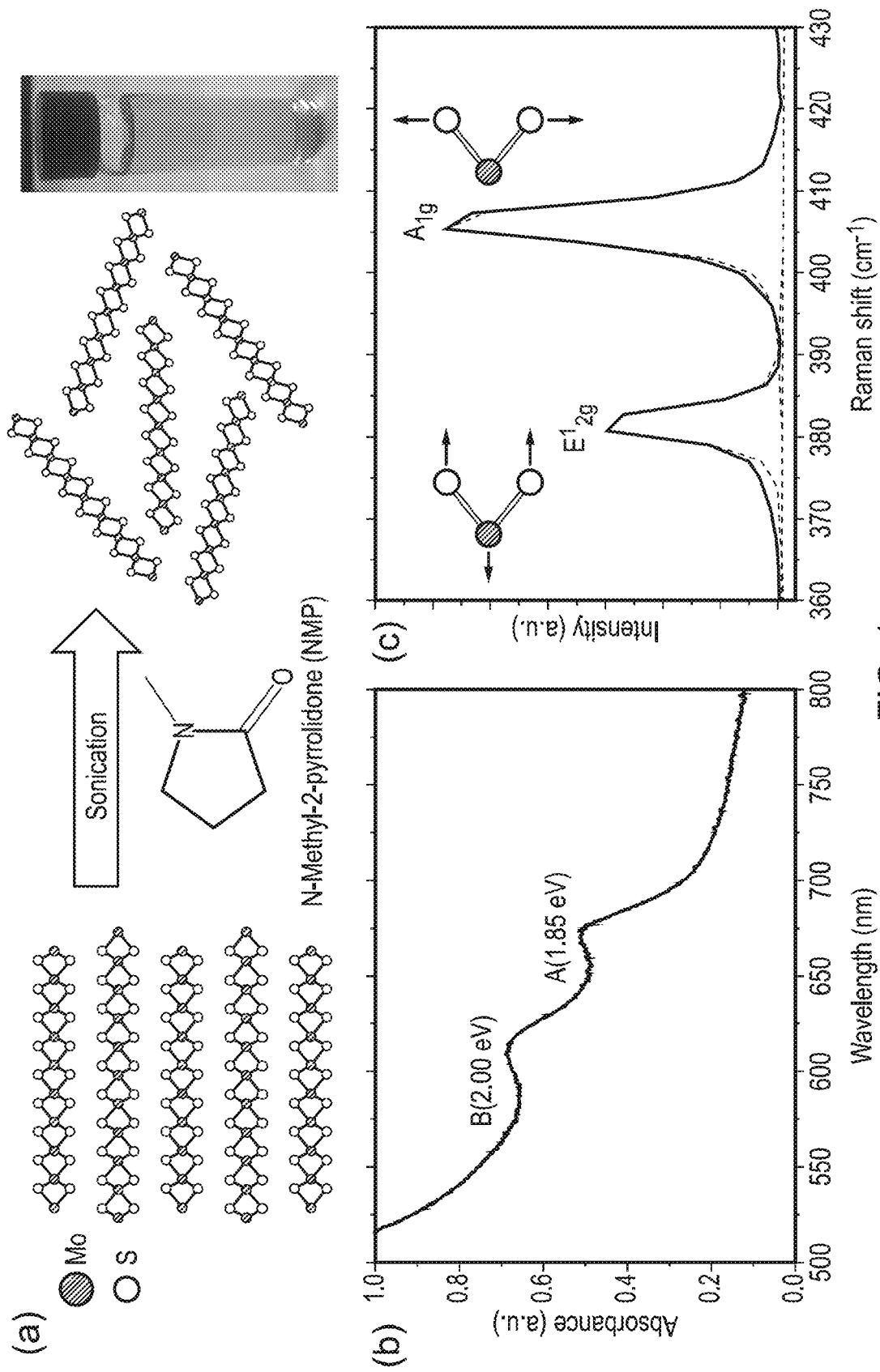
FIG. 1 shows: a) a schematic showing the exfoliation procedure; b) optical absorbance spectroscopy of resultant $MoS_2$ nanoflakes dispersed in NMP after centrifugation; and c) the Raman spectrum of an individual $MoS_2$ nanoflake after deposition onto a $Si/SiO_2$ wafer for identification.

Solvent stabilised dispersions of inorganic 2D crystals were produced by ultrasonication of commercially available bulk TMDCs ($MoS_2$, $MoSe_2$, $WS_2$, $WSe_2$, $TiS_2$), as well as hexagonal boron nitride (hBN), in various solvents. Typically, $MoS_2$ is dispersed in either N-Methyl-2-pyrrolidone (NMP) or a mixture of isopropanol/water (IPA/$H_2O$) (7:3) at a concentration of 10 mg/ml and then exfoliated by bath ultrasonication for 12 hours (37 kHz, 40% amplitude, 25° C.). For hBN pure IPA was used for the exfoliation. After this sonication, the dispersions were centrifuged at 6000 rpm (3139 g) for 30 min to remove any unexfoliated material, the supernatant was then decanted and fresh solvent added before repeating the centrifugation to ensure a narrow distribution of flake dimensions and thicknesses. Similar dispersions were created using solution exfoliated graphene as a comparison and for the creation of composites. Once a stable and homogenous dispersion was created, the concentration of dispersed nanoflakes was determined by optical spectroscopy. FIG. 1 shows schematically the procedure of the exfoliation method used, as well as the characterisation of the subsequently produced $MoS_2$ nanoflakes. These results show that after exfoliation the resultant flakes are few layered (1-3 layers in thickness).

TMDC based filtration Membranes were produced by either using the IPA/$H_2O$ dispersions as prepared or by first diluting the NMP dispersed flakes in IPA by a factor of ~20 and then filtering the dispersion through various supporting filtration membranes, typically a polyvinylidene fluoride (PVDF) membrane with a pore size of 0.1 μm, using a syringe pump. Typically, a volume of ~20-60 ml of the diluted dispersions are used to create the membrane with a thickness ranging from ~1 to 10 μm. During filtration the flakes in the dispersion are tightly stacked together to form a coherent 'paper' which is supported by the PVDF filter. Composite membranes consisting of various mixtures of exfoliated 2D crystals (e.g $MoS_2$/graphene, $MoS_2$/$WS_2$, graphene/hBN etc.) were created by simply mixing the dispersions of each individual material in differing ratios and briefly sonicating to ensure a homogenous distribution before filtration as for the 'pure' membranes.

Using the methodology described in the previous two paragraphs, the following membranes have been produced: $MoS_2$, $WS_2$, $MoSe_2$, $WSe_2$, $TiS_2$, $Bi_2Te_3$, Graphene, hBN, $MoS_2$/Graphene (1:1), $MoS_2$/Graphene (1:3), $MoS_2$/Graphene (3:1), $MoS_2$/$WS_2$ (1:1) and Graphene/hBN (1:1)

Figure 2:
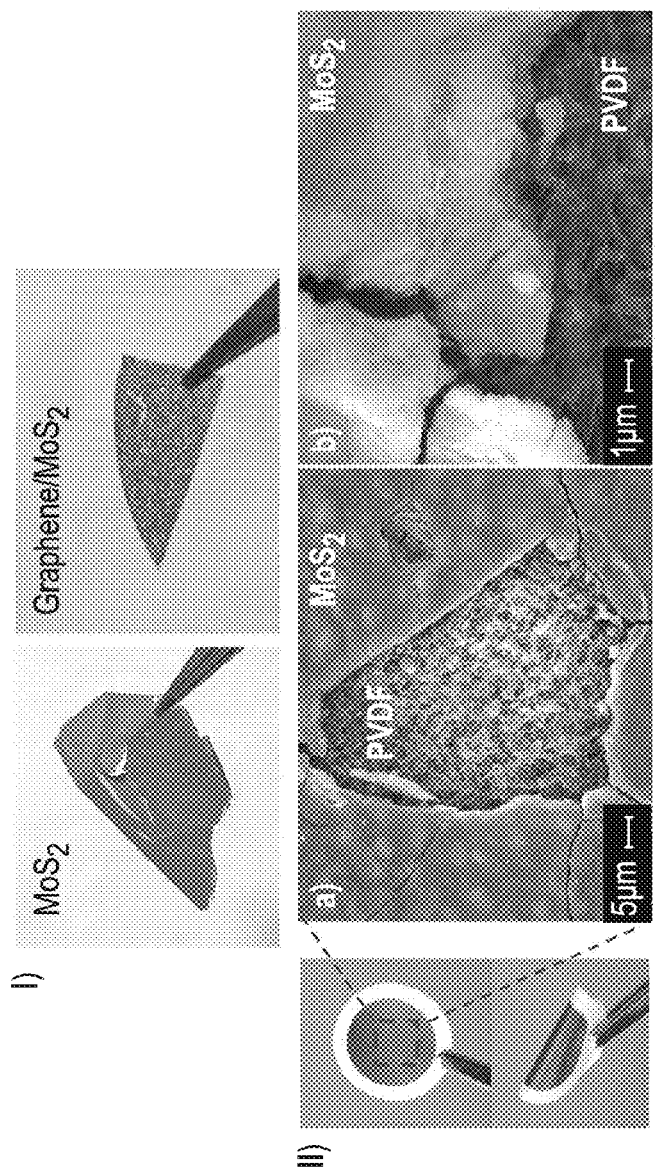
FIG. 2 shows: I) photographs showing freestanding TMDC ($MoS_2$) and composite (graphene/$MoS_2$) membranes after removal from the supporting membrane; and II) photographs showing $MoS_2$ membranes supported by PVDF filters along with SEM images showing the morphology of the TMDC 'paper'.

FIG. 2 shows examples of the freestanding membranes created by peeling the TMDC 'paper' off the supporting filter as well as the membranes created by leaving on the supporting PVDF filter. The SEM analysis shows that the individual nanoflakes stack closely together horizontally to form a continuous film. Individual nanoflakes are several hundreds of nanometers in lateral dimensions up to ~1 μm. The film in FIG. 2 was intentionally damaged to allow for imaging of the internal structure.

Figure 3:
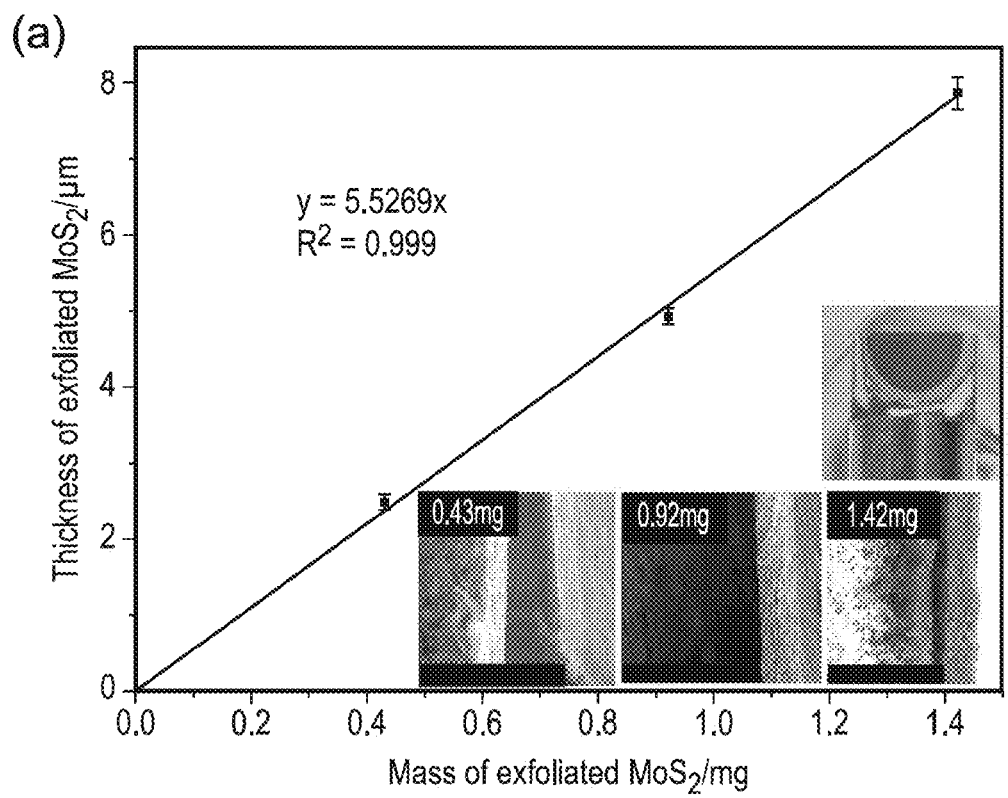
FIG. 3 shows: a) a thickness calibration curve of exfoliated $MoS_2$ based PVDF membrane, (b-c) cross section and (e-f) top down.
Figure 3:
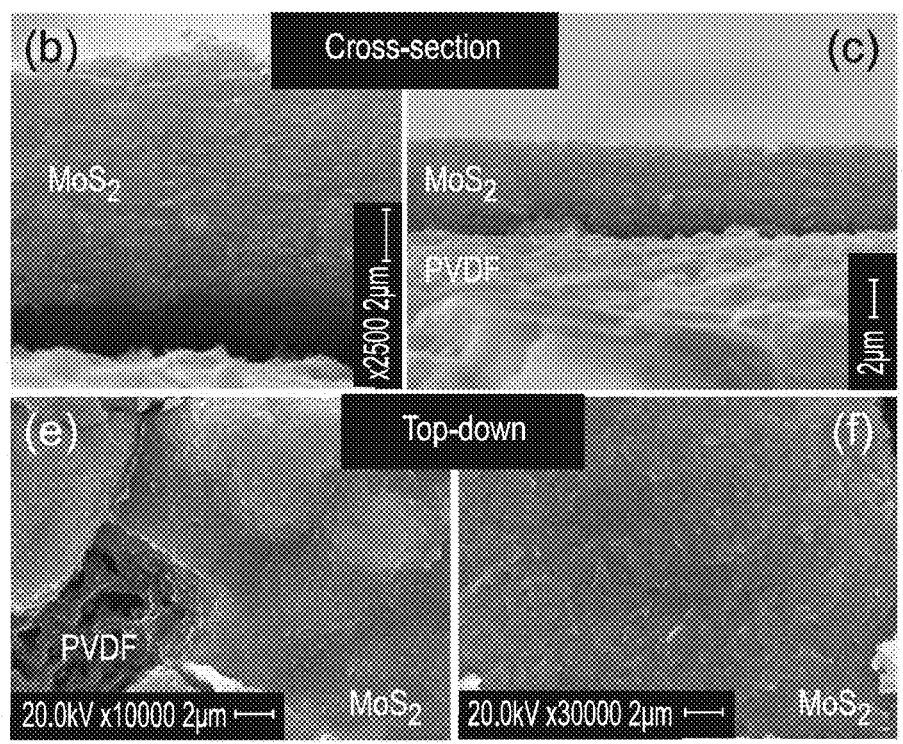

FIG. 3(a) shows thickness calibration curve of $MoS_2$ at three different mass (Table 1). The thicknesses were measured by SEM as shown in FIG. 3(a). The membrane was cut by the surgical blade in the middle membrane and attached on SEM cross-section stub. This calibration equation was used to make different thickness membranes that were 1, 3, 5, and 12 μm. The $MoS_2$ cross-section were shown in the straight line in FIG. 3(b-c). The lateral $MoS_2$ were determined by top-down SEM images ca. 200-300 nm as shown in FIG. 3(e-f).

TABLE 1

The thickness of exfoliated $MoS_2$ based PVDF membrane.

| Mass exfoliated $MoS_2$ based on PVDF/mg | Thickness/μm |
|---|---|
| 0 | 0 |
| 0.43 | 2.50 ± 0.04 |
| 0.92 | 4.95 ± 0.09 |
| 1.42 | 7.90 ± 0.20 |

Figure 4:
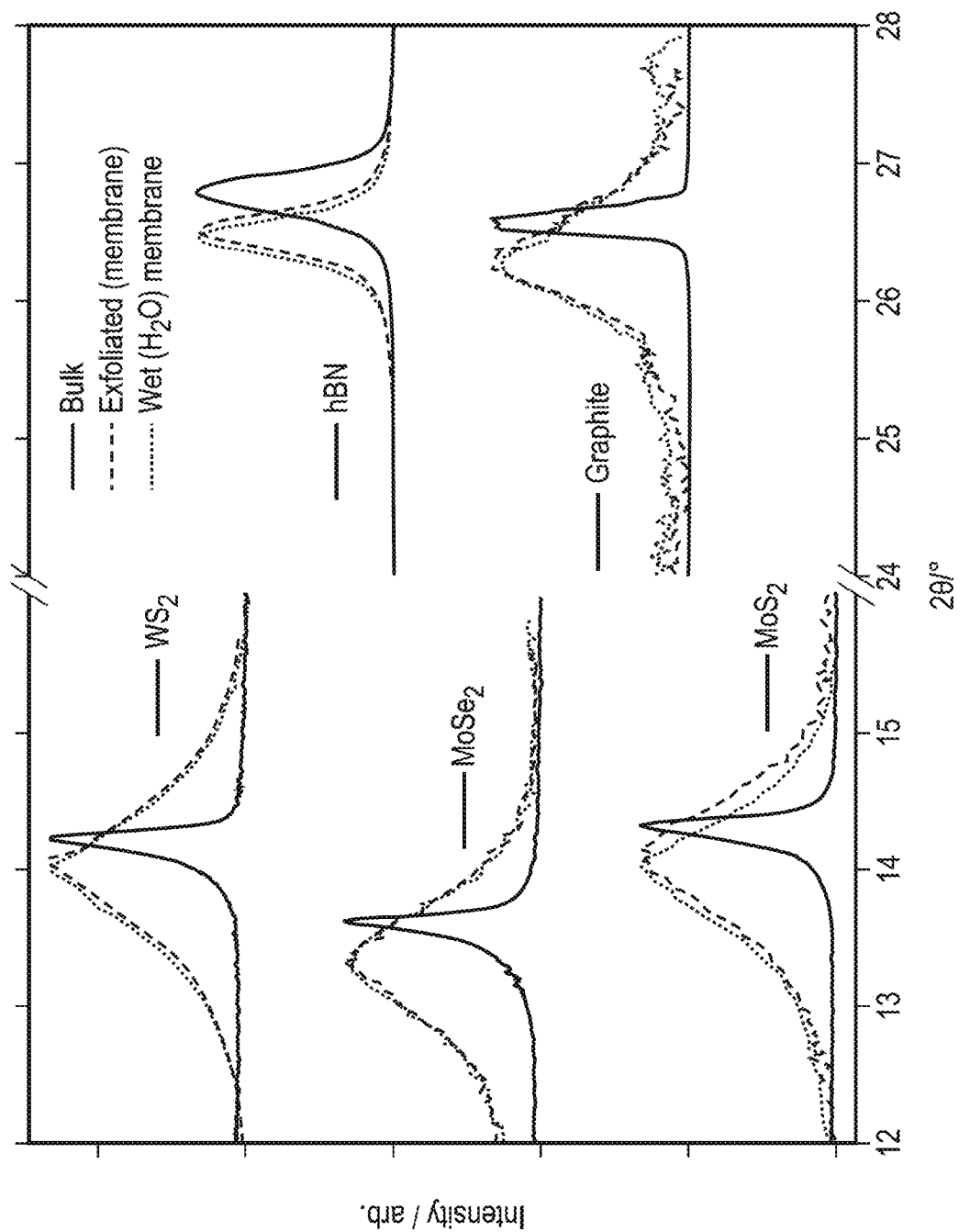
FIG. 4 shows the XRD patterns for the bulk starting materials before exfoliation (solid line), as well as for the exfoliated materials after filtration and formation of the membrane (dashed line), and also the pattern when the membrane is soaked in water for an extended period of time (~7 days) (dotted line).

X-Ray diffraction (XRD) can also be used to determine the interlayer spacing and subsequently the size of ions which are predicted to pass through. This allows us to accurately predict the size exclusion properties of these membranes and of the composites. FIG. 4 shows the XRD patterns for the bulk starting materials before exfoliation (solid), as well as for the exfoliated materials after filtration and formation of the membrane (dashed line), and also the pattern when the membrane is soaked in water for an extended period of time (~7 days) (dotted line). Typically used GO membranes suffer from significant swelling due to their hydrophilicity which makes the interlayer spacing increase significantly when wet, while this gives them a high water flux this makes them only useful for removal of large species (>0.9 nm). As seen in FIG. 4 the TMDC membranes do not suffer from any swelling when exposed to water for long periods of time, meaning that their dry interlayer spacing is approximately equivalent to that when in use for water filtration. This is one of the reasons why they are able to much more effectively sieve out smaller ionic species.

Figure 5:
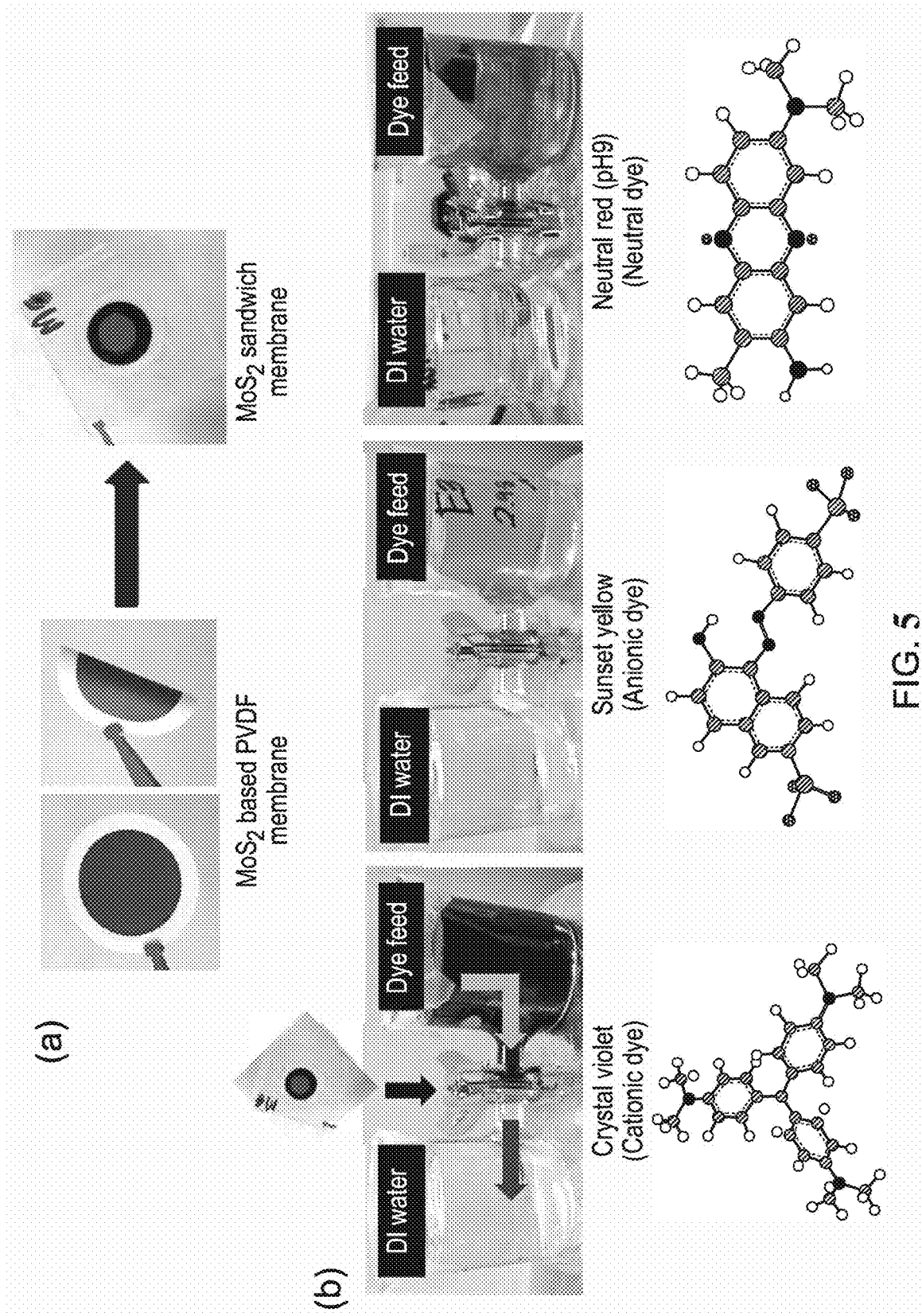
FIG. 5 shows (a) a photograph of $MoS_2$ based PVDF membrane and sandwich membrane. (b) a photograph of homemade H-beaker for $MoS_2$ sandwich membrane functionalised by CV (left image), SY (middle image), and NR (right image) representing to cationic, anionic, and neutral dyes, respectively, with their molecular structures.

Example 2—Formation and Characterisation of Membranes of Inorganic 2-D Crystals Functionalised by Dye Molecules A dispersion of $MoS_2$ in isopropanol and water (1:1 ratio) was filtered onto PVDF membrane using a programmable syringe pump as shown in FIG. 5(a). Significantly, the $MoS_2$ based PVDF membrane can be folded without a reduction in performance of the $MoS_2$ membranes. This suggests that the flakes are not damaged by folding. This membrane was supported by a double side of polyethylene terephthalate (PET) with a controlled area of ~26.9×10$^{-6}$ m$^2$ attached by adhesive glue to form the $MoS_2$ sandwich membrane.

The $MoS_2$ sandwich membrane was inserted into a H-beaker using two O-rings and supported with a spherical joint clip. Crystal violet, Sunset yellow, and Neutral red were used as cationic, anionic, and neutral dyes, respectively, to functionalise the $MoS_2$ membrane. For each, 50.0 mL of 0.1 mM aqueous solution dyes were prepared as a feed side, and 50.0 mL of DI water as permeate side.

The concentration of dyes in both feed and permeate sides were determined by UV-vis spectrophotometry every several days for 21 days. The molar extinction coefficients of dyes are 87,000 $M^{-1}cm^{-1}$ at 590 nm for CV, 22,200 $M^{-1}cm^{-1}$ at 482 nm for SY, and 13,900 $M^{-1}cm^{-1}$ at 482 nm for NR (the base form). All membranes in the H-beaker were cleaned for a week using ultra-pure water with hydrostatic pressure to remove residual dyes inside the membranes.

Figure 6:
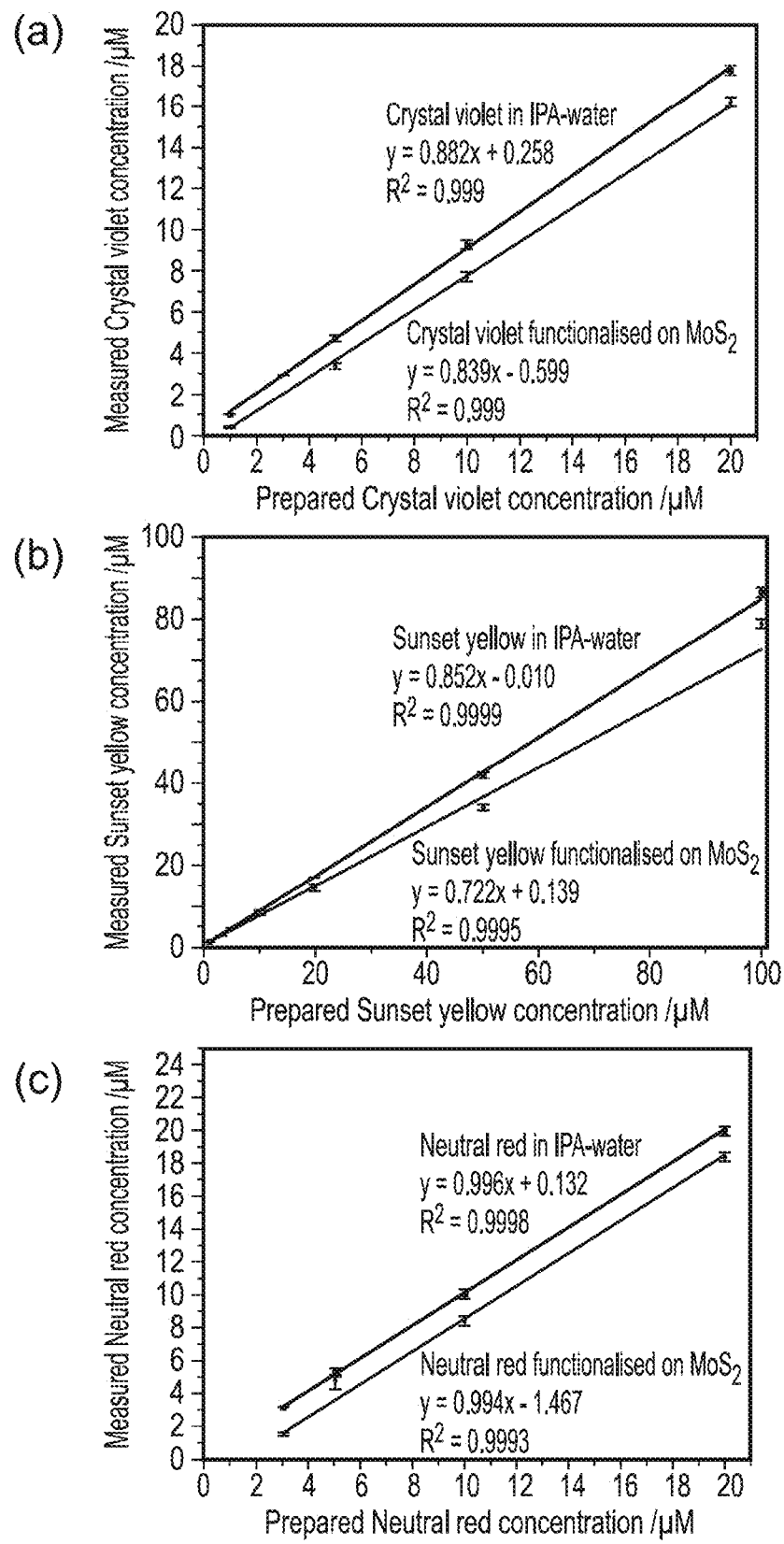
FIG. 6 shows the determination concentration of dyes functionalised on $MoS_2$ by the measurement of the lost absorbance of dyes mixing with dispersion of $MoS_2$ compared to absorbance of pure dyes dissolved in IPA-water (volume ratio 1:1). The dyes functionalized on $MoS_2$ were: (a) Crystal violet, (b) Sunset yellow, and (c) Neutral red compared to the pure dyes dissolved into IPA-water. In each case the pure dye dissolved in IPA is the upper line and the dye functionalized on the $MoS_2$ is the lower line.

The concentration of the dyes functionalised on $MoS_2$ was determined by measuring lost absorbance of dyes mixing with dispersion of $MoS_2$ compared to absorbance of pure dyes dissolved in IPA-water (volume ratio 1:1) as same as the dispersion of $MoS_2$ as shown in FIG. 6(a-c).

The mass of dyes functionalised on $MoS_2$ were shown in Table 2. The saturated amount of dyes that attaches to the surface of the $MoS_2$ dispersion was determined to be 30, 160, and 24 μg per 1 mg of $MoS_2$ respectively for CV, SY, and NR.

TABLE 2

The saturated mass of Crystal violet, Sunset yellow, and Neutral red functionalised on $MoS_2$ at different concentrations

| Prepared dyes concentration/μM | Mass of dyes (μg) per 1 mg of $MoS_2$ | | |
|---|---|---|---|
| | Crystal violet (pH 7) | Sunset yellow (pH 7) | Neutral red (pH 10) |
| 1 | 11.0 | 1.7 | |
| 3 | — | 2.8 | 24.1 |
| 5 | 24.1 | 8.0 | 8.6 |
| 10 | 29.4 | 22.2 | 24.7 |
| 20 | 29.4 | 47.4 | 24.0 |
| 50 | | 152.8 | |
| 100 | | 159.2 | |
| Saturated dyes on $MoS_2$ | ~30 | ~160 | ~25 |

Powder X-Ray Diffraction Spectroscopy

Powder X-ray diffraction (PXRD) patterns of the $MoS_2$, bulk form and after exfoliation to form membranes as well as after dyes functionalisation, were obtained using a PANalytical X'Pert X-ray diffractometer. Using a Cu-Kα radiation source operating at 40 kV and 30 mA the patterns were records whilst spinning in the range 2θ=5–45°, with a step size of 0.017 and a scan step time of 66 s. The position of the (002) peak was used to calculate d-spacing of the materials according to Bragg's law:

$$d = \frac{\lambda}{2\sin\theta}$$

where λ is the wavelength of the radiation source (0.15418 nm) and θ is half the position of the (002) peak. All X-ray patterns were corrected using PVDF at the 2θ of 20.17° as a reference peak.

Figure 8:
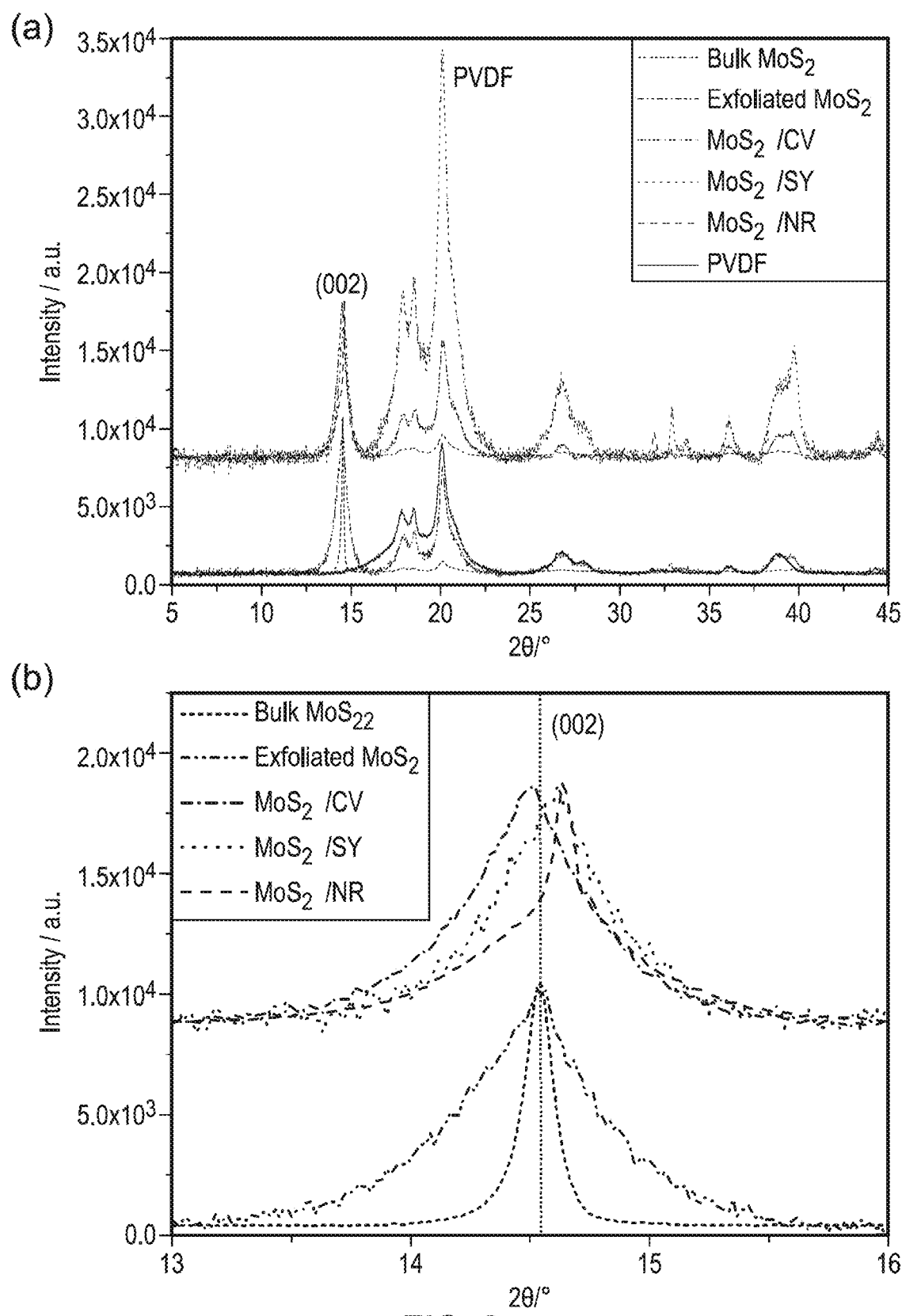
FIG. 8 shows: (a) Full PXRD of $MoS_2$ with PVDF (black solid line), $2\theta=20.17°$, used as reference peak position. (b) PXRD of the (002) peak position of the materials.

The X-ray patterns of $MoS_2$ with PVDF membrane as supporter are shown in FIG. 8(a). FIG. 8(b) shows (002) peak position of bulk (black line) and after exfoliation (green line). It is clearly seen that the (002) peak after exfoliation is significantly broader with slightly bigger d-spacing compared to bulk form. This increased layer spacing can be explained the $MoS_2$ flakes were restacking misorientations during filtration, as well as the untrasonication process which reduces the size from several microns to a few hundreds of nm. These would lead to increase of average layer spacing of $MoS_2$. Moreover, PXRD pattern at (002) of $MoS_2$ with dyes kept in water media to conserve the nano-channel in $MoS_2$ after functionalisation were shown in FIG. 8b. $MoS_2$ functionalised by dyes shows peak position as similar as pristine $MoS_2$ indicating that $MoS_2$ sandwich membrane did not undergo any significant swelling in water over 6 months Raman and X-Ray Photoelectron Spectroscopy of Exfoliated $MoS_2$ Functionalised by Crystal Violet, Sunset Yellow, and Neutral Red.

Figure 7:
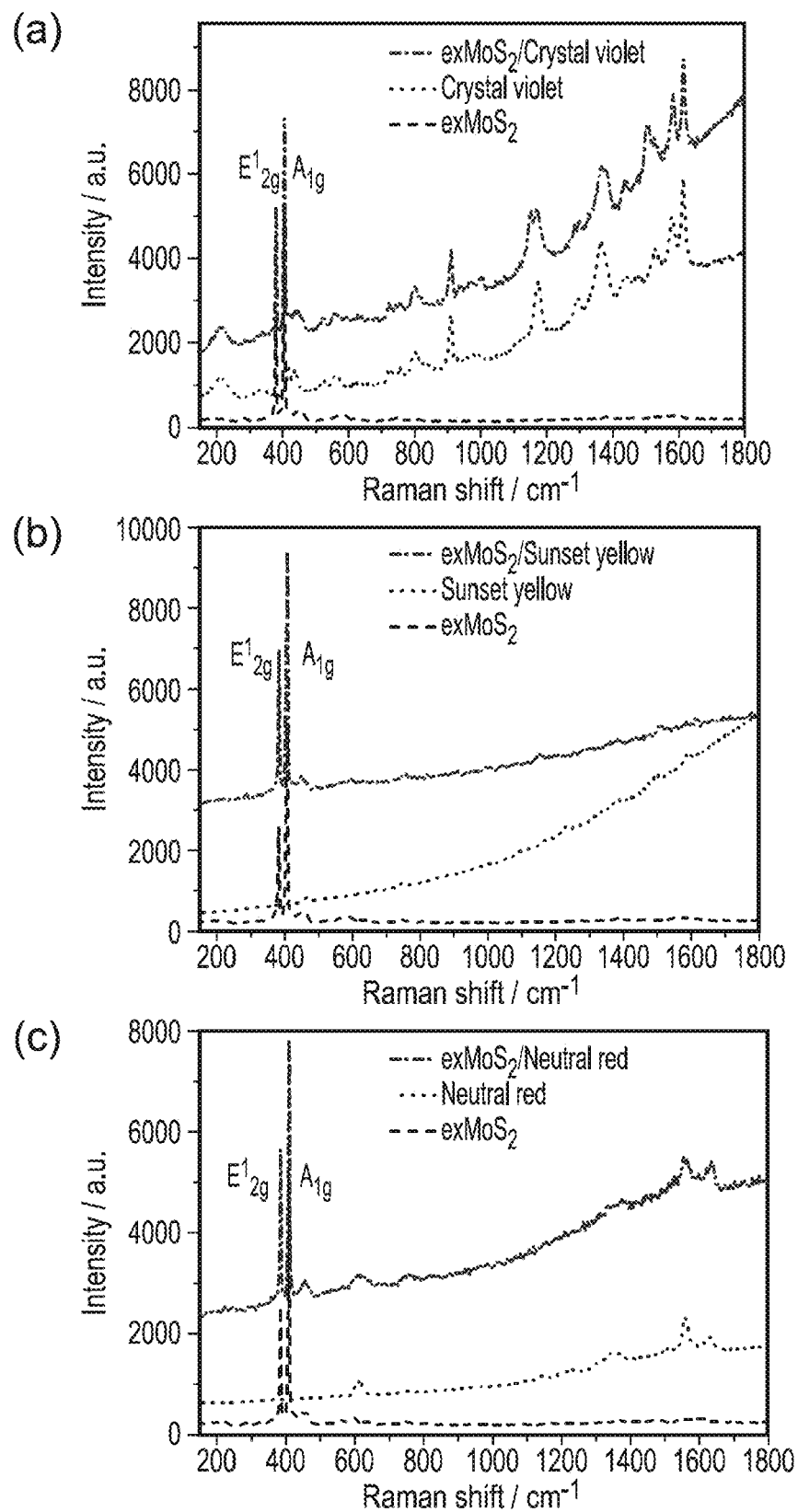
FIG. 7 shows (a) Raman spectra of $MoS_2$, CV, and $MoS_2$ functionalised by CV. (b) Raman spectra of $MoS_2$, SY, and $MoS_2$ functionalised by SY. (c) Raman spectra of $MoS_2$, NR, and $MoS_2$ functionalised by NR. In each case, the lower line is $MoS_2$; the middle line is CV, SY or NR, respectively; and the upper line is the dye functionalized $MoS_2$.

Raman spectra of $MoS_2$ functionalised by Crystal violet, Sunset yellow, and Neutral red is shown in FIG. 7(a-c, upper line) compare to Raman spectra of pre-functionalised $MoS_2$ and three type of dyes. The Raman shift of Sunset yellow and Neutral red molecules functionalised on $MoS_2$ were similar to pure those dyes as shown in FIG. 7(b and e). Interestingly, in FIG. 7(a) in $MoS_2$ functionalised by Crystal violet (upper line) shows a new splitting peak around 1900 $cm^{-1}$ compared to pure crystal violet (middle line). This shows that the vibration of Crystal violet had changed as somehow of the interaction between $MoS_2$ and Crystal violet (e.g. the formation of a new covalent bond between nitrogen atom in crystal violet and Mo atoms that allow the new electron resonances in Crystal violet molecules).

To understand this chemical functionalisation mechanism, Raman and X-ray photoelectron spectroscopies were utilised to analyse the pristine and dye treated $MoS_2$ membranes. FIG. 8a compares the Raman spectra of the pristine $MoS_2$ membrane, with the characteristic $E_{2g}$ and $A_{1g}$ $MoS_2$ peaks labelled, the raw dye (CV) powder, and the functionalised $MoS_2$ membrane ($MoS_2$/CV). Clearly we can see that the characteristic peaks for the CV are present on the functionalised membrane. This Raman analysis was performed after the functionalised membrane has undergone multiple cleaning treatments with water and has been submerged in multiple aqueous solutions for prolonged periods of time (>6 months), indicating that the dye functionalisation is robust and not simply an adsorption reaction. This is supported by the XPS analysis shown in FIG. 8b-c which shows a dramatic difference in the $Mo_{3d}$ peak after functionalisation. The change in the spectrum corresponds to a significant increase in the amount of octahedral ($Mo^{4+}$) co-ordinated molybdenum atoms, and indicates that the CV molecules have become covalently attached to the molybdenum within the membrane. This is also seen by shifts due to charge transfer in the sulphur peaks and changes in the $Mo_{3p}$ region, as well as presence of bonded nitrogen atoms ($N_{1s}$) from the structure of CV itself. This shows a new peak binding energy between Mo 3p and N1s around 395.8 eV compared Mo 3p from pre-functionalised $MoS_2$. Furthermore, $MoS_2$/SY samples show peak shifts which indicate a change of vibration of SY on $MoS_2$.

Figure 9A:
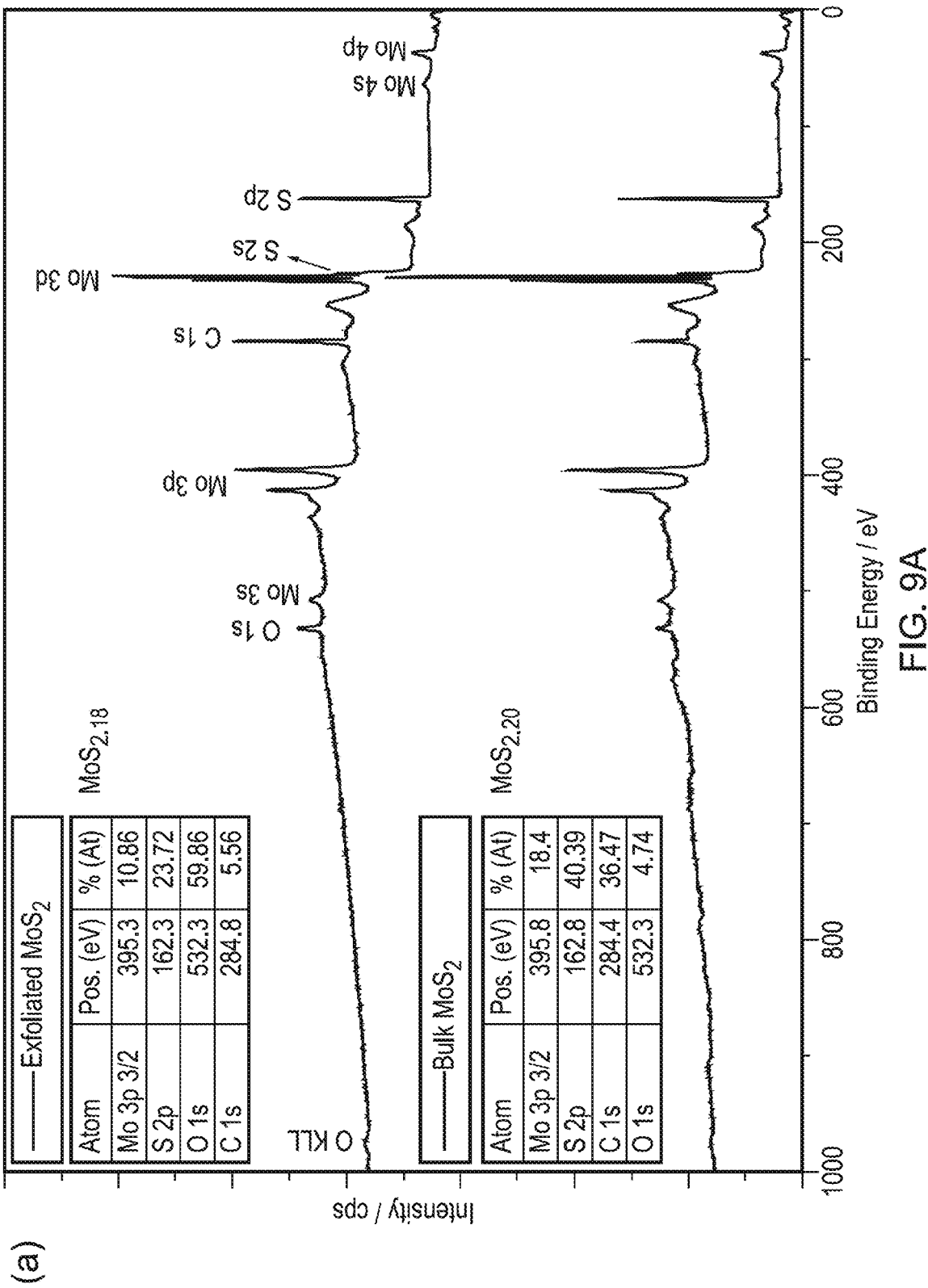
FIGS. 9A and 9B show (a) XPS scan analysis of exfoliated and bulk $MoS_2$. High-resolution XPS spectra showing Mo 3d, 3p, and S 2p shells of (b, d, f) exfoliated $MoS_2$ and bulk (c, e, g) bulk $MoS_2$. Each of the fitting peaks is labelled with corresponding orbital, as well as the binding energy in the parentheses.
Figure 9A:
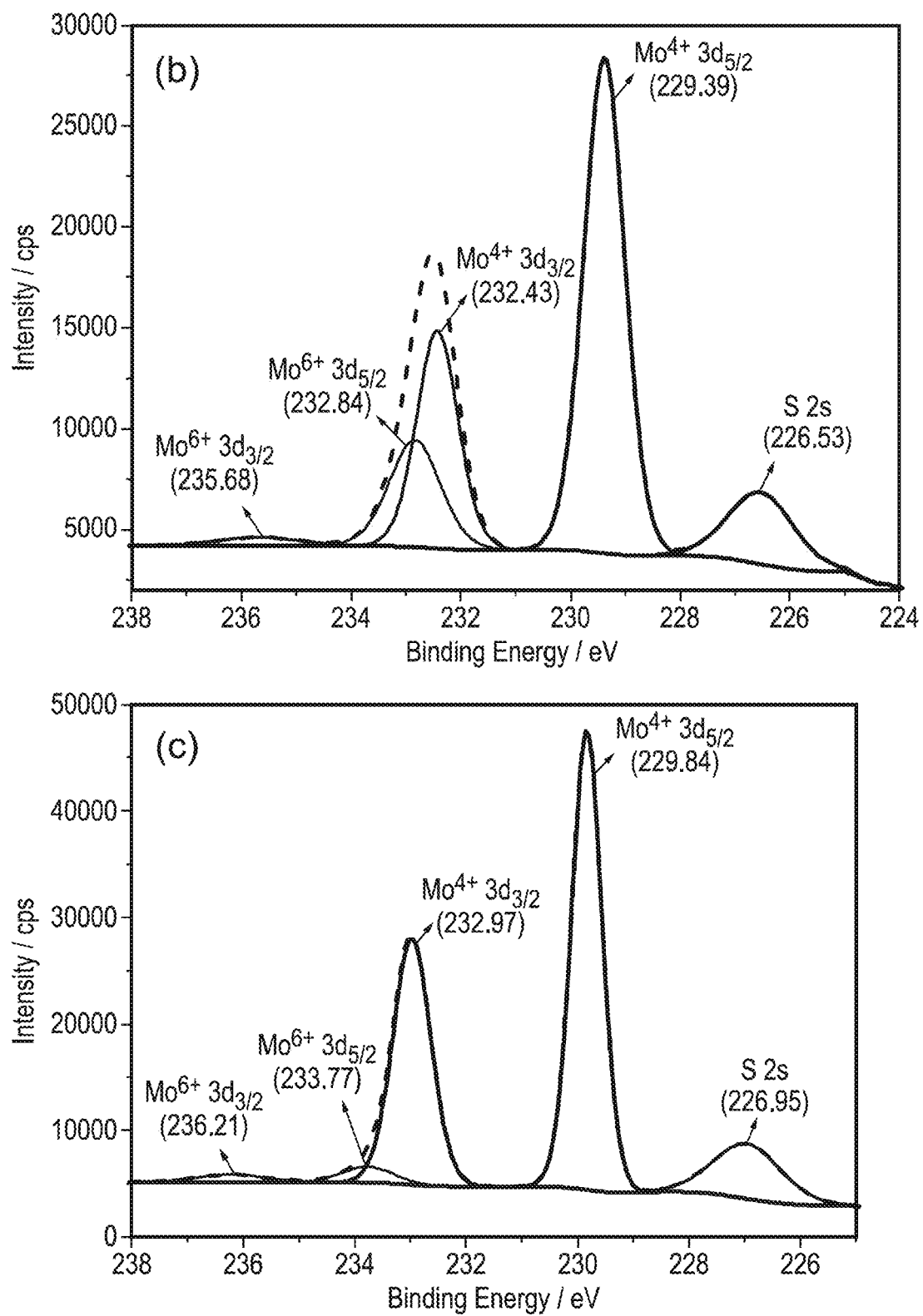
Figure 9B:
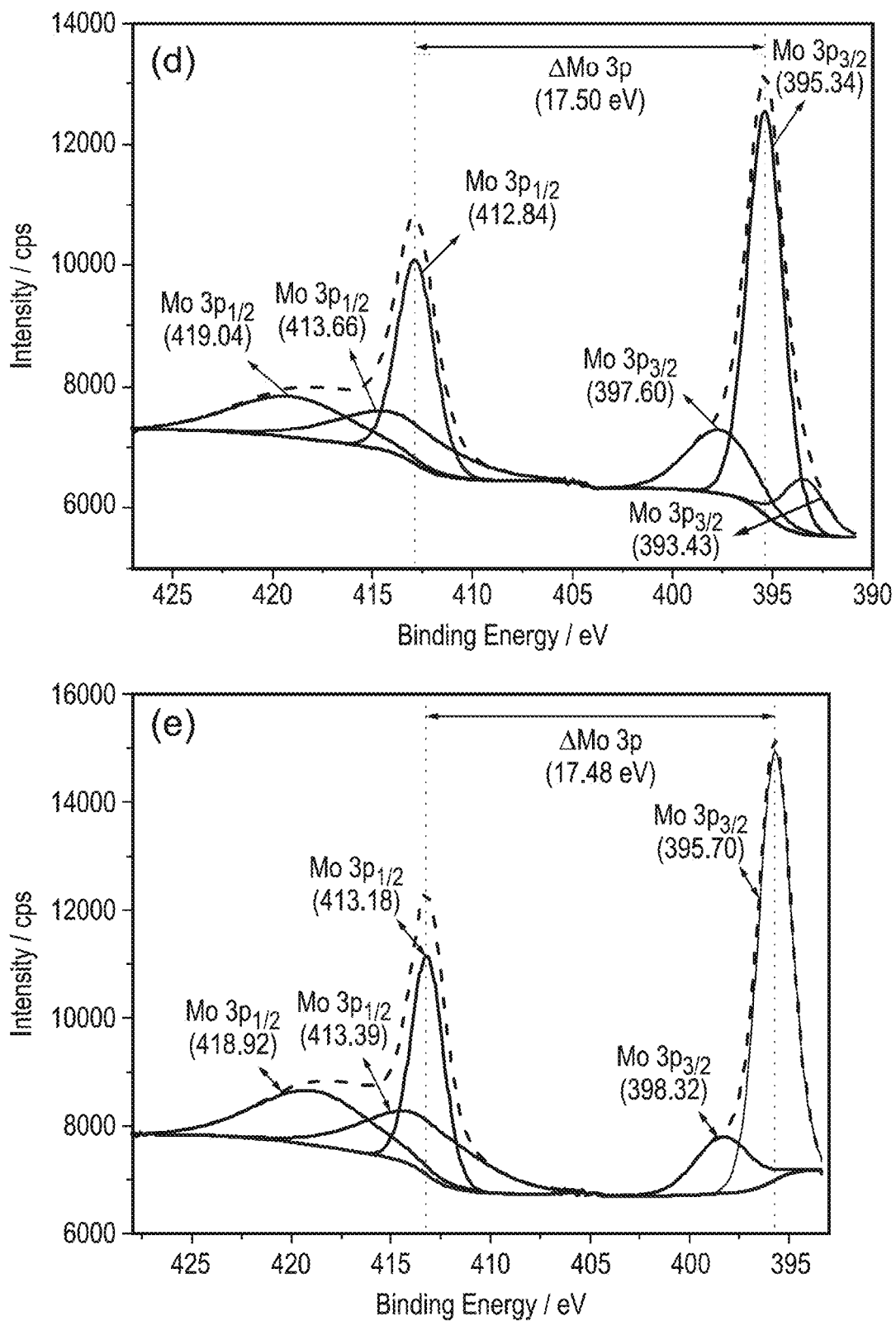
Figure 9B:
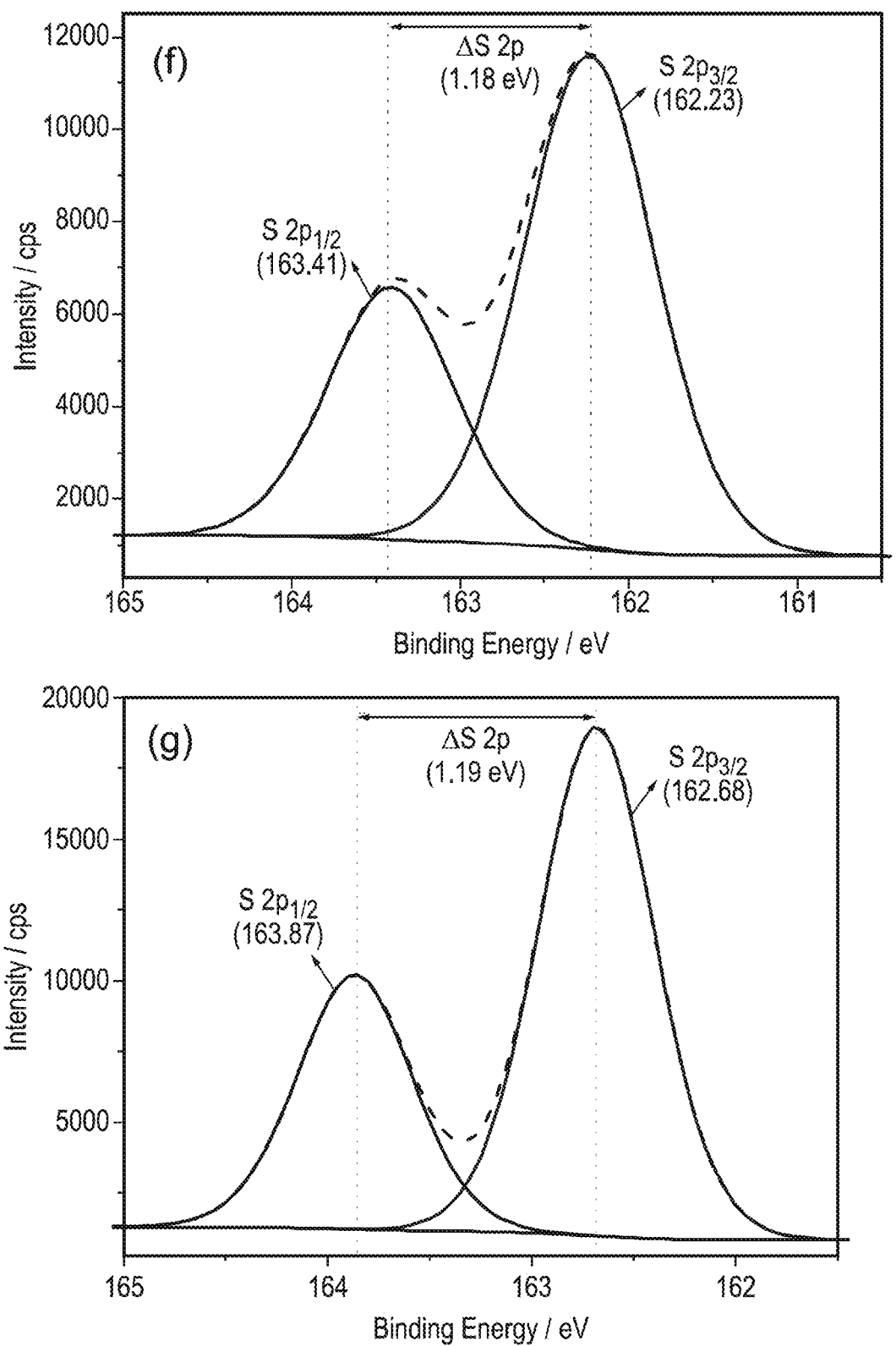
Figure 10A:
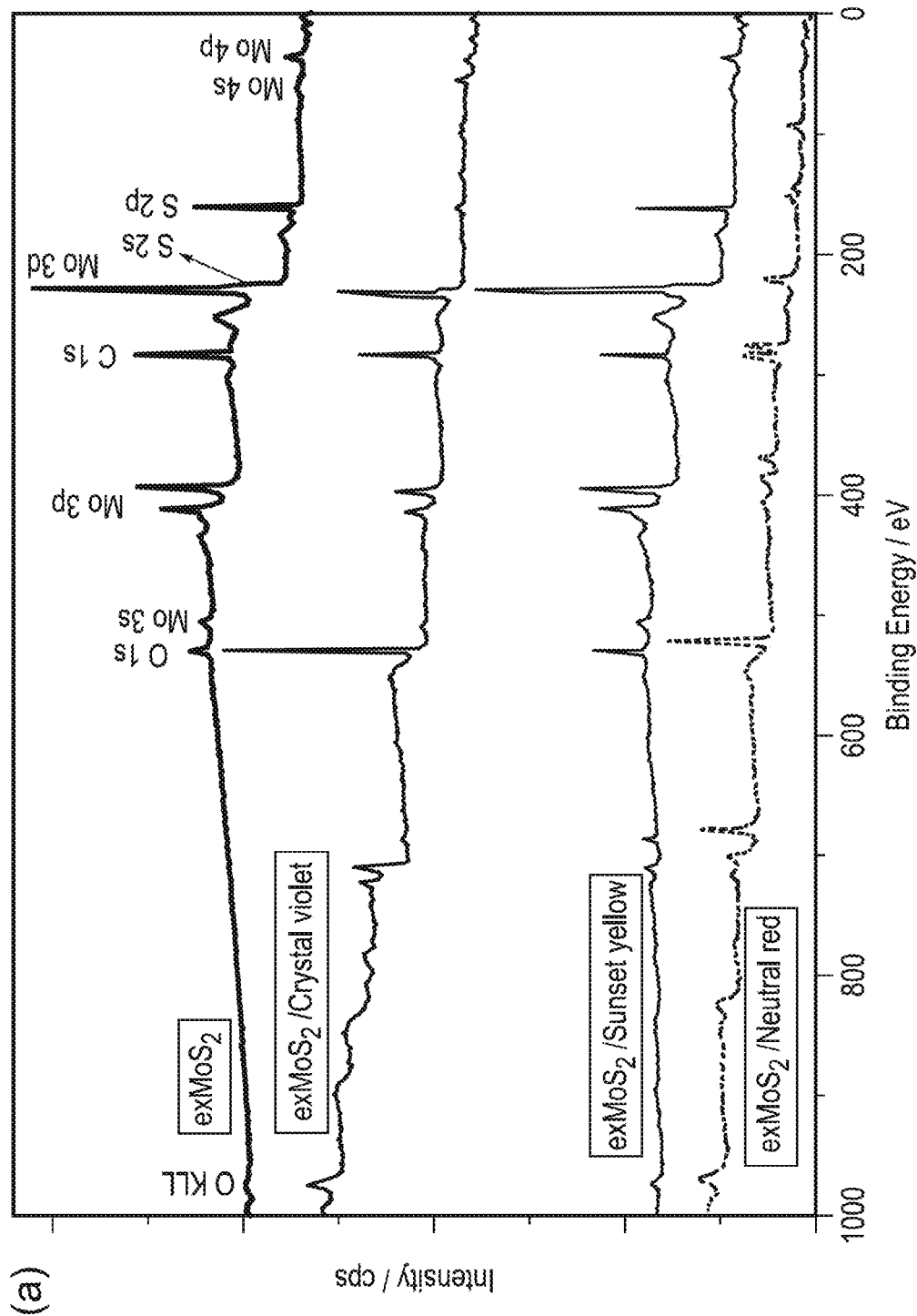
FIGS. 10A and 10B show: (a) XPS scan analysis of exfoliated $MoS_2$ with $MoS_2$ functionalised by CV, SY, and NR; (b-d) High-resolution XPS spectra showing Mo 3d, 3p, and S 2p shells, respectively. Each of the fitting peaks is labelled with corresponding orbital, as well as the binding energy in the parentheses.
Figure 10A:
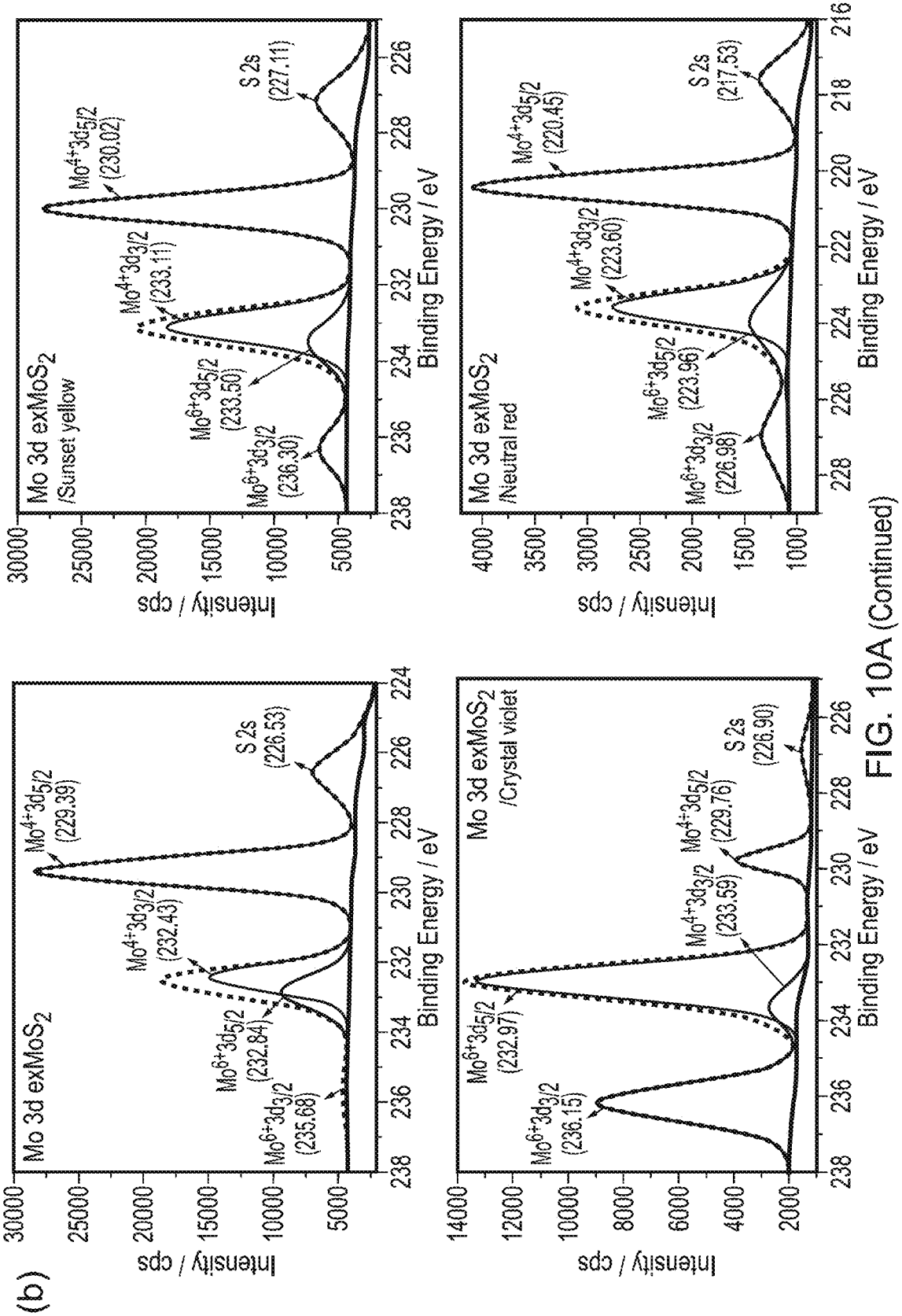
Figure 10B:
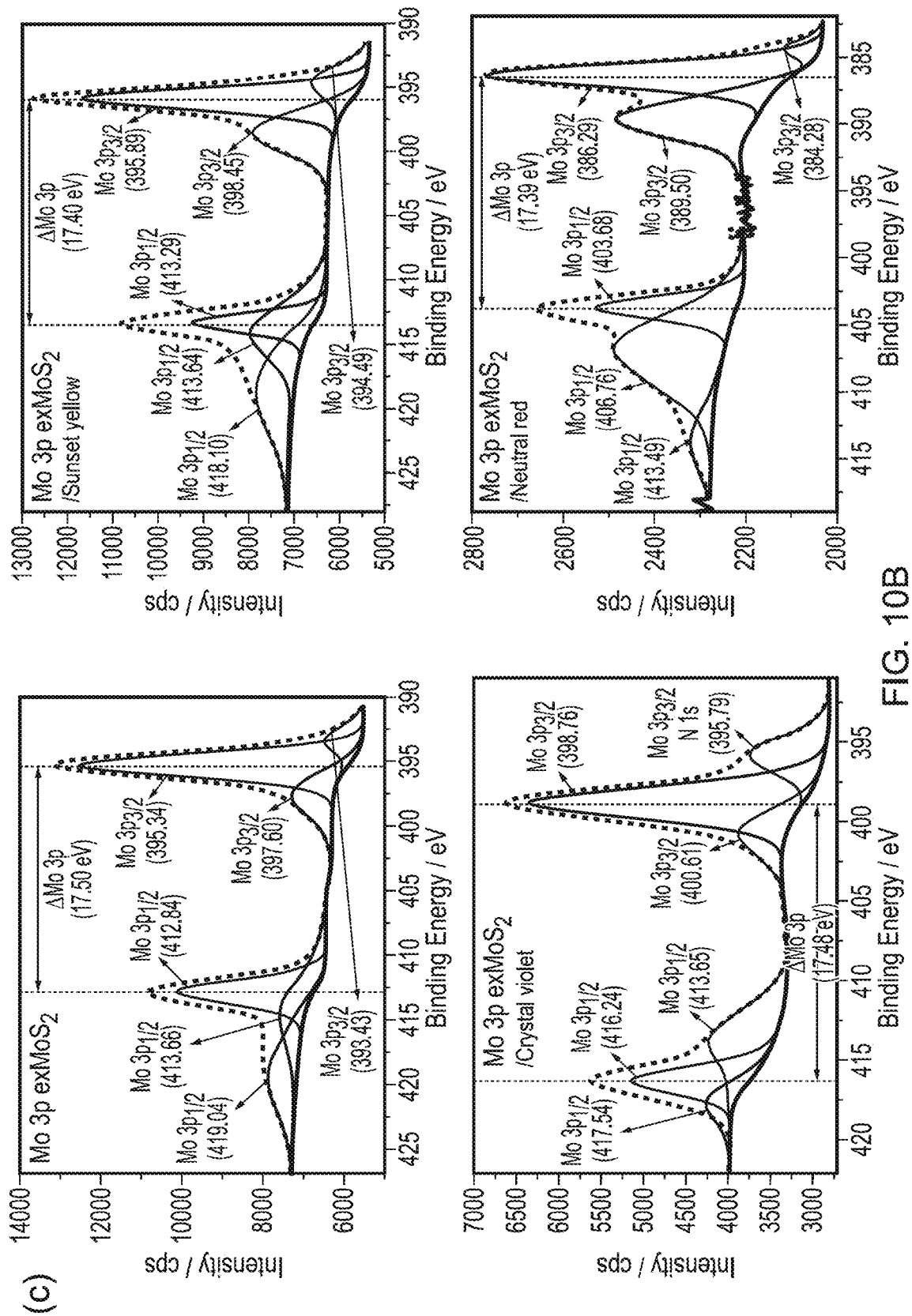
Figure 10B:
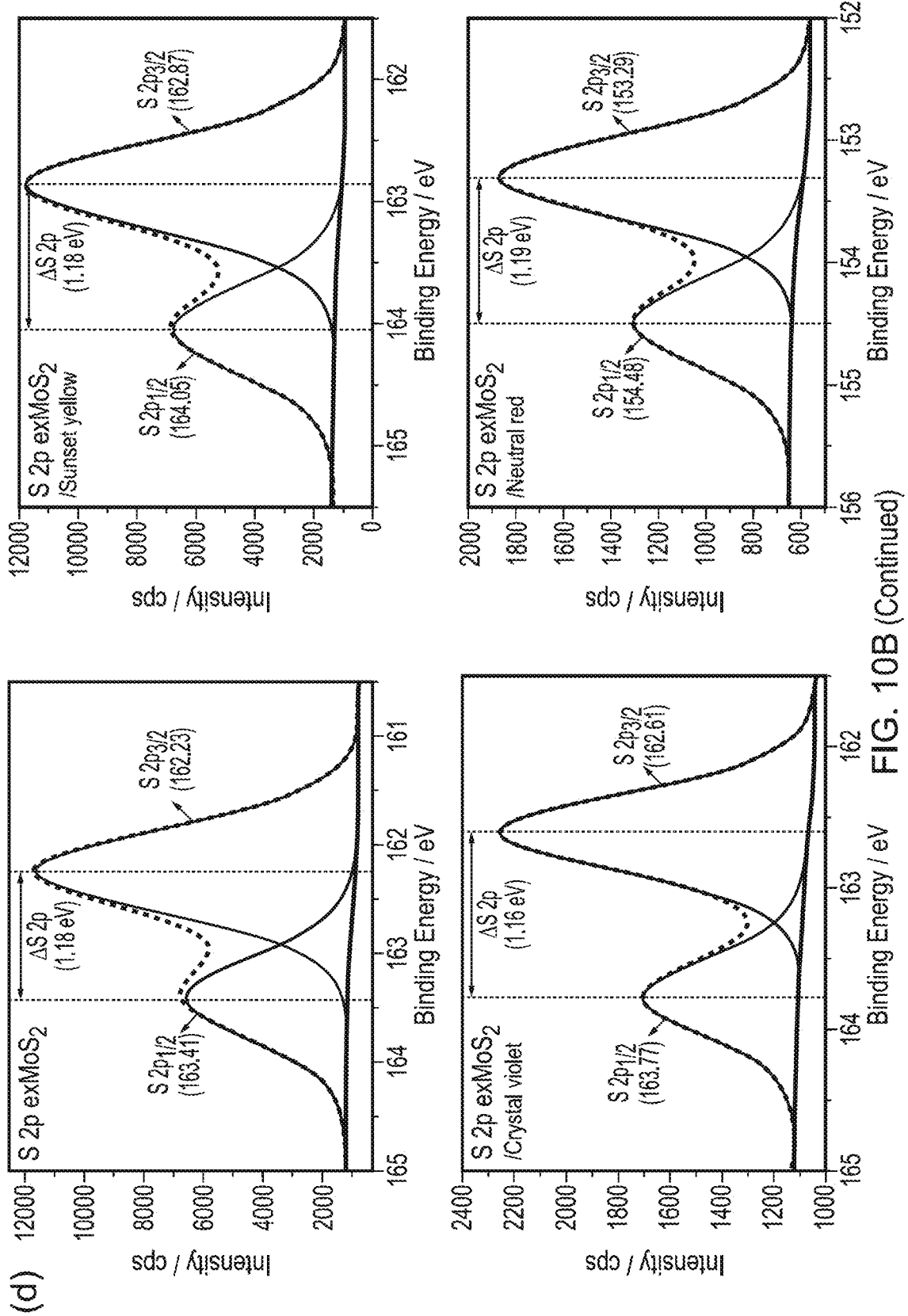

XPS is commonly used to determine the composition and stoichiometry of $MoS_2$. XPS spectra of $MoS_2$, before and after exfoliation in IPA-water, are shown in FIG. 9(a). The binding energies are calibrated using adventitious carbon (C 1s) at 284.8 eV and the atomic percentage of the peaks were determined by optimised peak fit using a nonlinear Shirley-type background (70% Gaussian and 30% Lorentzian line shapes) with the Kratos library.

Figure 11:
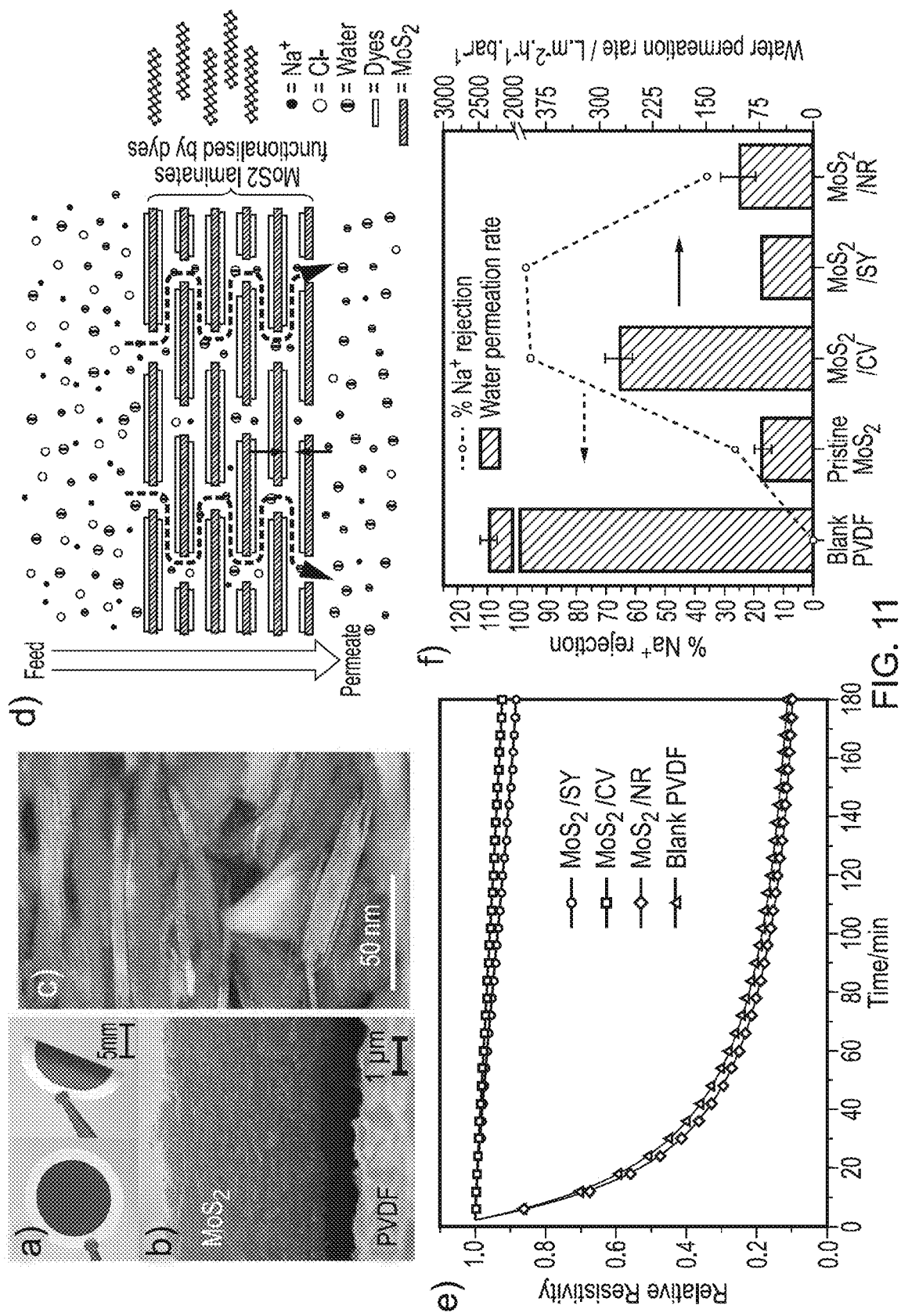
FIG. 11 shows: a) a photograph of the $MoS_2$ membrane supported by a polymer (PVDF) demonstrating their flexibility. b) a cross-sectional SEM image of the formed MoS2 membrane supported on the PVDF showing the stacked layered nature of the MoS2. Membranes were produced with thicknesses varying from 1-10 μm. c) TEM image showing the stacked layers of $MoS_2$ d) a schematic showing the diffusion, driven by the large concentration gradient, of the solute (NaCl ions in this case) through the MoS2 laminate membrane which has been pre-functionalised by organic dye. e) a plot comparing the change in relative resistivity of the permeate side of a 6 μm MoS2 laminate membrane for each dye molecule, when the feed side contains 1M NaCl and the permeate side contains 1000 times lower concentration (1 mM). f) a comparison of the sodium ion (Na+) percentage rejection under osmotic pressure measured by ICP-OES after 180 min for each membrane (6 μm thickness), as well as the water permeation rate measured with external pressure (1 bar).
Figure 12:
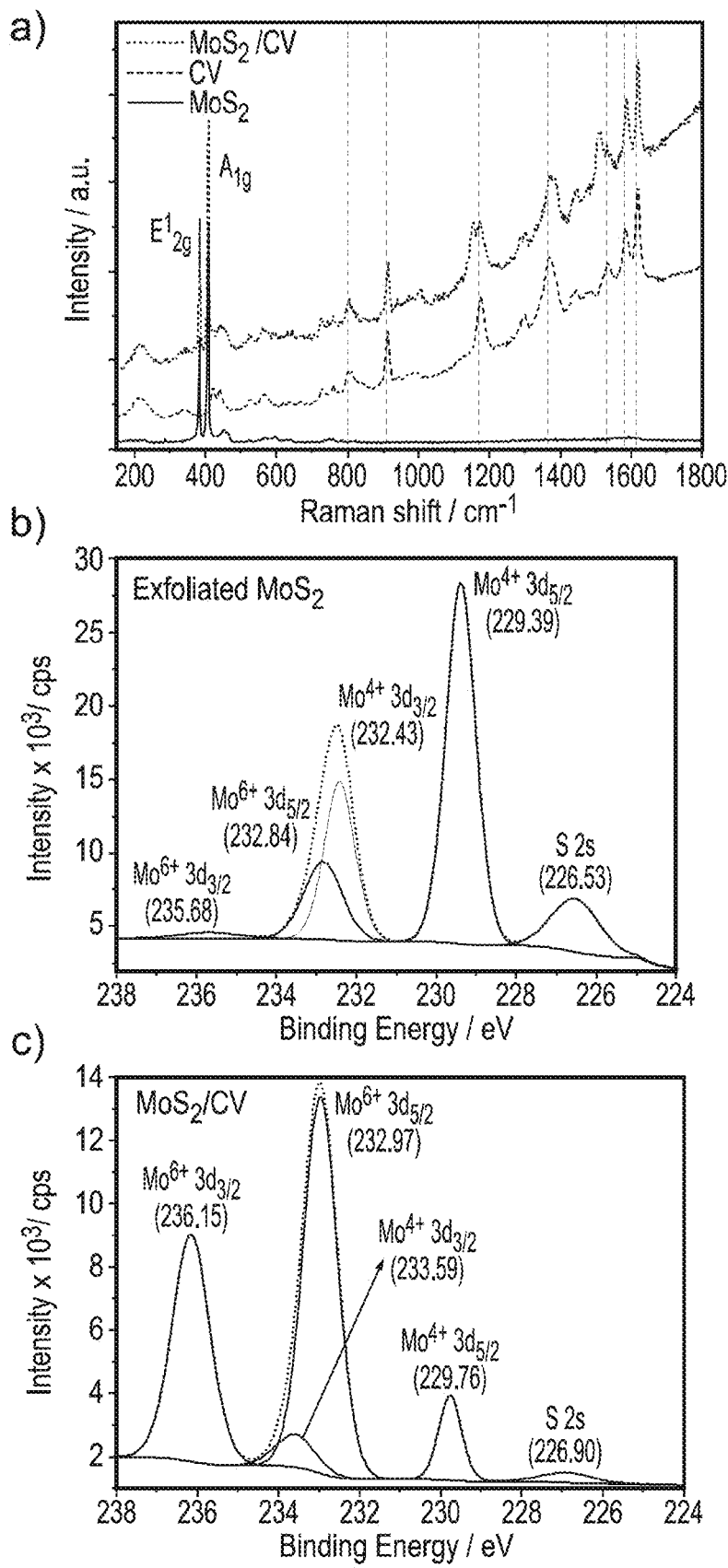
FIG. 12 shows a) Raman spectra from the pristine $MoS_2$ membrane, crystal violet (CV) powder, and a CV functionalised $MoS_2$ membrane (MoS2/CV). (b) XPS spectra of the Mo3d region for a pristine exfoliated $MoS_2$ membrane and (c) a CV functionalised membrane.

Example 3—Discussion of Formation and Properties of Membranes of Inorganic 2-D Crystals Functionalised by Dye Molecules $MoS_2$ membranes were first produced using syringe-pump assisted filtration, where different volumes of exfoliated MoS$_2$ flakes dispersions as described above were filtered through polyvinylidene difluoride (PVDF) supporting membranes (100 nm pores) to produce membranes of the desired thickness. The exfoliated flake dimensions within the dispersion (~0.01 mg/ml in isopropanol/water) were characterised and found to have thicknesses in the several (1-5) layer range and lateral dimensions of 200-300 nm. The PVDF supporting membranes alone were also characterised and found to exhibit no ionic selectivity or separation ability and thus do not affect the MoS$_2$ membrane performance. FIG. 11a shows a photograph of one of the MoS$_2$ membranes supported on a PVDF filter, along with a cross-section SEM image (FIG. 11b) which shows the laminar structure of the MoS$_2$ sheets. Membranes of various thicknesses between 1-10 µm were produced as specified. FIG. 11c shows a TEM image showing the stacked layers of MoS$_2$. X-ray diffraction (XRD) was used to investigate and compare the (002) peak in the exfoliated MoS2 membranes, which corresponded to a d-spacing of 6.12 Å.

Determination of Water Permeation Rate

Water permeation rates were determined using two different techniques. Firstly, the osmotic pressure technique depending on concentration of solute was calculated using van't Hoff law:

$$\Pi = i[C_{sucrose}]RT$$

where Π is osmotic pressure, i is 1 for the van't Hoff factor, [$C_{sucrose}$] is 1 M sucrose solution, R is gas constant, and T is the temperature in Kelvin, corresponding to osmotic pressure of ~25 bar at room temperature.

In this method, a sucrose solution (1 M) was placed on one side of the MoS$_2$ membrane and distilled water on the other to allow for a direct comparison of relative performance. From the van't Hoff equation this corresponds to an osmotic pressure of ~25 bar, and by measuring the change in volume of the water on the feed side the permeation rate can be approximated. This was found to be ~40×10$^{-3}$ L m$^{-2}$ h$^{-1}$ bar$^{-1}$ for a 3 µm thick membrane and 11.6×10$^{-3}$ L m$^{-2}$ h$^{-1}$ bar$^{-1}$ for a 6 µm thick membrane (both functionalised by dye), which compares very favourably to the GO membranes which exhibited a permeation of ~8×10$^{-3}$ L m$^{-2}$ h$^{-1}$ bar$^{-1}$ for a 1 µm thick membrane, demonstrating the increased water flux through the MoS$_2$ membranes. This matches previous reports which have demonstrated water permeation rates 3-5 times higher for MoS$_2$ membranes compared to GO. These values also compare favourably to those recently shown for MoS$_2$ membranes produced through chemical exfoliation measured by osmotic pressure (1 M NaCl) of 2.2×10$^{-3}$ L·m$^{-2}$·h$^{-1}$·bar$^{-1}$.

Secondly, external pressure was used in a dead-end filtration setup to more accurately represent industrial applicability. The MoS$_2$ sandwich membrane was cut and inserted in syringe holder with two O-ring at the top and bottom of membrane as well as adhesive glue to hold membrane and protect water leaking. The water permeation rate was calculated by weighing the water pushed through the controlled MoS$_2$ membrane area (26.9×10$^{-6}$ m$^2$) by the external pressure.

The water permeation rate under external pressure was found to be 269.5 (±23.7) L m$^{-2}$ h$^{-1}$ bar$^{-1}$ for a 6 µm thick dye treated MoS$_2$ membrane. This compares very favourably to similar external pressure results for pristine MoS$_2$ laminates, which showed a permeation rate of 245 L m$^{-2}$ h$^{-1}$ bar$^{-1}$ for a much thinner 1.7 µm membrane. This increased water permeation rate is likely related to the interaction of the water molecules with the molybdenum atoms that are present due to sulphur vacancies and defects produced through ultrasonication and at flake edges, which has been shown theoretically.

Determination of Ionic Permeation Rate

Ionic permeation was carried out in a homemade H-beaker as shown in FIG. 5b. A MoS$_2$ sandwich membrane was inserted into the H-beaker using two O-rings as supporter. The starting concentration in feed and permeate side are 1 M and 1 mM, respectively, at the equal volume of 50.0 mL. Both solutions were stirred constantly during the experiment to minimise the concentration gradient. The ionic permeations were determined by in situ resistivity and potentiometric measurement as a function of time and ex situ increasing ions concentration by ICP-OES after three hours. Resistivity and potentiometric measurements were performed simultaneously by conductivity meter to measure the decreasing resistivity in permeate side and a potentiostat to measure the potential difference between two Ag/AgCl reference electrodes in both feed and permeate sides without applied current.

Permeation of various solutes including; organic dyes and metal salts (KCl, NaCl, Na$_2$SO$_4$, CaCl$_2$, and MgCl$_2$) were measured using a homemade H-beaker setup (similar to that described above for the dye functionalization of the membranes). The membranes were first sandwiched between two polyethylene terephthalate (PET) sheets with pre-formed holes to ensure that the exposed membrane area was controlled and reproducible for each experiment. This sandwich was then sealed between the two containers with equal volumes of water, to minimise any hydrostatic pressure, and a 'feed' side with a high concentration of the selected solute (1 M) and a 'permeate' side with a thousand times lower concentration (1 mM) to ensure high diffusive pressure, and this is shown schematically in FIG. 11d. Both sides of the cell were constantly stirred with a magnetic bar to minimise concentration gradients. The rejection properties were measured using several techniques; optical absorbance spectroscopy was used for the dyes, in situ electrochemical techniques (both conductivity and potentiometric measurements) were used to determine the change in concentration of the ionic species, combined with ex situ inductively coupled plasma optical emission spectrometry (ICP-OES) to independently measure the concentration of the solutes. The different dye molecules investigated where a cationic dye; tris(4-(dimethylamino)phenyl)methylium chloride, commonly known as crystal violet (CV), an anionic dye; disodium 6-hydroxy-5-[(4-sulfophenyl)azo]-2-naphthalenesulfonate (sunset yellow, SY), and a neutral dye; 3-amino-7-dimethylamino-2-methylphenazine hydrochloride (neutral red, NR).

The as-prepared MoS$_2$ membranes exhibit excellent rejection properties for each of the large (~1 nm) dye molecules, with very low permeation rates (CV: 5.3 µmol m$^{-2}$ h$^{-1}$, SY: 0.9 µmol m$^{-2}$ h$^{-1}$, NR: 12.5 µmol m$^{-2}$ h$^{-1}$) for a 6 µm thick membrane. However, the as-prepared membranes exhibited poor rejection of the group I and II metal cations listed above. Surprisingly, the filtration properties of the membranes were found to be transformed by their dye functionalization. On exposure to the cationic and anionic dye molecules for extended periods of time (~21 days); they exhibited excellent rejection of simple ionic solutes. To visualise the dynamic permeation of the solute ions we can simply measure the change in resistivity of the permeate side of the membrane as a function of time, and as the ionic concentration increases the resistivity will decrease. Some discrepancy arises from the non-selectivity of the conductivity measurements, as exposure to atmospheric gases (e.g.

$CO_2$) also leads to a decrease in the resistivity over this time, thus by starting with 1 mM of chosen solute this affect is minimised.

The plot in FIG. 11e compares the rejection performance of the dye functionalised $MoS_2$ membranes as well as the bare supporting PVDF filter, both the CV and SY functionalised $MoS_2$ membranes demonstrate that after 3 hours the relative resistivity has dropped by <10% indicating excellent rejection properties. The NR functionalised membrane however displays negligible rejection properties, similar to the bare PVDF membrane. This indicates that it is the interaction between the charged dye molecules and the slightly negative $MoS_2$ flakes themselves that leads to the ionic rejection behaviour.

To complement the resistivity measurements, in situ potentiometric measurements were also performed, measuring the potential difference between two silver/silver chloride (Ag/AgCl) reference electrodes, placed in each of the feed and permeate compartments, with no applied current (supporting information). By measuring the change in measured potential with time we can accurately detect any ionic concentration changes as any tendency to equalize the ionic concentrations will lead to a rapid decrease in the measured potential difference between the two reference electrodes, and these results were found to agree with the resistivity measurements shown. To validate these electrochemical results the increased concentration of sodium cations ($Na^+$) present in the permeate side after three hours was determined by inductively coupled plasma-optical emission spectrometry (ICP-OES), these values are shown in FIG. 11f along with the water flux determined with external pressure.

Ionic rejection can be defined as $1-C_{MoS_2}/C_{PVDF}$ where $C_{MoS_2}$ is the increased concentration of solute ions in the permeate side when the dye functionalised $MoS_2$ membrane is in place, while $C_{PVDF}$ is the increased concentration when the blank membrane is present after three hours. The results in FIG. 11f give a $Na^+$ rejection rate of 96.36 (±0.27)% and 97.73 (±0.63)% for the 6 µm CV and SY thick $MoS_2$ membranes, respectively despite the 1000× concentration gradient. The pristine $MoS_2$, $MoS_2$/NR, and bare PVDF however, showed much lower rejection properties. These results are in excellent agreement with the electrochemical results and indicate that the cationic and anionic dye functionalised membranes are able to efficiently reject NaCl ($Na^+$). The water flux, calculated using external pressure, are also summarised for each corresponding membrane in FIG. 11f, where notably the CV functionalisation actually leads to an increase in the water flux compared to the pristine $MoS_2$ membrane, indicating increased water transport properties whilst maintaining excellent ionic rejection.

Figure 13:
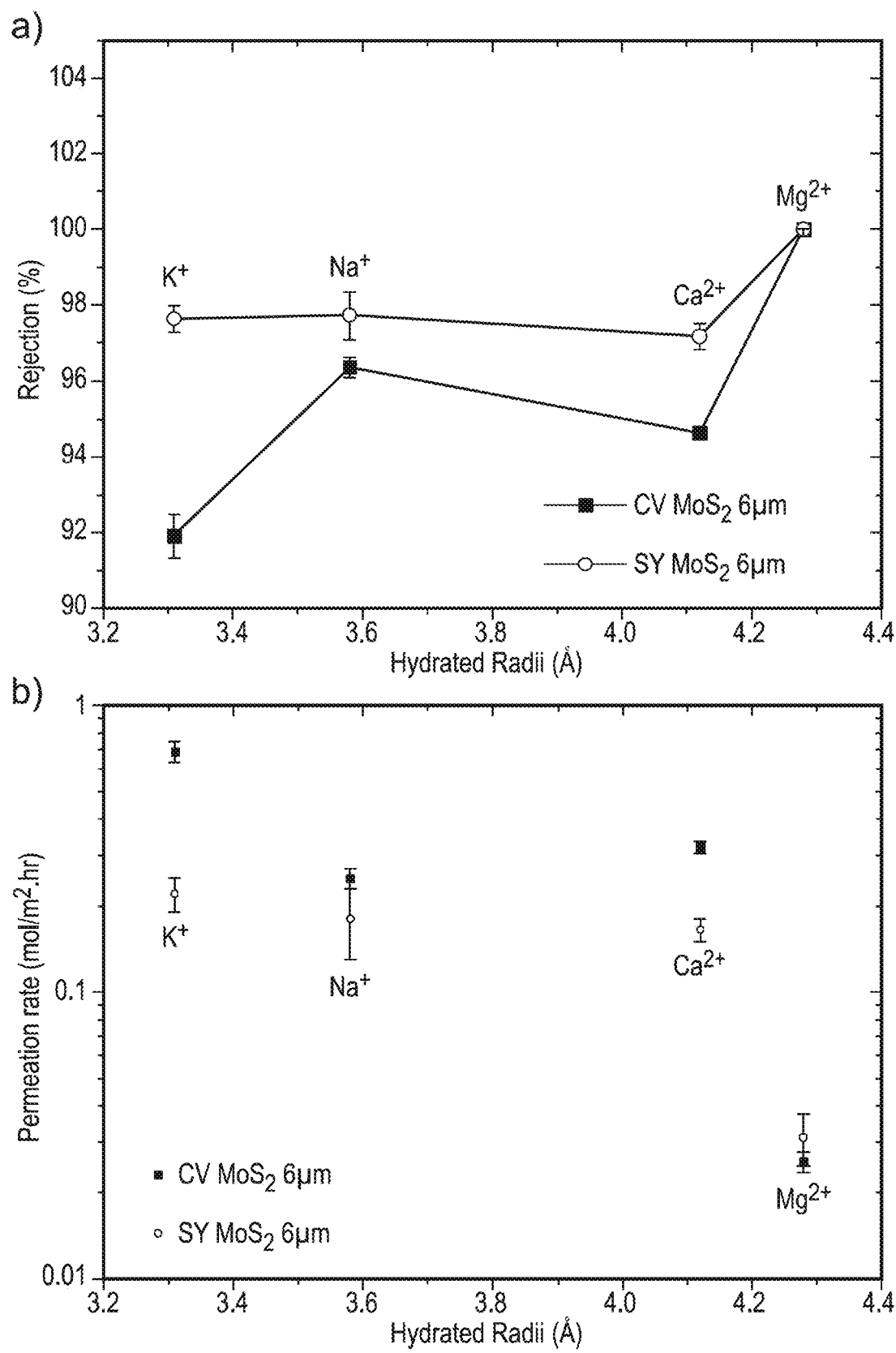
FIG. 13 shows a) a plot of the rejection properties (R %=1–$C_{MoS2}/C_{PVDF}$) of the dye functionalised $MoS_2$ membranes (6 μm thick). b) a plot of the permeation rates of each dye functionalised $MoS_2$ membrane (6 μm thick) for the different cationic species studied with a 1000× concentration gradient.

Due to the demand for desalination technology each of the commonly found ionic solutes in sea water were chosen to be analysed. The rejection rate, calculated after three hours with a 1000× concentration gradient as discussed previously, for each of KCl, NaCl, $Na_2SO_4$, $CaCl_2$, and $MgCl_2$ as a function of hydrated cationic radius are shown in FIG. 13a for a 6 µm thick $MoS_2$ membrane. The rejection rate for the SY functionalised membrane shows a consistent ~98% rejection for each of the analysed solutes, increasing to ~100% for the $Mg^{2+}$, while the CV varies slightly more with rejection rates between 92-100%. It is also possible to calculate the permeation rate of these ionic solutes, by taking the concentration determined from ICP-OES as a function of time, and these ionic permeation rates are shown for the CV and SY functionalised membranes in FIG. 13b. These rates compare very favourably with the results for a similar thickness GO membrane (5 µm) and feed concentration (1 M), namely a permeation rate of ~2 $mol \cdot m^{-2} \cdot h^{-1}$ for these size ions. The ionic permeation achieved for the 6 µm thick dye functionalised $MoS_2$ membranes are approximately an order of magnitude lower at ~0.15 $mol \cdot m^{-2} \cdot h^{-1}$ for the $K^+$, $Na^+$, and $Ca^{2+}$ and a further order of magnitude lower for the $Mg^{2+}$ at ~0.025 $mol \cdot m^{-2} \cdot h^{-1}$. This combined with the significantly increased water permeation rate indicates that these membranes are promising for desalination and nanofiltration applications.

Without wishing to be bound by theory, the predominant transport mechanism in this work is attributed to an electrostatic attraction between the cations in solution and the negatively charged $MoS_2$ channels, with atomic radii only affecting the transport above the critical channel width. However, in our results we observe that although the XRD results indicate the channel width to be approximately 6.4 Å we observe high rejection of species with radii >4.2 Å, illustrating how the dye functionalisation has led to a tunability of these membranes.

The change in permeation rates for the ions with a smaller hydration radius than 4.2 Å indicates that the nanocapillaries formed between the $MoS_2$ sheets must be approximately 8.4 Å in width. This is in agreement the XRD results which show an interlayer spacing for the $MoS_2$ membrane of ~14 Å, leaving a free space after subtracting the thickness of a single $MoS_2$ layer of ~10 Å. This is slightly lower than that achieved for hydrated GO membranes of ~13 Å, and is the source of the desired ionic selective filtration observed.

Figure 14:
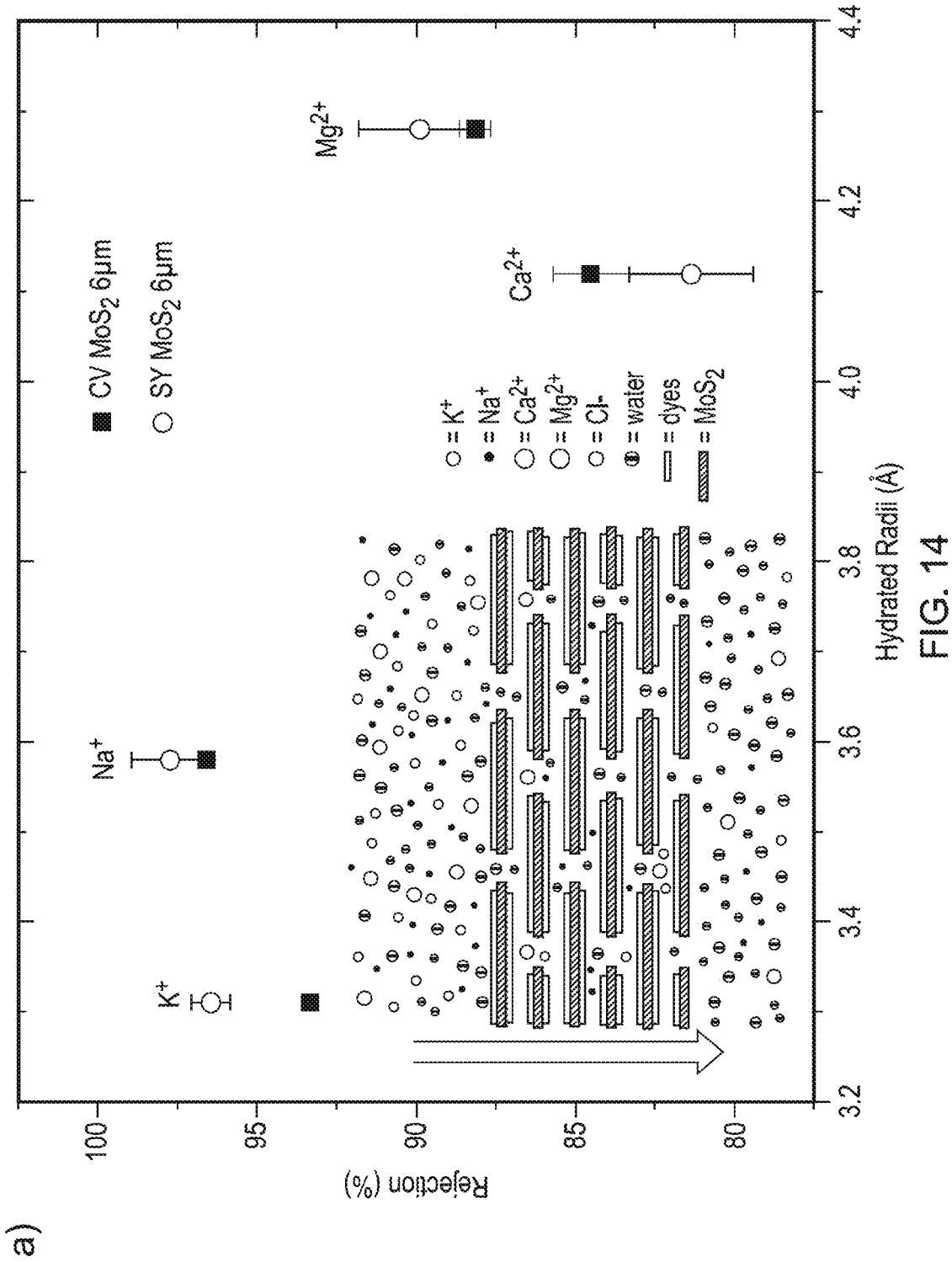
FIG. 14 shows a plot of the rejection properties for the CV and SY 6 μm thick $MoS_2$ membranes for synthetic sea water containing mixed ionic solutes.
Figure 15:
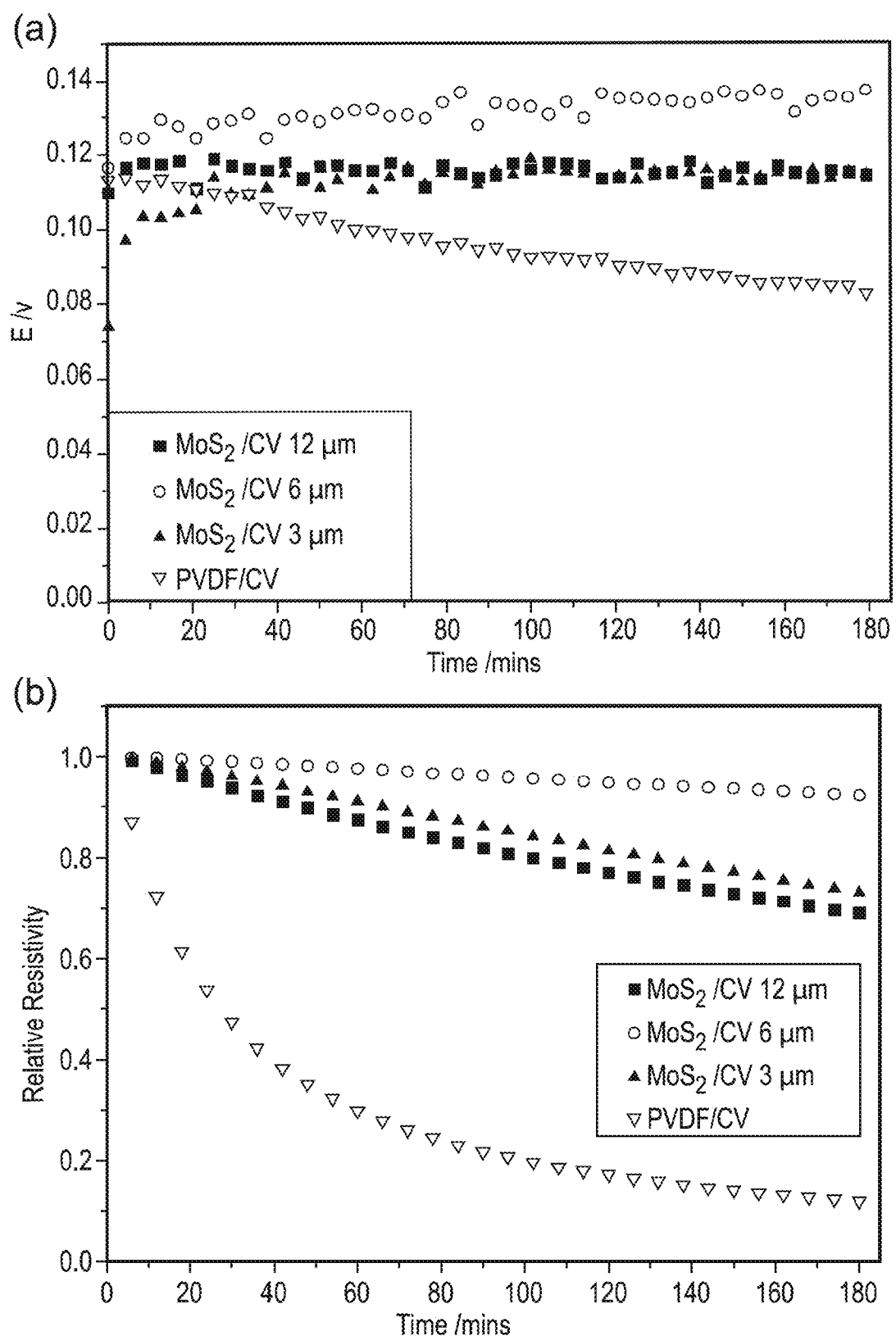
FIG. 15 shows the NaCl rejection of (a, c, and e) plots of potential versus time using Ag/AgCl as electrodes and (b, d, and f) plots of relative resistivity versus time for $MoS_2$ functionalised by 0.1 mM CV, SY and NR, respectively.
Figure 15:
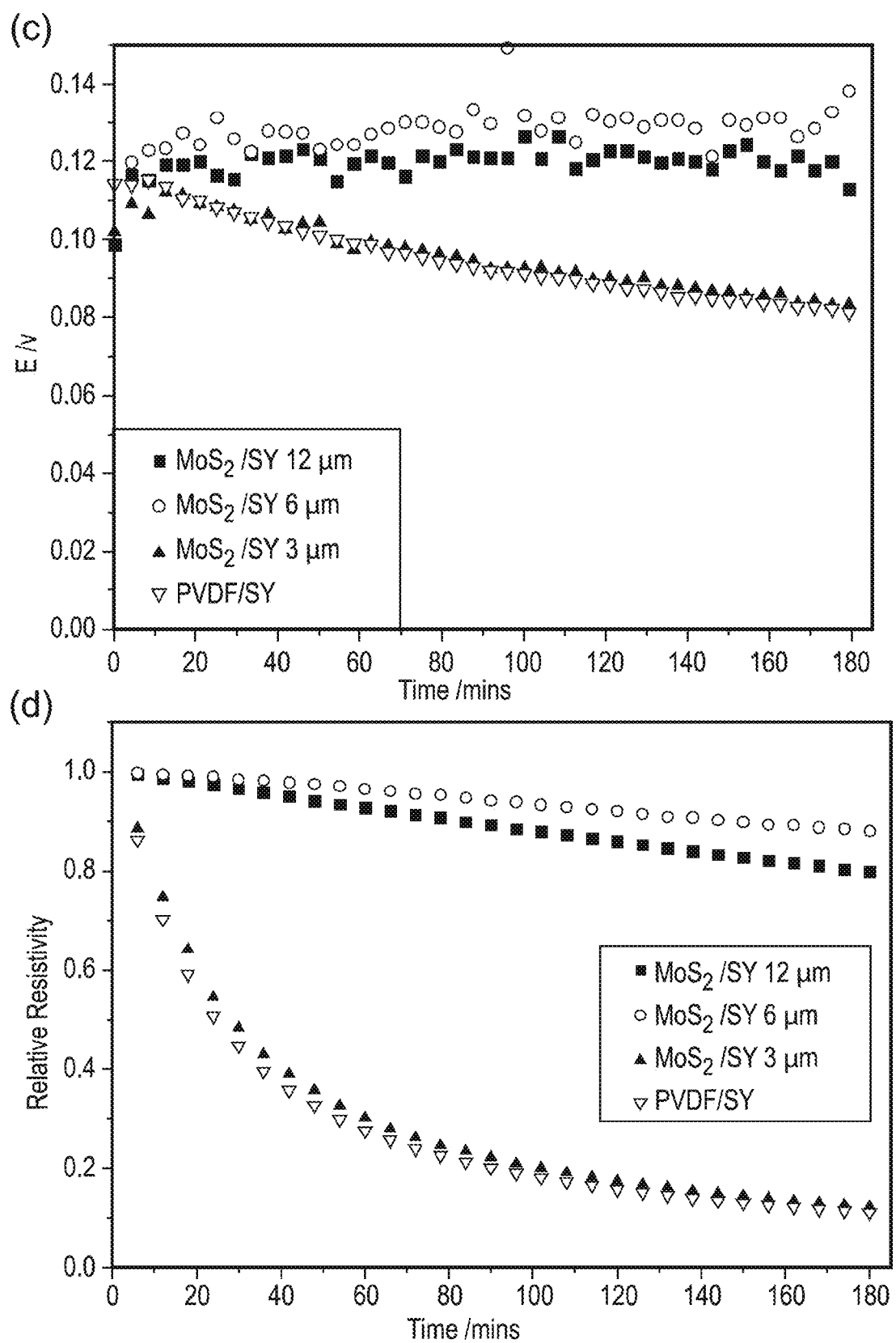
Figure 15:
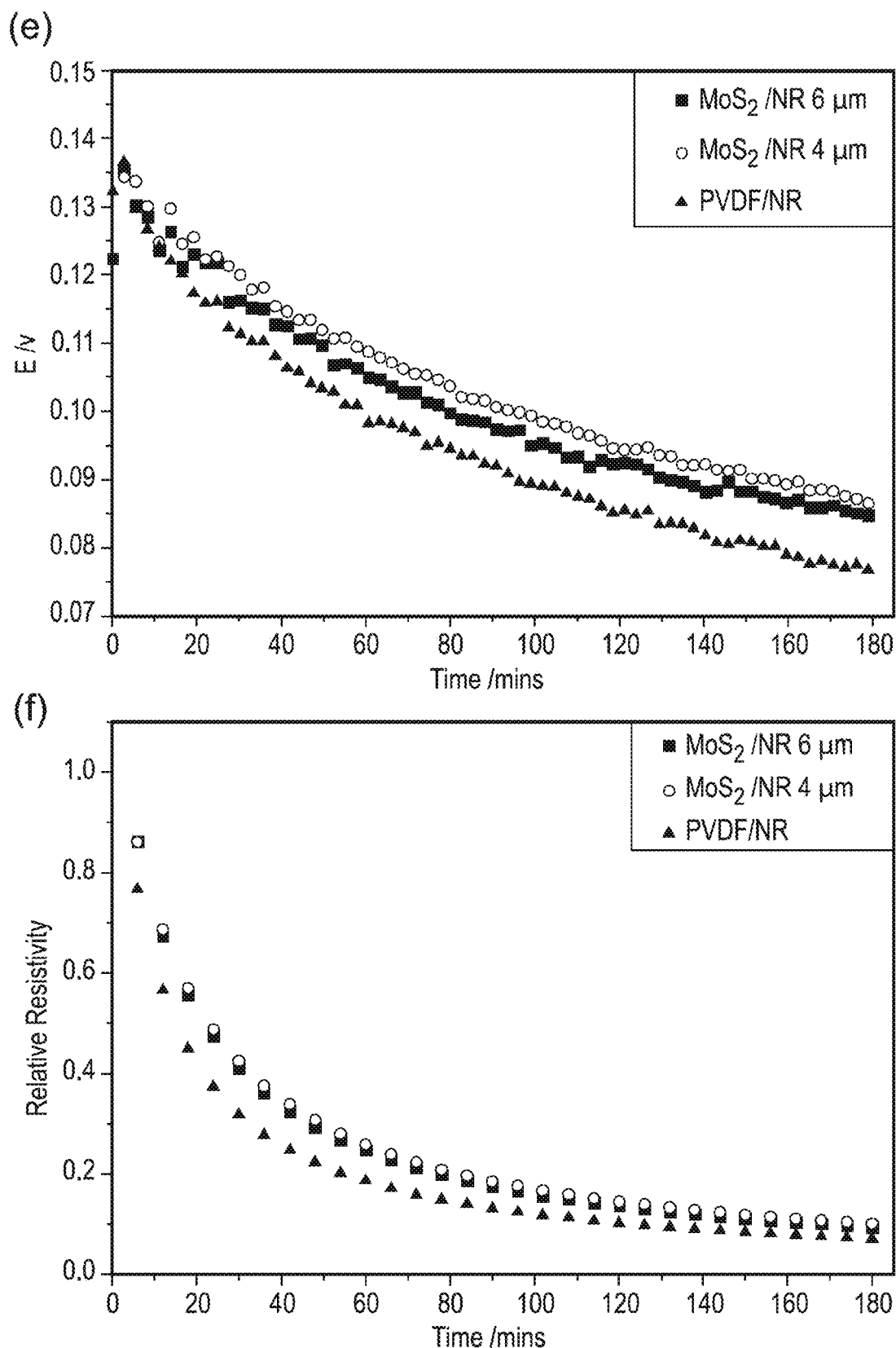
Figure 16:
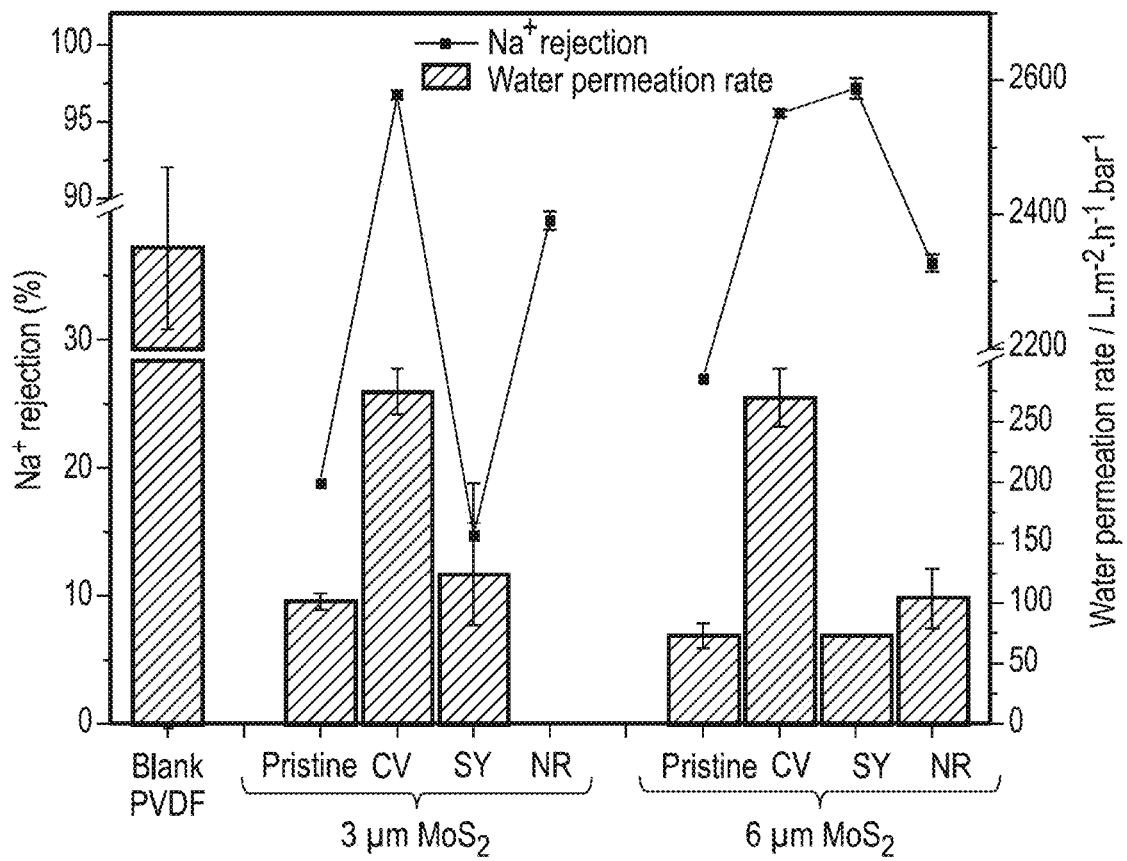
FIG. 16 shows a Plot of Na+ rejection properties (R %=1–$C_{MoS2}/C_{PVDF}$) and water permeation rate of 3 and 6 μm in the different dyes at the same concentration (0.1 mM); the solid lines and column are % Na+ rejection and water permeation rate, respectively.
Figure 17:
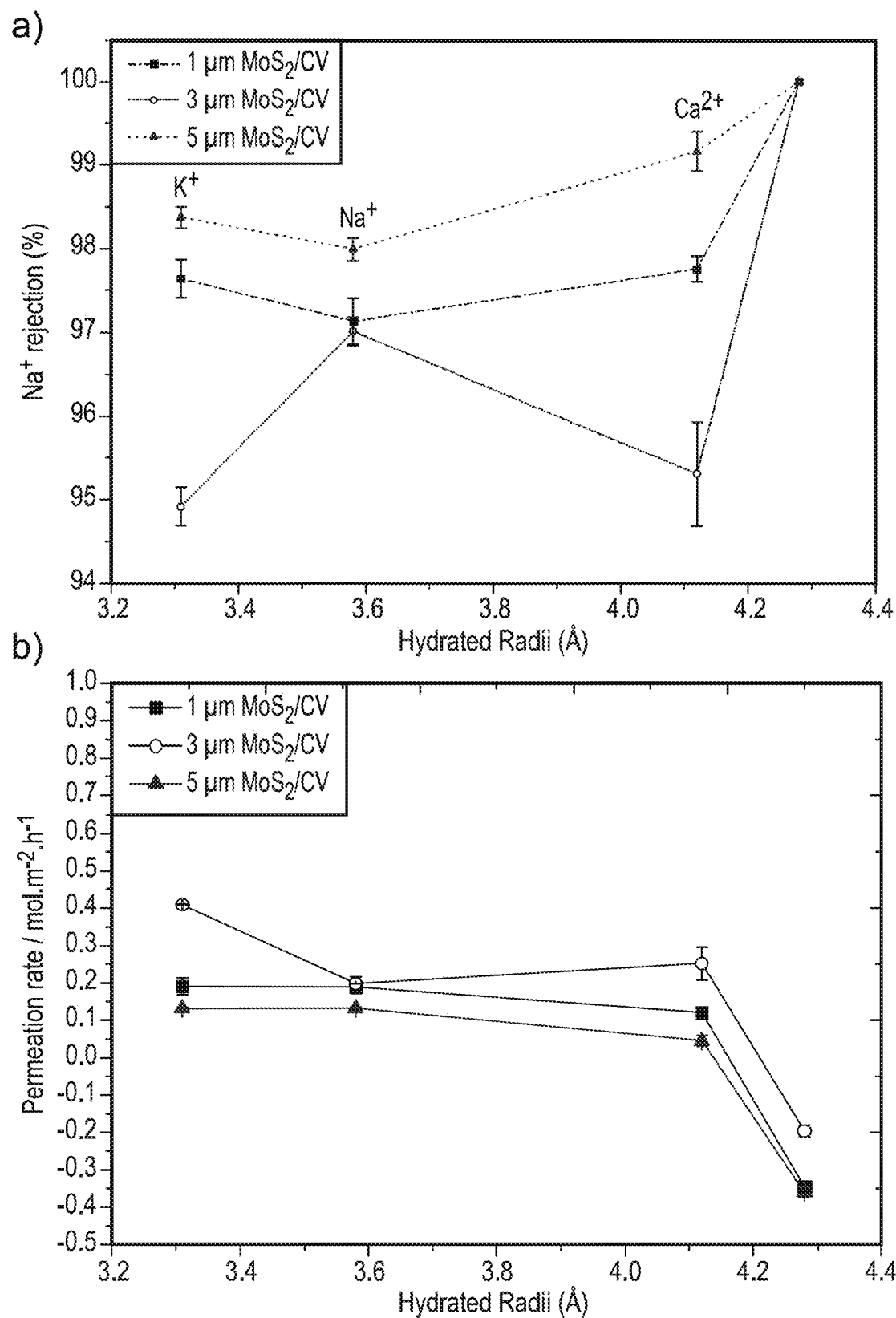
FIG. 17 shows a) Plot of the rejection properties (R %=1–$C_{MoS2}/C_{PVDF}$) of the 1.0 mM CV functionalised membranes at different thicknesses. b) Plot of the permeation rate of each membranes functionalised by 1.0 mM CV for the different cationic species studied with a 1000× concentration gradient.
Figure 18:
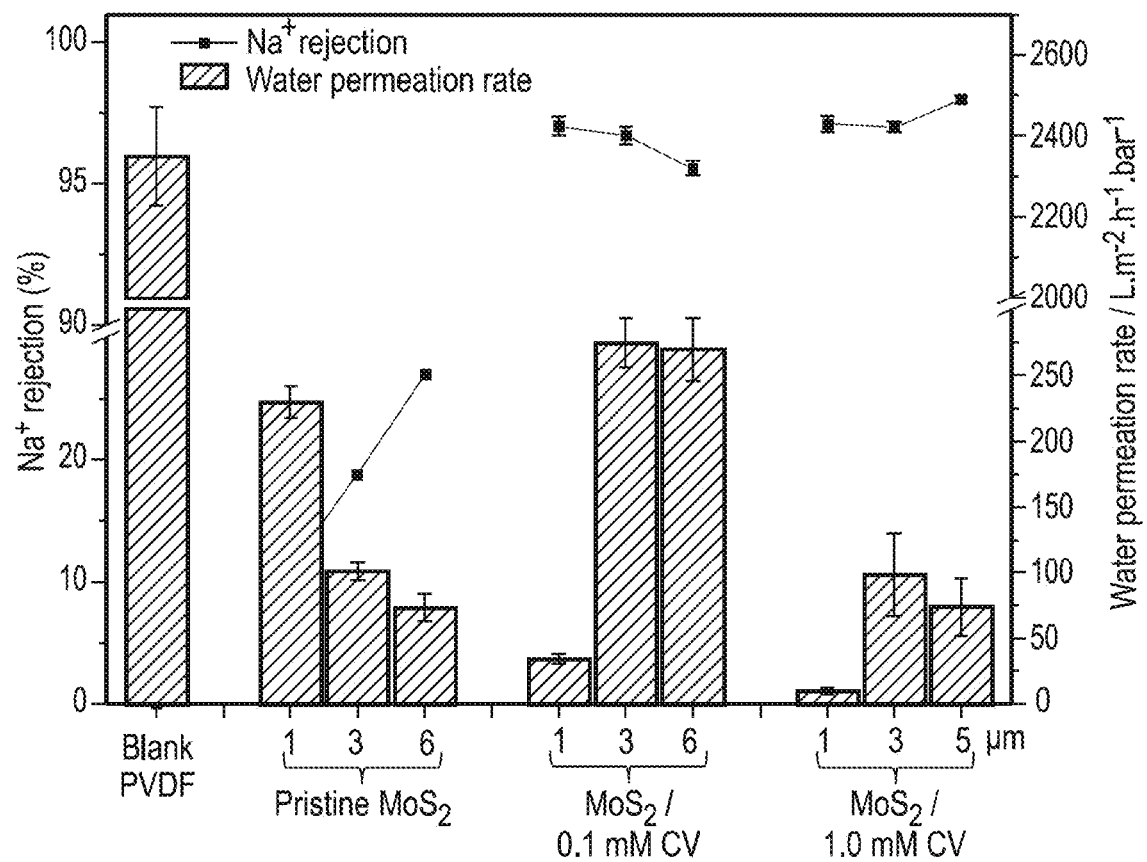
FIG. 18 shows the % Na+ rejection and water permeation rate of pristine $MoS_2$, $MoS_2$ functionalised by 0.1 and 1.0 mM CV in the different thicknesses; the solid lines and column are % Na$^+$ rejection and water permeation rate, respectively.

To better replicate real world rejection properties of these membranes a mixed ionic solution of synthetic sea water (SSW) was tested, shown schematically in the FIG. 14. The concentration of the ionic solutes was certified as matching the standard composition of sea water, with the highest concentration components being NaCl (0.420 M), $MgCl_2 \cdot 6H_2O$ (0.0556 M), $Na_2SO_4$ (0.0288 M), $CaCl_2 \cdot 2H_2O$ (0.0105 M), and KCl (0.00926 M). FIG. 14a plots the rejection rate for each of the cationic components of the SSW after 3 hours as a function of the hydrated radii. Unlike the single ionic component solutions the larger doubly charged ions ($Ca^{2+}$ & $Mg^{2+}$) appear to have a lower rejection rate than the smaller ions, this can be attributed to their divalent nature which leads to a stronger electrostatic interaction with the abundant $Cl^-$ anions present in the mixed solute. The interaction between multiple ionic components has not been analysed previously for similar laminar membranes and remains an area that must be better understood to realise industrial applications.

The concentration of ions passed through membrane analysed by inductively couple plasma optical emission spectroscopy (ICP-OES) is shown in Table 3 and 4.

TABLE 3

Ions rejection in percent calculated by ICP-OES.

| Dyes feed (mM) | Membranes Thickness (μm) | Ions rejection (%) | | | | |
|---|---|---|---|---|---|---|
| | | K+ (KCl) | Na+ (NaCl) | Na+ (Na$_2$SO$_4$) | Ca$^{2+}$ (CaCl$_2$·2H$_2$O) | Mg$^{2+}$ (MgCl$_2$·6H$_2$O) |
| 0.1 mM CV | 6 | 90.3 ± 1.5 | 95.6 ± 0.3 | 92.8 ± 0.4 | 93.7 ± 0.5 | 100 |
| | 3 | | 96.7 ± 0.3 | 92.5 ± 0.8 | | |
| | 1 | | 97.0 ± 0.3 | | | |
| 1 mM CV | 5 | 98.4 ± 0.1 | 98.0 ± 0.1 | 87.1 ± 0.2 | 99.2 ± 0.2 | 100 |
| | 3 | 94.9 ± 0.2 | 97.0 ± 0.2 | 84.6 ± 0.1 | 95.3 ± 0.6 | 100 |
| | 1 | 97.6 ± 0.2 | 97.13 ± 0.3 | 88.2 ± 0 | 97.8 ± 0.2 | 100 |
| 0.1 mM SY | 6 | 95.1 ± 3.4 | 97.2 ± 0.7 | 97.8 ± 0.4 | 96.4 ± 0.8 | 100 |
| | 3 | | 14.7 ± 4.1 | | | |
| 0.1 mM NR | 6 | | 36.0 ± 0.7 | | | |
| | 3 | | 39.3 ± 0.7 | | | |
| Pre-dyes | 5 | | 27.0 | | | |
| | 3 | | 18.8 | | | |
| | 1 | | 11.3 | | | |

TABLE 4

Synthetic Sea Water (SSW) Rejection and each ion passed through membrane.

| Dyes feed | Membranes Thickness (μm) | Ions rejection (%) | | | |
|---|---|---|---|---|---|
| | | K+ | Na+ | Ca$^{2+}$ | Mg$^{2+}$ |
| 0.1 mM CV | 6 | 91.7 ± 0.1 | 95.1 ± 0.4 | 84.8 ± 0 | 88.1 ± 0.1 |
| | 3 | 88.7 ± 0 | 90.5 ± 0.6 | 79.8 ± 0.1 | 84.8 ± 0.3 |
| 1 mM CV | 5 | 96.4 ± 0 | 97.6 ± 0.2 | 90.9 ± 0 | 93.8 ± 0 |
| | 3 | 93.8 ± 0.1 | 94.6 ± 0 | 90.9 ± 0 | 90.2 ± 0 |
| 0.1 mM SY | 6 | 94.9 ± 0.7 | 95.7 ± 1.9 | 77.3 ± 0.8 | 87.9 ± 2.4 |

Example 4—Discussion of Formation and Properties of Membranes of Inorganic 2-D Crystals of the Invention in Separating Organic Molecules from Water The filtration and separation properties of transition metal dichalcogenides (TMDs) membranes, specifically molybdenum disulphide (MoS$_2$) membranes, were explored to assess their capability for separation of organic-water mixtures. More specifically, the separation of alcohols (e.g. ethanol and isopropanol) from water was studied, as well as the separation of pyridoxine from water.

The separation of ethanol-water mixtures and isopropanol-water mixtures were studied using both pristine and functionalised MoS$_2$ membranes. These samples were analysed using gas chromatograph with a flame ionisation detector (GC-FID). Additionally, the separation of pyridoxine-water mixtures was also studied, and these samples were analysed using UV-Vis absorption spectroscopy.

Experimental Methods

Ultrasonic liquid phase exfoliation of molybdenum (IV) disulphide (MoS$_2$) was the method used in this experiment to exfoliate bulk MoS$_2$ to create submicrometer-thick MoS$_2$ membranes. A known amount of the exfoliated MoS$_2$ material was passed through a syringe pump at a rate of 10 ml h$^{-1}$ to create various thicknesses of MoS$_2$ on PVDF membrane. The following membranes were used for all the experiments discussed in this report: blank PVDF membrane, 1 μm-thick MoS$_2$, 3 μm-thick MoS$_2$ and 5 μm-thick MoS$_2$ membranes.

The membranes were each sandwiched between two plastic sheets, held together by Araldite™ epoxy resin. Once dried, the sandwiched membrane is placed between two U-shaped beakers, and this was the main experimental setup for the experiments. One of the beakers was filled with a known amount of an organic/water mixture, referred to as the 'feed' side, and the remaining beaker was filled with the same amount of pure water, referred to as the 'permeate' side.

Ethanol-Water Separation

Ethanol is soluble in water and rapid, effective separation of various EtOH/water mixtures is highly desired. The feed side contained a mixture of 1:1 EtOH/water, and the permeate side contained pure de-ionised water only. Samples were taken at various time intervals, which were then analysed using a gas chromatograph with a flame ionisation detector (GC-FID).

The separation of EtOH/water was investigated using both pristine MoS$_2$ membranes, and functionalised MoS$_2$-crystal violet membranes with a thickness of 1 μm, 3 μm, 5 μm on PVDF, compared against a blank PVDF membrane.

The permeation data for the pristine MoS$_2$ membranes are shown in FIG. 19. After 5 hours there is a noticeable increase in EtOH concentration in the permeate side of the blank membrane experiment, suggesting that a small amount of ethanol has passed through the membrane. To a lesser extent, there is also an increase in the ethanol concentration in the permeate side for the 1 μm, 3 μm and 5 μm membranes. More ethanol appears to have passed through the 1 μm-thick MoS$_2$ membrane than the thicker MoS$_2$ membranes, suggesting that the thicker MoS$_2$ membranes separate ethanol and water more effectively.

The ethanol concentration in the 'feed' side, up to 5 hours, does not show a trend for any of the membranes. This implies there was very little change in ethanol concentration, which suggests the MoS$_2$ membranes effectively separate water and ethanol up to 5 hours.

In the permeate side, the blank PVDF membrane functionalised with crystal violet dye shows an increase in ethanol concentration (see FIG. 20a) after 5 hours. The 1 μm, 3 μm and 5 μm MoS$_2$ membranes also show an increase in ethanol concentration, however this is less than the blank PVDF membrane. The 'feed' side shows the largest decrease in ethanol concentration for the blank membrane. For the 1

µm, 3 µm and 5 µm MoS$_2$ membranes, there is little change in concentration suggesting that the ethanol/water separation is efficient up to 5 hours.

There is little difference when comparing the functionalised and pristine MoS$_2$ membranes for EtOH/water separation. It is possible that the ethanol present in the 'feed' side washed the crystal violet dye out of the membranes as crystal violet dissolves in ethanol.

Isopropanol-Water Separation

The experimental setup was the same as described for the ethanol-water separation experiments above, however isopropanol was substituted for ethanol. Hence the 'feed' side contained a 1:1 ratio of IPA/water, and the 'permeate' side initially contained pure de-ionised water only. Again, IPA/water separation experiments were conducted using both pristine MoS$_2$ membranes and MoS$_2$ membranes functionalised by crystal violet, at thicknesses of 1 µm, 3 µm and 5 µm MoS$_3$. These were compared against a blank PVDF membrane. All samples were analysed using the GC-FID.

Figure 21B:
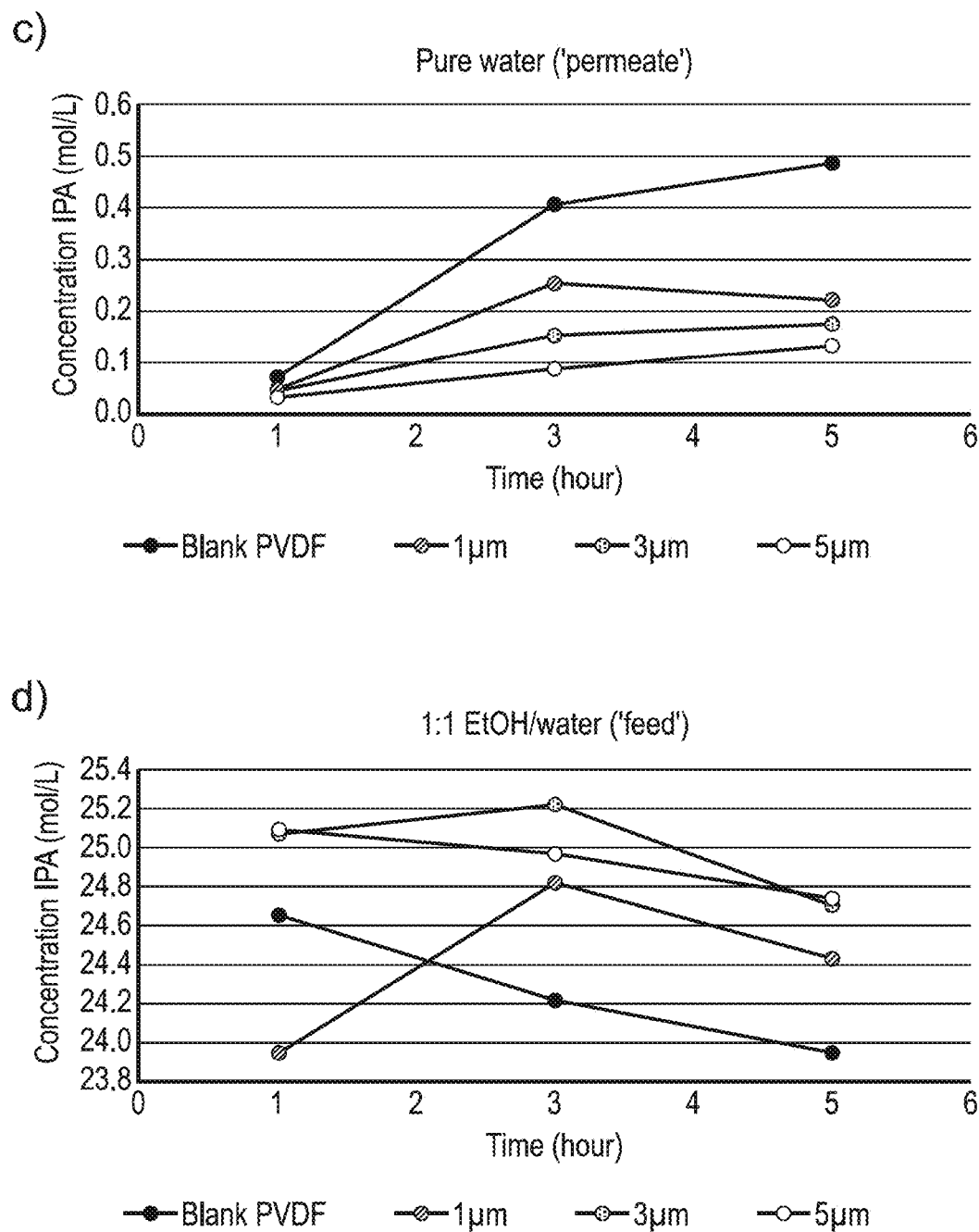

As shown in FIG. 21, the concentration of IPA in the permeate side increases for all the membranes with time. As expected, the concentration increase is highest for the blank membrane and lowest for the 5 µm-thick MoS$_2$ membrane, suggesting that more IPA has passed through the blank membrane than 5 µm membrane. Hence the 5 µm MoS$_2$ membrane is more effective at preventing IPA permeation. In the feed side, there is a slight decrease in IPA concentration for the blank PVDF membrane experiment. There is very little change in concentration in the feed side for the MoS$_2$ membrane experiments, suggesting that overall the membranes effectively separate IPA and water up to 5 hours.

FIG. 22 shows IPA/water separation results using MoS$_2$ membranes functionalised by crystal violet dye, with MoS$_2$ thicknesses of 1 µm, 3 µm and 5 µm compared against a blank PVDF membrane.

Overall, the 'permeate' side shows an increase in IPA concentration for the membrane experiments, suggesting that a small amount of IPA has passed through the MoS$_2$ membranes. The blank PVDF experiment displayed the largest increase in IPA concentration as expected. In the feed side, there is little change in concentration for all the membrane experiments, implying that overall the membranes effectively separate IPA and water. As with the ethanol/water experiments, there appears to be little difference between the functionalised and pristine MoS$_2$ membranes. Again, the IPA in the 'feed' side mixture was suspected to dissolve, and hence remove, the crystal violet dye in the functionalised membranes.

Pyridoxine-Water Separation

These samples were analysed using UV-Vis spectroscopy as pyridoxine absorbs at 327 nm (in the UV region). The membranes used in this experiment were as follows: blank PVDF membrane and pristine MoS$_2$ membranes of varying thicknesses (1 µm, 3 µm and 5 µm). The 'permeate' side consisted of pure de-ionised water only, and the 'feed' side contained a 50 µM pyridoxine solution dissolved in de-ionised water. FIG. 23 shows the pyridoxine/water separation results obtained after 6 hours.

For all the membrane experiments, there was little or no change in the concentration of pyridoxine in both the 'permeate' and 'feed' side, which suggests that little or no pyridoxine is passing through the membranes. One possible reason for pyridoxine not passing through even the blank PVDF membrane is that it may functionalise the membranes by sticking to the PVDF and not passing through the capillaries. Further work is required to confirm this theory

The invention claimed is:

1. A laminate membrane comprising:
   a plurality of nanoplatelets of a two-dimensional material comprising a transition metal dichalcogenide (TMDC) and/or hexagonal boron nitride (hBN), wherein each individual nanoplatelet is impermeable to liquid and the plurality of nanoplatelets are stacked in such a way as to form capillary-like pathways between the faces and sides of the nanoplatelets; and
   a plurality of polyaromatic molecules covalently bonded to the two-dimensional material.

2. The membrane of claim 1, wherein the two-dimensional material is a TMDC.

3. The membrane of claim 1, wherein the plurality of nanoplatelets is a mixture of a plurality of nanoplatelets of a first two-dimensional material comprising a TMDC and a plurality of nanoplatelets of a second two-dimensional material selected from the group consisting of a TMDC, graphene, and hBN.

4. The membrane of claim 1, wherein the polyaromatic molecules are dye molecules.

5. The membrane of claim 4, wherein the dye molecules comprise sunset yellow and/or crystal violet.

6. The membrane of claim 1, wherein the plurality of nanoplatelets is obtained from the corresponding bulk layered inorganic material using a solvent exfoliation method.

7. The membrane of claim 1, wherein the laminate membrane is comprised in a composite with a porous material.

8. A method of reducing the amount of one or more solutes in a liquid to produce a product liquid depleted in said solute or solutes; the method comprising:
   (a) contacting a first face of a laminate membrane with the liquid comprising the one or more solutes, wherein the laminate membrane comprises a plurality of nanoplatelets of a two-dimensional material comprising a transition metal dichalcogenide (TMDC) and/or hexagonal boron nitride (hBN); and a plurality of polyaromatic molecules covalently bonded to the two-dimensional material; wherein each individual nanoplatelet is impermeable to liquid and the plurality of nanoplatelets are stacked in such a way as to form capillary-like pathways between the faces and sides of the nanoplatelets, causing the liquid to pass through the capillary-like pathways between the faces and sides of the nanoplatelets; and
   (b) recovering the product liquid depleted in said solute or solutes from or downstream from a second face of the membrane;
   (c) optionally, recovering the solute or solutes from the first face of the membrane.

9. The method of claim 8, wherein the one or more solutes comprise one or more ions and corresponding counterions in which both ions have a hydration radius that is no larger than 1 nm.

10. The method of claim 8, wherein the method is a filtration method and wherein the product liquid is recovered as a liquid from or downstream from the second face of the membrane without the liquid having undergone a phase change.

11. The method of claim 8, wherein the liquid is an aqueous liquid.

12. The method of claim 8, wherein the one or more solutes comprise one or more ions and corresponding counterions in which both ions have a hydration radius that is no larger than 0.45 nm.

13. The method of claim 12, wherein the one or more solutes includes NaCl.

14. A method of reducing the amount of one or more non-ionic solutes in a liquid to produce a product liquid depleted in said solute or solutes; the method comprising:
  (a) contacting a first face of a laminate membrane with the liquid comprising the one or more solutes, wherein the laminate membrane comprises a plurality of nanoplatelets of a two-dimensional material comprising a transition metal dichalcogenide (TMDC) and/or hexagonal boron nitride (hBN); and a plurality of polyaromatic molecules covalently bonded to the two-dimensional material; wherein each individual nanoplatelet is impermeable to liquid and wherein the plurality of nanoplatelets are stacked in such a way as to form capillary-like pathways between the faces and sides of the nanoplatelets, causing the liquid to pass through the capillary-like pathways between the faces and sides of the nanoplatelets; and
  (b) recovering the solute or solutes liquid from or downstream from a second face of the membrane;
  (c) optionally, recovering any remaining product from the first face of the membrane;
  wherein the one or more solutes are each non-ionic species having a hydration radius that is no larger than 10 nm.

15. The method of claim 14, wherein the one or more solutes comprise non-ionic species having a hydration radius that is no larger than 1 nm.

16. The method of claim 14, wherein the method is a filtration method and wherein the product liquid is recovered as a liquid from or downstream from the second face of the membrane without the liquid having undergone a phase change.

17. The method of claim 16, wherein the non-ionic solute or each non-ionic solute is an organic molecule.

18. The method of claim 14, wherein the liquid is an organic solvent or solvent mixture.

19. The method of claim 14, wherein the liquid is an aqueous liquid.

20. The method of claim 14, wherein the method is a pervaporation method and the method of recovering the product liquid comprises allowing the liquid to evaporate from the second face of the membrane to form a vapour and subsequently condensing the vapour to form the product liquid.

21. The method of claim 20, wherein the non-ionic solute is an alcohol and the liquid is either water or a second alcohol with a smaller hydration radius than the first alcohol.

22. The method of claim 14, wherein the concentration of the one or more solutes in the product liquid is reduced by 50% or more relative to the concentration in the starting liquid.

23. The method of claim 14, wherein the plurality of nanoplatelets is obtained from the corresponding bulk layered inorganic material using a solvent exfoliation method.

24. The method of claim 14, wherein the plurality of nanoplatelets is a mixture of a plurality of nanoplatelets of a first two-dimensional material selected from the group consisting of a TMDC and hBN and a plurality of nanoplatelets of a second two-dimensional material selected from the group consisting of a TMDC, graphene, and hBN.

25. The method of claim 14, wherein the two-dimensional material is a TMDC.

26. The method of claim 14, wherein the two-dimensional material is hBN.

27. The method of claim 14, wherein the laminate membrane is comprised in a composite with a porous material.

28. A method of producing a laminate membrane of claim 7; the method comprising:
  a) depositing a plurality of nanoplatelets of a two-dimensional material onto a porous material to form the laminate membrane supported on the porous material; and
  b) contacting a first side of the laminate membrane with a first solution comprising a first concentration of the polyaromatic molecules and contacting the second side of the laminate membrane with a second solution comprising a second concentration of the polyaromatic molecules, said second concentration being lower than said first concentration, to covalently bond the plurality of polyaromatic molecules to the two-dimensional material to provide a membrane of claim 7.

29. The method of claim 28, wherein the method further comprises:
  obtaining the plurality of nanoplatelets of the two-dimensional material from the corresponding bulk layered inorganic material using a solvent exfoliation method.

30. The membrane of claim 1, wherein the plurality of polyaromatic molecules are charged polyaromatic molecules.

31. The membrane of claim 30, wherein the polyaromatic molecules are negatively charged.

32. The membrane of claim 1, wherein the laminate membrane has a thickness between about 100 nm and about 10 μm.

33. The membrane of claim 1, wherein the polyaromatic molecules are covalently bonded to the two-dimensional material via a nitrogen atom in each polyaromatic molecule.

34. The membrane of claim 7, wherein the laminate membrane is sandwiched between layers of the porous material.

* * * * *